(12) United States Patent
Hünermann et al.

(10) Patent No.: US 10,676,388 B2
(45) Date of Patent: Jun. 9, 2020

(54) GLASS FIBERS AND PRE-FORMS MADE OF HOMOGENEOUS QUARTZ GLASS

(71) Applicant: Heraeus Quarzglas GmbH & Co. KG, Hanau (DE)

(72) Inventors: Michael Hünermann, Alzenau (DE); Achim Hofmann, Frankfurt am Main (DE); Heinz Fabian, Grossostheim (DE); Matthias Otter, Hamm (DE); Thomas Kayser, Leipzig (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 0 days.

(21) Appl. No.: 16/061,122

(22) PCT Filed: Dec. 16, 2016

(86) PCT No.: PCT/EP2016/081503
§ 371 (c)(1),
(2) Date: Nov. 8, 2018

(87) PCT Pub. No.: WO2017/103153
PCT Pub. Date: Jun. 22, 2017

(65) Prior Publication Data
US 2019/0062198 A1    Feb. 28, 2019

(30) Foreign Application Priority Data
Dec. 18, 2015  (EP) .................... 15201083

(51) Int. Cl.
*C03C 3/06* (2006.01)
*C03B 19/06* (2006.01)
(Continued)

(52) U.S. Cl.
CPC .............. *C03C 3/06* (2013.01); *C03B 19/066* (2013.01); *C03B 19/108* (2013.01);
(Continued)

(58) Field of Classification Search
CPC ................................ C03C 3/06; C03B 19/066
See application file for complete search history.

(56) References Cited

U.S. PATENT DOCUMENTS

| | | |
|---|---|---|
| 2,155,131 A | 4/1939 | Hanlein |
| 3,043,660 A | 7/1962 | Hughes et al. |
| (Continued) | | |

FOREIGN PATENT DOCUMENTS

| | | |
|---|---|---|
| CA | 2575799 | 3/2006 |
| CH | 420 502 | 9/1966 |
| (Continued) | | |

OTHER PUBLICATIONS

Office Action for U.S. Appl. No. 16/062,705 dated May 16, 2019 (9 pgs.).

(Continued)

*Primary Examiner* — Sung H Pak
(74) *Attorney, Agent, or Firm* — Dicke, Billig & Czaja, PLLC

(57) ABSTRACT

One aspect relates to a light guide comprising a jacket and one or more cores, wherein the jacket surrounds the cores. Each core has a refractive index profile perpendicular to the maximum extension of the core, wherein at least one refractive index $n_K$ of each refractive index profile is greater than the refractive index $n_{M1}$ of the jacket. The jacket is made of silicon dioxide and has an OH content of less than 10 ppm, a chlorine content of less than 60 ppm, and an aluminium content of less than 200 ppb. One aspect also relates to a silicon dioxide granulate I, characterized by a chlorine content of less than 200 ppm and an aluminium content of less than 200 ppb, in each case based on the total weight of the silicon dioxide granulate I.

10 Claims, 6 Drawing Sheets

(51) Int. Cl.
  *C03B 37/012* (2006.01)
  *C03C 13/04* (2006.01)
  *C03C 1/02* (2006.01)
  *C03B 20/00* (2006.01)
  *C03B 19/10* (2006.01)
  *C03B 37/027* (2006.01)
  *C03C 25/1065* (2018.01)
  *G02B 6/02* (2006.01)

(52) U.S. Cl.
  CPC .......... *C03B 19/1095* (2013.01); *C03B 20/00* (2013.01); *C03B 37/01211* (2013.01); *C03B 37/027* (2013.01); *C03C 1/026* (2013.01); *C03C 13/045* (2013.01); *C03C 25/1065* (2013.01); *G02B 6/02042* (2013.01); *G02B 6/02395* (2013.01); *C03B 2201/03* (2013.01); *C03B 2201/04* (2013.01); *C03C 2201/11* (2013.01); *C03C 2201/23* (2013.01); *C03C 2201/32* (2013.01); *C03C 2203/10* (2013.01); *C03C 2213/00* (2013.01)

(56) References Cited

U.S. PATENT DOCUMENTS

| | | |
|---|---|---|
| 3,127,289 A | 3/1964 | Beall |
| 3,212,871 A | 10/1965 | Vatterodt |
| 3,261,676 A | 7/1966 | Morelock |
| 3,320,045 A | 5/1967 | Weiss et al. |
| 3,331,673 A | 7/1967 | Bour |
| 3,370,921 A | 2/1968 | Wagstaff |
| 3,401,017 A | 9/1968 | Burke, Jr. |
| 3,523,096 A | 8/1970 | Burke, Jr. |
| 3,686,113 A | 8/1972 | Burke, Jr. |
| 3,694,398 A | 9/1972 | Burke, Jr. |
| 3,711,262 A | 1/1973 | Schultz et al. |
| 3,717,450 A | 2/1973 | Loughridge et al. |
| 3,764,286 A | 10/1973 | Antczak et al. |
| 4,033,780 A | 7/1977 | Baumgartner et al. |
| 4,042,361 A | 8/1977 | Bihuniak et al. |
| 4,047,966 A | 9/1977 | Bihuniak et al. |
| 4,113,459 A | 9/1978 | Mattmuller |
| 4,195,982 A | 4/1980 | Coucoulas et al. |
| 4,224,295 A | 9/1980 | Brandt et al. |
| 4,336,048 A | 6/1982 | van der Steen et al. |
| 4,358,306 A | 11/1982 | Okamoto et al. |
| 4,372,771 A | 2/1983 | Coucoulas et al. |
| 4,650,511 A * | 3/1987 | Koya ................ C03B 19/1453 65/30.1 |
| 4,828,593 A | 5/1989 | Morishita et al. |
| 4,828,594 A | 5/1989 | Morishita et al. |
| 4,828,595 A | 5/1989 | Morishita et al. |
| 4,871,695 A | 10/1989 | Seki et al. |
| 4,923,497 A | 5/1990 | Leber et al. |
| 4,938,788 A | 7/1990 | Segawa et al. |
| 4,979,973 A | 12/1990 | Takita et al. |
| 4,985,275 A | 1/1991 | Takemura et al. |
| 5,063,179 A | 11/1991 | Menashi et al. |
| 5,196,759 A | 3/1993 | Parham et al. |
| 5,244,485 A | 9/1993 | Hihara et al. |
| 5,262,610 A | 11/1993 | Huang et al. |
| 5,302,556 A | 4/1994 | Shimizu et al. |
| 5,516,350 A | 5/1996 | Onoda et al. |
| 5,540,782 A | 7/1996 | Miyagi et al. |
| 5,541,826 A | 7/1996 | Sandell |
| 5,547,482 A | 8/1996 | Chalk et al. |
| 5,585,173 A | 12/1996 | Kamo et al. |
| 5,601,428 A | 2/1997 | Okoshi et al. |
| 5,631,522 A | 5/1997 | Scott et al. |
| 5,637,284 A | 6/1997 | Sato et al. |
| 5,651,827 A | 7/1997 | Aoyama et al. |
| 5,665,133 A | 9/1997 | Orii et al. |
| 5,674,792 A | 10/1997 | Moritz et al. |
| 5,713,979 A | 2/1998 | Nicholson et al. |
| 5,736,206 A | 4/1998 | Englisch et al. |
| 5,772,714 A | 6/1998 | Sato et al. |
| 5,776,240 A | 7/1998 | Deller et al. |
| 5,837,334 A | 11/1998 | Yokokawa et al. |
| 5,851,253 A | 12/1998 | Pet et al. |
| 5,855,860 A | 1/1999 | Nishimine et al. |
| 5,904,817 A | 5/1999 | Berger |
| 5,928,397 A | 7/1999 | Bihuniak et al. |
| 5,972,488 A | 10/1999 | Nagata et al. |
| 5,976,480 A | 11/1999 | Mangold et al. |
| 5,979,186 A | 11/1999 | Koppler et al. |
| 6,071,838 A | 6/2000 | Endo et al. |
| 6,129,899 A | 10/2000 | Katsuro et al. |
| 6,133,178 A | 10/2000 | Yamada et al. |
| 6,136,736 A | 10/2000 | Rajaram et al. |
| 6,143,676 A | 11/2000 | Ohashi et al. |
| 6,162,552 A | 12/2000 | Bewlay et al. |
| 6,235,669 B1 | 5/2001 | Antczak et al. |
| 6,263,704 B1 | 6/2001 | Tomita et al. |
| 6,257,737 B1 | 7/2001 | Marshall et al. |
| 6,260,563 B1 | 7/2001 | Lordo et al. |
| 6,291,377 B1 | 9/2001 | Komine et al. |
| 6,360,563 B1 | 3/2002 | Gerhardt et al. |
| 6,380,110 B1 | 4/2002 | Werdecker et al. |
| 6,399,526 B2 | 6/2002 | Tomita et al. |
| 6,422,861 B1 | 7/2002 | Antczak et al. |
| 6,484,540 B1 | 11/2002 | Shimada et al. |
| 6,632,086 B1 | 10/2003 | Antczak et al. |
| 6,653,786 B2 | 11/2003 | Fukushima et al. |
| 6,739,155 B1 | 5/2004 | Giddings et al. |
| 6,763,682 B1 | 7/2004 | Sayce et al. |
| 6,826,927 B2 | 12/2004 | Fukui et al. |
| 6,849,242 B1 | 2/2005 | Koeppler et al. |
| 7,427,387 B2 | 9/2008 | Katsuro et al. |
| 7,452,518 B2 | 11/2008 | Hansen et al. |
| 7,506,521 B2 | 3/2009 | Bookbinder et al. |
| 7,641,969 B2 | 1/2010 | Fletcher, III |
| 7,722,849 B2 | 5/2010 | Moerters et al. |
| 7,785,560 B2 | 8/2010 | Schumacher et al. |
| 7,803,341 B2 | 9/2010 | Ohara et al. |
| 7,955,715 B2 | 6/2011 | Trommer et al. |
| 3,017,536 A1 | 9/2011 | Weber et al. |
| 8,053,080 B2 | 11/2011 | Fukui et al. |
| 8,132,429 B2 | 3/2012 | Pedrido |
| 8,268,740 B2 | 9/2012 | Fiacco et al. |
| 8,316,671 B2 | 11/2012 | Huenermann |
| 8,426,778 B1 | 4/2013 | Bolt |
| 8,541,326 B2 * | 9/2013 | Morita ................ C03B 19/1453 501/54 |
| 8,899,732 B2 | 12/2014 | Reinten et al. |
| 8,940,266 B2 | 1/2015 | Yamada et al. |
| 9,108,876 B2 | 8/2015 | Dawes et al. |
| 9,359,263 B2 | 6/2016 | Hartmann |
| 9,505,651 B2 | 11/2016 | Gu et al. |
| 9,732,180 B2 | 8/2017 | Burckhardt et al. |
| 9,914,265 B2 | 3/2018 | Bauer et al. |
| 9,957,431 B2 | 5/2018 | Scheich et al. |
| 2001/0008366 A1 | 7/2001 | Nishida |
| 2001/0025001 A1 | 9/2001 | Oda et al. |
| 2002/0041963 A1 | 4/2002 | Konya et al. |
| 2002/0044903 A1 | 4/2002 | Oswald et al. |
| 2002/0046992 A1 | 4/2002 | Inaki et al. |
| 2002/0134108 A1 | 9/2002 | Werdecker et al. |
| 2002/0144517 A1 | 10/2002 | Fujiwara et al. |
| 2003/0041623 A1 | 3/2003 | Werdecker et al. |
| 2003/0089279 A1 | 5/2003 | Meyer et al. |
| 2003/0101748 A1 | 6/2003 | Ezaki et al. |
| 2003/0119648 A1 | 6/2003 | Werdecker et al. |
| 2003/0121283 A1 | 7/2003 | Yu |
| 2003/0159464 A1 | 8/2003 | Bowden et al. |
| 2003/0159466 A1 | 8/2003 | Bowden et al. |
| 2003/0159468 A1 | 8/2003 | Zeng et al. |
| 2003/0175649 A1 | 9/2003 | Oosterlaken et al. |
| 2003/0226377 A1 | 12/2003 | Barrett et al. |
| 2004/0115440 A1 | 6/2004 | Werdecker et al. |
| 2004/0116270 A1 | 6/2004 | Oswald et al. |
| 2004/0118155 A1 | 6/2004 | Brown et al. |
| 2004/0253164 A1 | 12/2004 | Mangold et al. |
| 2005/0000250 A1 | 1/2005 | Humbach et al. |

(56) References Cited

U.S. PATENT DOCUMENTS

| | | |
|---|---|---|
| 2005/0039490 A1 | 2/2005 | Zeng et al. |
| 2005/0072191 A1 | 4/2005 | Giddings et al. |
| 2005/0103231 A1 | 5/2005 | Geisselmann et al. |
| 2005/0220692 A1 | 10/2005 | Mangold et al. |
| 2005/0232571 A1 | 10/2005 | Fabian |
| 2005/0272588 A1 | 12/2005 | Sato et al. |
| 2005/0272826 A1 | 12/2005 | Mangold et al. |
| 2006/0055300 A1 | 3/2006 | Janos et al. |
| 2006/0059948 A1 | 3/2006 | Sato et al. |
| 2006/0137400 A1 | 6/2006 | Hansen et al. |
| 2006/0137401 A1 | 6/2006 | Fabian |
| 2006/0176701 A1 | 8/2006 | Shemit et al. |
| 2006/0183623 A1 | 8/2006 | Ikuta et al. |
| 2006/0201647 A1 | 9/2006 | Schumacher et al. |
| 2006/0204189 A1 | 9/2006 | Sasaki et al. |
| 2006/0246363 A1* | 11/2006 | Kikugawa ........... C03B 19/1453 430/5 |
| 2006/0281623 A1 | 12/2006 | Winnen et al. |
| 2007/0015652 A1 | 1/2007 | Mangold et al. |
| 2007/0145332 A1 | 6/2007 | Koeppler et al. |
| 2007/0178329 A1 | 8/2007 | Trommer et al. |
| 2007/0180862 A1 | 8/2007 | Takahashi |
| 2007/0199659 A1 | 8/2007 | Landsmeer |
| 2008/0066497 A1 | 3/2008 | Weber et al. |
| 2008/0075949 A1 | 3/2008 | Kirst et al. |
| 2008/0113174 A1 | 5/2008 | Sato et al. |
| 2008/0193715 A1 | 8/2008 | Weber et al. |
| 2008/0203625 A1 | 8/2008 | Oswald et al. |
| 2008/0213591 A1 | 9/2008 | Meyer et al. |
| 2008/0268201 A1* | 10/2008 | Fiacco ................... C03B 19/12 428/131 |
| 2008/0282743 A1 | 11/2008 | Xu et al. |
| 2008/0290317 A1 | 11/2008 | Hille et al. |
| 2009/0139265 A1 | 6/2009 | Sato et al. |
| 2009/0151848 A1 | 6/2009 | Werdecker et al. |
| 2009/0208760 A1 | 8/2009 | Kuwahara et al. |
| 2009/0311159 A1 | 12/2009 | Gray |
| 2010/0005881 A1 | 1/2010 | Broedel et al. |
| 2010/0041538 A1 | 2/2010 | Arai et al. |
| 2010/0048376 A1 | 2/2010 | Oswald et al. |
| 2010/0071421 A1 | 3/2010 | Dawes et al. |
| 2010/0091360 A1 | 4/2010 | Kuehn et al. |
| 2010/0107700 A1 | 5/2010 | Dawes et al. |
| 2010/0162759 A1 | 7/2010 | Duran et al. |
| 2010/0178509 A1 | 7/2010 | Schumacher et al. |
| 2010/0179269 A1 | 7/2010 | Schachtely et al. |
| 2010/0251771 A1 | 10/2010 | Langner et al. |
| 2010/0316858 A1 | 12/2010 | Sato et al. |
| 2010/0319582 A1 | 12/2010 | Fischer |
| 2011/0100063 A1 | 5/2011 | Desorcie et al. |
| 2011/0113829 A1 | 5/2011 | Leber et al. |
| 2011/0183138 A1 | 7/2011 | Trommer et al. |
| 2011/0226020 A1 | 9/2011 | Xu et al. |
| 2011/0244387 A1 | 10/2011 | Katusic et al. |
| 2011/0272322 A1 | 11/2011 | Yamagata et al. |
| 2011/0281227 A1 | 11/2011 | Franz et al. |
| 2012/0056106 A1 | 3/2012 | Neumann |
| 2012/0103017 A1 | 5/2012 | Ludwig |
| 2012/0213685 A1 | 8/2012 | Morita et al. |
| 2013/0047669 A1 | 2/2013 | Annamalai |
| 2013/0133377 A1 | 5/2013 | Fabian et al. |
| 2013/0219963 A1 | 8/2013 | Lehmann et al. |
| 2013/0340483 A1 | 12/2013 | Takahashi |
| 2014/0072803 A1 | 3/2014 | Panz et al. |
| 2014/0349830 A1 | 11/2014 | Trommer et al. |
| 2015/0052948 A1 | 2/2015 | Lehmann et al. |
| 2015/0059407 A1 | 3/2015 | Lehmann et al. |
| 2015/0086462 A1 | 3/2015 | Such et al. |
| 2015/0114284 A1 | 4/2015 | Yamagata |
| 2016/0002092 A1 | 1/2016 | Kuehn |
| 2016/0090319 A1 | 3/2016 | Hofmann et al. |
| 2016/0168005 A1 | 6/2016 | Gromann et al. |
| 2018/0057391 A1 | 3/2018 | Kuhn |
| 2018/0362385 A1 | 12/2018 | Arndt et al. |
| 2018/0370835 A1 | 12/2018 | Otter et al. |
| 2018/0370838 A1 | 12/2018 | Otter et al. |
| 2019/0031554 A1 | 1/2019 | Otter et al. |
| 2019/0055150 A1* | 2/2019 | Fabian ................ C03B 19/066 |
| 2019/0062193 A1 | 2/2019 | Otter et al. |
| 2019/0062194 A1 | 2/2019 | Otter et al. |
| 2019/0062197 A1 | 2/2019 | Otter et al. |
| 2019/0062198 A1 | 2/2019 | Hunermann et al. |
| 2019/0071342 A1 | 3/2019 | Otter et al. |
| 2019/0071344 A1 | 3/2019 | Otter et al. |
| 2019/0077672 A1 | 3/2019 | Otter et al. |
| 2019/0077688 A1 | 3/2019 | Otter et al. |
| 2019/0077691 A1 | 3/2019 | Otter et al. |
| 2019/0092672 A1 | 3/2019 | Gromann et al. |
| 2019/0092674 A1 | 3/2019 | Otter et al. |
| 2019/0092675 A1 | 3/2019 | Whippey et al. |
| 2019/0092676 A1 | 3/2019 | Otter et al. |
| 2019/0119141 A1* | 4/2019 | Whippey ............... C03B 20/00 |
| 2019/0152827 A1* | 5/2019 | Otter ................ C03B 37/01211 |

FOREIGN PATENT DOCUMENTS

| | | |
|---|---|---|
| CN | 1051528 | 5/1991 |
| CN | 102762362 | 10/2012 |
| CN | 103011567 | 4/2013 |
| DE | 543 957 | 2/1932 |
| DE | 671 626 | 2/1937 |
| DE | 854 073 | 10/1952 |
| DE | 1927851 | 12/1969 |
| DE | 2904199 | 8/1980 |
| DE | 2909815 | 9/1980 |
| DE | 144 86 | 11/1980 |
| DE | 3028364 | 2/1982 |
| DE | 3227785 | 1/1984 |
| DE | 3227786 | 1/1984 |
| DE | 248 928 | 8/1987 |
| DE | 4237107 | 5/1994 |
| DE | 19706556 | 8/1998 |
| DE | 10058558 | 6/2002 |
| DE | 10243953 | 4/2004 |
| DE | 10329806 | 10/2004 |
| DE | 102004038602 | 12/2005 |
| DE | 102005016732 | 10/2006 |
| DE | 102005061274 | 6/2007 |
| DE | 102007049158 | 4/2009 |
| DE | 102009059016 | 6/2011 |
| DE | 102010008162 | 8/2011 |
| DE | 102011120412 | 6/2013 |
| DE | 102012008123 | 10/2013 |
| EP | 0015315 | 9/1980 |
| EP | 0129015 | 12/1984 |
| EP | 0035875 | 10/1989 |
| EP | 0463045 | 1/1992 |
| EP | 0574642 | 12/1993 |
| EP | 0627390 | 12/1994 |
| EP | 0629580 | 12/1994 |
| EP | 0709340 | 5/1996 |
| EP | 0715342 | 6/1996 |
| EP | 0729918 | 9/1996 |
| EP | 1182168 | 2/2002 |
| EP | 1201610 | 5/2002 |
| EP | 1304313 | 4/2003 |
| EP | 1361195 | 11/2003 |
| EP | 1 712 934 | 10/2006 |
| EP | 1717202 | 11/2006 |
| GB | 1197271 | 7/1970 |
| GB | 1254492 | 11/1971 |
| GB | 2044738 | 10/1980 |
| GB | 2049641 | 12/1980 |
| JP | 6158822 | 3/1986 |
| JP | 61068340 | 4/1986 |
| JP | 6230633 | 2/1987 |
| JP | 6230634 | 2/1987 |
| JP | 62202826 | 9/1987 |
| JP | 62212233 | 9/1987 |
| JP | 62212235 | 9/1987 |
| JP | 62212236 | 9/1987 |
| JP | S62-212234 | 9/1987 |
| JP | 63166791 | 7/1988 |
| JP | H02-9783 | 1/1990 |

(56) References Cited

FOREIGN PATENT DOCUMENTS

| | | |
|---|---|---|
| JP | 0264645 | 3/1990 |
| JP | 02199015 | 8/1990 |
| JP | 02283015 | 11/1990 |
| JP | 031528 | 1/1991 |
| JP | 0455332 | 2/1992 |
| JP | 04182322 | 6/1992 |
| JP | 0532429 | 2/1993 |
| JP | 0587403 | 4/1993 |
| JP | 3061215 | 4/1993 |
| JP | 07133131 | 5/1995 |
| JP | 07277725 | 10/1995 |
| JP | 07277751 | 10/1995 |
| JP | 08100411 | 4/1996 |
| JP | H08-119664 | 5/1996 |
| JP | 08165131 | 6/1996 |
| JP | 09012325 | 1/1997 |
| JP | 0940434 | 2/1997 |
| JP | 09165214 | 6/1997 |
| JP | 10265259 | 10/1998 |
| JP | 10287416 | 10/1998 |
| JP | 4014724 | 10/1999 |
| JP | 11302081 | 11/1999 |
| JP | 11310423 | 11/1999 |
| JP | 2001048571 | 2/2001 |
| JP | 2001072427 | 3/2001 |
| JP | 2001089125 | 4/2001 |
| JP | 2001155680 | 6/2001 |
| JP | 2001220126 | 8/2001 |
| JP | 4889141 | 4/2002 |
| JP | 2002114510 | 4/2002 |
| JP | 4371565 | 5/2002 |
| JP | 2002145633 | 5/2002 |
| JP | 2002291253 | 10/2002 |
| JP | 2003137571 | 5/2003 |
| JP | 2005056692 | 3/2005 |
| JP | 2007520408 | 7/2007 |
| JP | 2008063157 | 3/2008 |
| JP | 2009216373 | 9/2009 |
| JP | 5075703 | 10/2009 |
| JP | 2010018470 | 1/2010 |
| JP | 2010150096 | 7/2010 |
| JP | 2011132073 | 7/2011 |
| JP | 2011184210 | 9/2011 |
| JP | 2011207719 | 10/2011 |
| JP | 2012066947 | 4/2012 |
| SU | S62 507 | 5/1979 |
| SU | 1675244 | 9/1991 |
| WO | 8803914 | 6/1988 |
| WO | 99/02459 | 1/1999 |
| WO | 2006015763 | 2/2006 |
| WO | 2006021416 | 3/2006 |
| WO | 2006024440 | 3/2006 |
| WO | 2009071465 | 6/2009 |
| WO | 2011106221 | 9/2011 |

OTHER PUBLICATIONS

Telecommunication Standardization Sector of ITU, "Series G: Transmission Systems and Media Digital Systems and Networks," Oct. 2012, (24 pages).
Agilent Technologies, "Agilent 7500 ICP-MS ChemStation (G1834B) Operator's Manual," 2005, (659 pages).
Agilent Technologies, "Agilent 7500 Series ICP-MS," 2008, (334 pages).
Din, "Moderne Rheologische Prufverfahren," Sep. 2012, (62 pages).
International Standard, "Particle Size Analysis—Laser Diffraction Methods," Oct. 2009, (60 pages).
Indian Standard, "Optical Fibres, Fibre Curl," 2006, (23 pages).
Indian Standard, "Optical Fibres, Attenuation," 2001, (29 pages).
International Standard, "Particle Size Analysis—Image Analysis Methods," May 2014, (32 pages).
International Standard, "Particle Size Analysis—Image Analysis Methods," Nov. 2006, (32 pages).
Wacker Polysilicon, "Product Specification," Aug. 2013, (3 pages).
Perkinelmer, "WinLab32 for ICP Instrument Control Software," 2010, (569 pages).
Journal of Non-Crystalline Solids, "The UV-induced 210 nm absorption band in fused silica with different thermal history and stoichiometry," May 1992, (9 pages).
J. Appl. Phys. 51, "Reaction of Hydrogen with Hydroxyl-Free Vitreous Silica," Jan. 1980, (5 pages).
Institute of Solid State Physics, University of Latvia, "Color Centers and Their Transformations in Glassy SiO2," Jul. 10, 1998, (16 pages).
International Telecommunication Union, "Series G: Transmission Systems and Media, Digital Systems and Networks: Transmission media and optical systems charateristics—Optical Fibre cables," Oct. 2012, (24 pages).
R. Bruckner, "Silicon Dioxide," Encyclopedia of Applied Physics, vol. 18, 1997, (31 pages).
ASTM International, "Standard Test Method for Linear Thermal Expansion of Rigid Solids with Interferometry," 2016, (9 pages).
Photon Kinetics, "Optical Fiber Preform Analyzers from Photon Kinetics," Aug. 17, 2015, (1 page).
OM 100, Heraeus, Aug. 2013 (2 pgs).
R 503/P R503/D, WTW, Operating Manual Aug. 2007 (21 pgs.).
CI 500 DIN, CI 500 BNC, Operating Manual Mar. 2015 (52 pgs.).
F500 DIN, F500 BNC, Operating Manual Mar. 2015 (52 pgs.).
Non-Final Office Action dated Oct. 3, 2019 in U.S. Appl. No. 16/061,929.
Shinetsu Quartz, "Intrinsic Optical Properties of Synthetic Fused Silica for 193 nm Immersion Lithography," (1 page). Oct. 2006.
Functionsbeschreibung, "Theory of Operation," (1 page) 2014.
McPherson Inc., "Vuvas 2000 Vacuum UV Analytical Spectrophotometer," (4 pages) Sep. 7, 2009.
Dodd and Fraser, "Optical Determinations of QH in Fused Silica," (1 page). Received May 25, 1966.
PMX 3000/ION, User's Manual, Microprocessor Controlled High Performance-pH-ion-meter (71 pgs) Mar. 20, 2003.
Goodfellow, Carbon Powder (1 pg.) Dec. 4, 2015.
Karstensen, H. "Fabrication Techniques of Optical Fibres", Journal of Electronics and Telecom, Engrs., vol. 32, No. 4, Feb. 1986.

* cited by examiner

GLASS FIBERS AND PRE-FORMS MADE OF HOMOGENEOUS QUARTZ GLASS

The invention relates to a light guide comprising a jacket M1 and one or more cores, wherein the jacket M1 surrounds the cores, wherein each core has a refractive index profile perpendicular to the maximum core extension, wherein at least one refractive index $n_K$ of each refractive index profile is greater than a refractive index $n_{M1}$ of the jacket M1; wherein the jacket M1 is made of silicon dioxide and has an OH content of less than 10 ppm; and a chlorine content of less than 60 ppm; and an aluminium content of less than 200 ppb; wherein the ppb and ppm are each based on the total weight of the jacket layer M1. The invention also relates to a silicon dioxide granulate I, characterised by a chlorine content of less than 200 ppm and an aluminium content of less than 200 ppb, each based on the total weight of the silicon dioxide granulate I. The invention also relates to a silicon dioxide granulate II, characterised by a chlorine content of less than 500 ppm and an aluminium content of less than 200 ppb, each based on the total weight of the silicon dioxide granulate II. Further, the invention relates to processes for the preparation of silicon dioxide granulates I and II according to the invention as well as to the preparation of a quartz glass body, a light guide and a light guide cable.

STATE OF THE ART

Light guides as such are known. Furthermore, it is a goal to improve the light conducting properties of light guides, in order to increase the data transfer performance, in particular for data transfer over long distances. Light guides contain one or more cores made of a conducting material, such as glass or quartz glass. In a common construction, the core is surrounded by at least one jacket layer. The jacket layer is made of a material which has a lower refractive index than the core, commonly also glass or quartz glass. The refractive index of the glass or quartz of the core and/or of the jacket can be configured by doping. Germanium is often selected for increasing the refractive index of the core. Fluorine or boron are preferably selected for reducing the refractive index of the jacket layer. Through the resulting difference in refractive index between the core and the jacket layer, a total reflection is achieved of light conducted through the core of the light guide.

Often, the core also does not have a refractive index which is continuously constant through the cross section, rather it has a concentric refractive index profile. In this way, the properties of the core can be further adapted. If the core has a concentric refractive index profile, then there is often a first region in the centre of the core, where the refractive index is maximum. Connected thereto is a further region, referred to here as periphery, in which the refractive index is lower than at the centre. Inside the periphery of the core, the refractive index can also vary further. Furthermore, a light guide often has in addition to the core and the at least one jacket layer at least one further outer jacket layer. Whilst the at least one jacket layer is formed around the core itself in the preparation of the core, such that the core itself combines the features necessary for conducting light, the precursor of the further, outer jacket layer is prepared separately. The light guide can be made by introducing a core precursor into the outer jacket layer precursor and subsequently drawing the precursor assembly in the warm to form the light guide. It can certainly occur that the at least one jacket layer, which borders the core, and the outer jacket layer are no longer distinguishable one from another after the formation of the light guide. Furthermore, the core and the jacket layers of the light guide are no longer distinguishable one from another after the drawing process, without destroying the light guide as a whole.

OBJECTS OF THE INVENTION

An object of the present invention is to at least partially overcome one or more of the disadvantages present in the state of the art.

It is a further object of the invention to provide a light guide with a long lifetime.

It is a further object of the invention to provide a light guide which is suitable for long range transmission. In particular, it is an object of the invention to provide a light guide of which multiple pieces can be attached together well.

It is a further object of the invention to provide a light guide which has high transmission rates over long distances. In particular, it is an object of the invention to provide a light guide which allows transmission rates of multiple Tbit/s over distances of more than 100 km.

A further object is to provide a light guide which is tear proof and break proof. In particular, it is an object of the invention to provide a light guide which can be put under tension without tearing.

A further object is to provide a light guide with high symmetry. In particular, it is an object of the invention to provide a light guide with round cross section.

It is a further object to provide a light guide which has a straight form.

It is a further object to prepare a light guide with a low attenuation. Attenuation means a distance dependent drop in signal intensity.

It is a further object of the invention to provide a light guide with a low opacity. It is a further object of the invention to provide a light guide with a high transparency.

It is a further object to provide a light guide which avoids migration of cations.

A further object is to provide a cost efficient light guide.

It is a further object of the invention to provide a light guide which has a high purity and a low contamination with foreign atoms. Foreign atoms mean constituents which are not purposefully introduced.

It is a further object of the invention to provide a light guide which contains a low content of dopant materials.

It is a further object of the invention to provide a light guide which has a high homogeneity in the jacket glass region. A homogeneity of a property or of a material is a measure of the uniformity of the distribution of that property or material in a sample.

It is a further object of the invention to provide a light guide which has a high material homogeneity in the jacket glass region. The material homogeneity is a measure of the uniformity of the distribution of elements and compounds contained in the light guide, in particular of OH, chlorine, metals, in particular aluminium, alkali earth metals, refractory metals and dopant materials.

It is a further object of the invention to provide a light guide with multiple fibre cores (multi core light guide), which solves at least one of the described objects.

It is a further object of the invention to provide a multi core light guide which displays no or few transmission errors through crosstalk during signal transmission. Crosstalk means the migration of a signal from one fibre of a multi core light guide to another fibre of a multi core light guide.

It is a further object of the invention to provide a multi core light guide with a high transmission rate of a high quality. In particular, it is an object of the invention to provide a multi core light guide in which the fibre cores do not disturb each other during signal transmission.

It is a further object of the invention to provide a process by which light guides can be prepared with which at least a part of the above described objects is solved.

A further object is to provide a process by which a light guide can be prepared whilst saving costs and time.

It is a further object of the invention to provide a process by which light guides can more simply be prepared.

It is a further object of the invention to provide a continuous process by which light guides can be prepared.

It is a further object of the invention to provide a process by which light guides can be made at increased speed.

It is a further object of the invention to provide a process by which light guides can be prepared through a continuous melt and forming process.

It is a further object of the invention to provide a process by which light guides can be prepared with a low reject rate.

It is a further object of the invention to provide a process by which assemblable light guides can be prepared.

It is a further object of the invention to provide an automated process by which light guides can be prepared.

A further object is to improve the processability of light guides. A further object is to improve the assemblability of light guides.

PREFERRED EMBODIMENTS OF THE PRESENT INVENTION

A contribution to at least partially fulfilling at least one of the aforementioned objects is made by the independent claims. The dependent claims provide preferred embodiments which contribute to at least partially fulfilling at least one of the objects.

|1| A light guide comprising a jacket M1 and one or more cores,
  wherein the jacket M1 surrounds the cores,
  wherein each core has a refractive index profile perpendicular to the maximum core extension, wherein at least one refractive index $n_K$ of each refractive index profile is greater than the refractive index $n_{M1}$ of the jacket M1;
  wherein the jacket M1 is made of silicon dioxide and has:
    a) an OH content of less than 10 ppm;
    b) a chlorine content of less than 60 ppm; and
    c) an aluminium content of less than 200 ppb;
    wherein the ppb and ppm are each based on the total weight of the jacket M1.

|2| The light guide according to embodiment |1|, comprising two or more cores, wherein the jacket M1 surrounds the cores as a matrix.

|3| The light guide according to one of the preceding embodiments, wherein the jacket M1 has at least one of the following features:
    d) an ODC content of less than $5 \times 10^{15}/cm^3$;
    e) a metal content of metals which are different to aluminium of less than 1 ppm;
    f) a viscosity (p=1013 hPa) in a range from $\log_{10}(\eta(1200°\ C.)/dPas)=13.4$ to $\log_{10}(\eta(1200°\ C.)/dPas)=13.9$ or $\log_{10}(\eta(1300°\ C.)/dPas)=11.5$ to $\log_{10}(\eta(1300°\ C.)/dPas)=12.1$ or $\log_{10}(1350°\ C.)/dPas)=1.2$ to $\log_{10}(\eta(1350°\ C.)/dPas)=10.8$;
    g) a curl parameter of more than 6 m;
    h) a standard deviation of the OH content of not more than 10%, based on the OH content a) of the jacket M1;
    i) a standard deviation of the Cl content of not more than 10%, based on the Cl content b) of the jacket M1;
    j) a standard deviation of the Al content of not more than 10%, based on the Al content c) of the jacket M1;
    k) a refractive index homogeneity of less than $1 \times 10^{-4}$;
    l) a transformation point $T_g$ in a range from 1150 to 1250° C.,
    wherein the ppb and ppm are each based on the total weight of the jacket M1.

|4| The light guide according to one of the preceding embodiments, wherein the content by weight of the jacket M1 is at least 60 wt.-%, based on the total weight of the cores and the jacket M1.

|5| A silicon dioxide granulate I characterised by following features:
    [A] a chlorine content of less than 200 ppm; and
    [B] an aluminium content of less than 200 ppb;
    wherein the ppb and ppm are each based on the total weight of the silicon dioxide granulate I.

|6| The silicon dioxide granulate I according to embodiment |5| characterised by at least one of the following features:
    [C] a metal content of metals which are different to aluminium of less than 1000 ppb;
    [D] a BET surface area in a range from 20 to 50 $m^2/g$;
    [E] a pore volume in a range from 0.1 to 1.5 mL/g;
    [F] a residual moisture content of less than 10 wt.-%;
    [G] a bulk density in a range from 0.5 to 1.2 $g/cm^3$;
    [H] a tamped density in a range from 0.5 to 1.2 $g/cm^3$;
    [I] a carbon content of less than 50 ppm;
    [J] a particle size distribution $D_{10}$ in a range from 50 to 150 μm;
    [K] a particle size distribution $D_{50}$ in a range from 150 to 300 μm;
    [L] a particle size distribution $D_{90}$ in a range from 250 to 620 μm,
    wherein the wt.-%, ppb and ppm are each based on the total weight of the silicon dioxide granulate I.

|7| A process for the preparation of silicon dioxide granulate I, at least comprising the following steps:
    I. Providing a silicon dioxide powder, wherein the silicon dioxide powder has the following features:
      a. a chlorine content of less than 200 ppm; and
      b. an aluminium content of less than 200 ppb;
      wherein the ppb and ppm are each based on the total weight of the silicon dioxide powder;
    II. Providing a liquid;
    III. Mixing the components from steps I. and II. to obtain a slurry;
    IV. Spray drying the slurry to obtain a silicon dioxide granulate I.

|8| The process according to embodiment |7|, wherein the silicon dioxide powder has at least one of the following features:
    c. a BET surface area in a range from 20 to 60 $m^2/g$;
    d. a bulk density in a range from 0.01 to 0.3 $g/cm^3$;
    e. a carbon content of less than 50 ppm;
    f. a total content of metals which are different to aluminium of less than 5 ppm;
    g. at least 70 wt.-% of the powder particles have a primary particle size in a range from 10 to 100 nm;
    h. a tamped density in a range from 0.001 to 0.3 $g/cm^3$;
    i. a residual moisture content of less than 5 wt.-%;
    j. a particle size distribution $D_{10}$ in the range from 1 to 7 μm;

k. a particle size distribution $D_{50}$ in the range from 6 to 15 µm;

l. a particle size distribution $D_{90}$ in the range from 10 to 40 µm;

wherein the wt.-%, ppb and ppm are each based on the total weight of the silicon dioxide powder.

|9| A silicon dioxide granulate I obtainable by the process according to one of the embodiments |7| or |8|.

|10| A silicon dioxide granulate II characterised by following features:
   (A) a chlorine content of less than 500 ppm; and
   (B) an aluminium content of less than 200 ppb.
   wherein the ppb and ppm are each based on the total weight of the silicon dioxide granulate II.

|11| The silicon dioxide granulate II according to embodiment |10| characterised by at least one of the following features:
   (C) a metal content of metals which are different to aluminium of less than 1000 ppb;
   (D) a BET surface area in a range from 10 to 35 $m^2/g$;
   (E) a pore volume in a range from 0.1 to 2.5 $m^2/g$;
   (F) a residual moisture content of less than 3 wt.-%;
   (G) a bulk density in a range from 0.7 to 1.2 $g/cm^3$;
   (H) a tamped density in a range from 0.7 to 1.2 $g/cm^3$;
   (I) a particle size $D_{50}$ in a range from 150 to 250 µm;
   (J) a carbon content of less than 5 ppm,
   wherein the wt.-%, ppb and ppm are each based on the total weight of the silicon dioxide granulate II.

|12| A process for the preparation of silicon dioxide granulate II, at least comprising the following steps:
   (I) Providing silicon dioxide granulate I;
   (II) Treating the silicon dioxide granulate I from step (I) to obtain silicon dioxide granulate II.

|13| A silicon dioxide granulate II obtainable by the process according to embodiment |12|.

|14| A process for the preparation of a quartz glass body, comprising at least the following steps:
   i.) Providing silicon dioxide granulate II;
   ii.) Forming a glass melt from the silicon dioxide granulate II;
   iii.) Forming a quartz glass body from at least part of the glass melt.

|15| The process according to embodiment |14|, comprising the following process step:
   iv.) Forming a hollow body with at least one opening from the quartz glass body.

|16| A quartz glass body obtainable by the process according to one of the embodiments |14| or |15|.

|17| A quartz glass body, wherein the quartz glass body is made of silicon dioxide, wherein the silicon dioxide has the following features:
   A] an OH content of less than 10 ppm;
   B] a chlorine content of less than 60 ppm; and
   C] an aluminium content of less than 200 ppb;
   wherein the ppb and ppm are each based on the total weight of the quartz glass body.

|18| The quartz glass body according to embodiment |17|, characterised by at least one of the following features:
   D] an ODC content of less than $5 \times 10^{15}/cm^3$;
   E] a metal content of metals which are different to aluminium of less than 300 ppb;
   F] a viscosity (p=1013 hPa) in a range from $\log_{10}(\eta(1200°\,C.)/dPas)=13.4$ to $\log_{10}(\eta(1200°\,C.)/dPas)=13.9$ or $\log_{10}(\eta(1300°\,C.)/dPas)=11.5$ to $\log_{10}(\eta(1300°\,C.)/dPas)=12.1$ or $\log_{10}(\eta(1350°\,C.)/dPas)=1.2$ to $\log_{10}(\eta(1350°\,C.)/dPas)=10.8$;
   G] a standard deviation of the OH content of not more than 10%, based on the OH content A] of the quartz glass body;
   H] a standard deviation of the Cl content of not more than 10%, based on the Cl content B] of the quartz glass body;
   I] a standard deviation of the Al content of not more than 10%, based on the Al content C] of the quartz glass body;
   J] a refractive index homogeneity of less than $1 \times 10^{-4}$;
   K] a cylindrical form;
   L] a transformation point $T_g$ in a range from 1150 to 1250° C.;
   M] a fictive temperature in a range from 1055 to 1200° C.;
   wherein the ppb and ppm are each based on the total weight of the quartz glass body.

|19| A process for the preparation of a light guide, comprising the following steps:
   A/Providing:
      A1/a hollow body with at least one opening obtainable by the process according to embodiment |15|, or
      A2/a quartz glass body according to one of the embodiments |17| or |18|, wherein the quartz glass body is first processed to obtain a hollow body with at least one opening;
   B/Introducing one or multiple core rods into the quartz glass body through the at least one opening to obtain a precursor;
   C/Drawing the precursor from step B/in the warm to obtain the light guide with one or multiple cores and a jacket M1.

|20| A light guide obtainable by the process of embodiment |19|.

|21| The light guide according to embodiment |20|, wherein the light guide has a jacket M1 and one or multiple cores, wherein the jacket M1 surrounds the cores,
   wherein each core has a refractive index profile perpendicular to the maximum core extension, wherein at least one refractive index $n_K$ of each refractive index profile is greater than the refractive index $n_{M1}$ of the jacket M1;
   wherein the jacket M1 is made of silicon dioxide and has
      a) an OH content of less than 10 ppm; and
      b) a chlorine content of less than 60 ppm; and
      c) an aluminium content of less than 200 ppb;
      wherein the ppb and ppm are each based on the total weight of the jacket M1.

|22| A light guide cable comprising at least two light guides according to one of the embodiments |20| or |21| or according to one of the embodiments |1| to |4|.

|23| A process for the preparation of a light guide cable comprising the following steps:
   A} Providing at least two light guides according to one of the embodiments |20| or |21| or according to one of the embodiments |1| to |4|;
   B} Processing the at least two light guides from A} to obtain a light guide cable.

|24| A use of the silicon dioxide granulate according to one of the embodiments |5|, |6|, |9| to |11| or |13| for improving the signal transmission properties of light guides.

|25| A use of the silicon dioxide granulate according to one of the embodiments |5|, |6|, |9| to |11| or |13| for the preparation of products selected from the group consisting of jacket materials for optical fibres, light guides and light guide cables.

In the present description disclosed ranges also include the boundary values. A disclosure of the form "in the range from X to Y" in relation to a parameter A therefore means that A can take the values X, Y and values in between X and Y. Ranges bounded on one side of the form "up to Y" for a parameter A mean correspondingly the value Y and those less than Y.

DETAILED DESCRIPTION OF THE INVENTION

A first aspect of the invention is a light guide comprising a jacket M1 and one or more cores,
  wherein the jacket M1 surrounds the cores,
  wherein each core has a cross section $Q_K$,
  wherein each core has a refractive index $n_K$ which is greater at at least one point on the cross section $Q_K$ than the refractive index $n_{M1}$ of the jacket M1;
  wherein the jacket M1 is made of silicon dioxide, and has
    a) an OH content of less than 10 ppm;
    b) a chlorine content of less than 60 ppm; and
    c) an aluminium content of less than 200 ppb,
  wherein the ppb and ppm are each based on the total weight of the jacket M1.

The refractive index of the jacket M1 is measured by a refractive index difference measurement.

According to the invention, the term ppm as a descriptor of amount for a certain feature means a millionth of the amount of a whole for that feature. According to the invention, the term ppb as a descriptor of amount for a certain feature means a billionth of the amount of a whole for that feature. If the unit is given without reference basis, then it is based on the total weight.

The light guide, also referred to as light wave guide or optical fibre, can comprise any material which is suitable for conducting or guiding electromagnetic radiation, in particular light.

Conducting or guiding radiation means propagating the radiation over the length extension of the light guide without significant obstruction or attenuation of the intensity of the radiation. For this, the radiation is coupled into the guide via one end of the light guide. Preferably, the light guide conducts electromagnetic radiation in a wavelength range from 170 to 5000 nm. Preferably, the attenuation of the radiation by the light guide in the wavelength range in question is in a range from 0.1 to 10 dB/km. The attenuation is preferably measured at a reference wavelength of 1550 nm. Preferably, the light guide has a transfer rate of up to 50 Tbit/s.

The light guide preferably has a curl parameter of more than 6 m. The curl parameter in the context of the invention means the bending radius of a fibre, e.g. of a light guide or of a jacket M1, which is present as a freely moving fibre free from external forces.

The light guide is preferably made to be pliable. Pliable in the context of the invention means that the light guide is characterised by a bending radius of 20 mm or less, for example of 10 mm or less, particularly preferably less than 5 mm or less. A bending radius means the smallest radius which can be formed without fracturing the light guide and without impairing the ability of the light guide to conduct radiation. An impairment is present where there is attenuation of more than 0.1 dB of light sent through a bend in the light guide. The attenuation is preferably given for a reference wavelength of 1550 nm.

The light guide preferably has an elongate form. The form of the light guide is defined by its length extension L and its cross section Q. The light guide preferably has a round outer wall along its length extension L. A cross section Q of the light guide is always determined in a plane which is perpendicular to the outer wall of the light guide. If the light guide is curved in the length extension L, then the cross section Q is determined perpendicular to a tangent, which extends in the direction of the length extension L and which contacts the light guide at a point on the outer wall of the light guide. The light guide preferably has a diameter $d_L$ in a range from 0.04 to 1.5 mm. The light guide preferably has a length in a range from 1 m to 100 km.

According to the invention, the light guide comprises one or multiple cores, for example one core or two cores or three cores or four cores or five cores or six cores or seven cores or more than seven cores, particularly preferably one core. Preferably, more than 75%, for example more than 80% or more than 85% or more than 90% or more than 95%, particularly preferably more than 98%, of the electromagnetic radiation which is conducted through the light guide is conducted in the cores. For the transport of light in the cores, the preferred wavelength ranges apply, as already given for the light guide. Preferably, the material of the core is selected from the group consisting of glass or quartz glass, or a combination of both, particularly preferably quartz glass. The cores can, independently of each other, be made of the same material or of different materials. Preferably, all of the cores are made of the same material, particularly preferably of quartz glass.

Each core has a, preferably round, cross section $Q_K$ and has an elongate form with length $L_K$. The cross section $Q_K$ of a core is independent of the cross section $Q_K$ of each other core. The cross section $Q_K$ of the cores can be the same or different. Preferably, the cross sections $Q_K$ of all the cores are the same. A cross section $Q_K$ of a core is always determined in a plane which is perpendicular to the outer wall of the core or the outer wall of the light guide. If the core is curved in length extension, then the cross section $Q_K$ will be perpendicular to a tangent, which extends in the direction of the length extension and which contacts the core at a point on the outer wall of the core. The length $L_K$ of a core is independent of the length $L_K$ of each other core. The lengths $L_K$ of the cores can be the same or different. Preferably, the lengths $L_K$ of all the cores are the same. Each core preferably has a length $L_K$ in a range from 1 m to 100 km. Each core has a diameter $d_K$. The diameter $d_K$ of a core is independent of the diameter $d_K$ of each other core. The diameters $d_K$ of the cores can be the same or different. Preferably, the diameters $d_K$ of all the cores are the same. Preferably, the diameter $d_K$ of each core is in a range from 0.1 to 1000 μm, for example from 0.2 to 100 μm or from 0.5 to 50 μm, particularly preferably from 1 to 30 μm.

Each core has at least one refractive index profile perpendicular to the maximum extension of the core. "Refractive index profile" means the refractive index is constant or changes in a direction perpendicular to the maximum extension of the core. The preferred refractive index profile corresponds to a concentric refractive index profile, for example to a concentric profile of refractive index in which a first region with the maximum refractive index is present in the centre of the core and which is surrounded by a further region with a lower refractive index. Preferably, each core has only one refractive index profile over its length $L_K$. The refractive index profile of a core is independent of the refractive index profile in each other core. The refractive index profiles of the cores can be the same or different. Preferably, the refractive index profiles of all the cores are the same. In principle, it is also possible for a core to have multiple different refractive index profiles.

Each refractive index profile perpendicular to the maximum extension of the core has a maximum refractive index $n_K$. Each refractive index profile perpendicular to the maximum extension of the core can also have further lower refractive indices. The lowest refractive index of the refractive index profile is preferably not more than 0.5 smaller than the maximum refractive index $n_K$ of therefractive index profile. The lowest refractive index of the refractive index profile is preferably 0.0001 to 0.15, for example 0.0002 to 0.1, particularly preferably 0.0003 to 0.05, less than the maximum refractive index $n_K$ of the refractive index profile.

Preferably, each core has a refractive index $n_K$ in a range from 1.40 to 1.60, for example in a range from 1.41 to 1.59, particularly preferably in a range from 1.42 to 1.58, in each case measured at a reference wavelength of $\lambda_r$=589 nm (sodium D-line), at a temperature of 20° C. and at normal pressure (p=1013 hPa). For further details in this regard, see the test methods section. The refractive index $n_K$ of a core is independent of the refractive index $n_K$ of each other core. The refractive indices $n_K$ of the cores can be the same or different. Preferably, the refractive indices $n_K$ of all the cores are the same.

Preferably, each core of the light guide has a density in a range from 1.9 to 2.5 g/cm$^3$, for example in a range from 2.0 to 2.4 g/cm$^3$, particularly preferably in a range from 2.1 to 2.3 g/cm$^3$. Preferably, the cores have a residual moisture content of less than 100 ppb, for example of less than 20 ppb or of less than 5 ppb, particularly preferably of less than 1 ppb, in each case based on the total weight of the core. The density of a core is independent of the density of the each other core. The densities of the cores can be the same or different. Preferably, the densities of all cores are the same.

If a light guide comprises more than one core, then each core is, independently of the other cores, characterised by the above features. It is preferred for all cores to have the same features.

According to the invention, the cores are surrounded by at least one jacket M1. The jacket M1 preferably surrounds the cores over the entire length of the cores. Preferably, the jacket M1 surrounds the cores for at least 95%, for example at least 98% or at least 99%, particularly preferably 100% of the exterior surface, that is to say the entire outer wall, of the cores. Often, the cores are entirely surrounded by the jacket M1 up until the ends (in each case the last 1-5 cm). This serves to protect the cores from mechanical impairment.

The jacket M1 can comprise any material, including silicon dioxide, which has a lower refractive index than at least one point P along the profile of the cross section $Q_K$ of the core. Preferably, this at least one point P in the profile of the cross section $Q_K$ of the core is the point which lies at the centre of the core. Furthermore, preferably, the point P in the profile of the cross section of the core is the point which has a maximum refractive index $n_{Kmax}$ in the core. Preferably, the jacket M1 has a refractive index $n_{M1}$ which is at least 0.0001 lower than the refractive index of the core $n_K$ at the at least one point in the profile of the cross section Q of the core. Preferably, the jacket M1 has a refractive index $n_{M1}$ which is lower than the refractive index of the core $n_K$ by an amount in the range from 0.0001 to 0.5, for example in a range from 0.0002 to 0.4, particularly preferably in a range from 0.0003 to 0.3.

The jacket preferably has a refractive index $n_{M1}$ in a range from 1.0 to 1.599, for example in a range from 1.30 to 1.59, particularly preferably in a range from 1.40 to 1.57. Preferably, the jacket M1 forms a region of the light guide with a constant refractive index $n_{M1}$. A region with a constant refractive index means a region in which the refractive index does not deviate more than 0.0001 from the mean value of the refractive index $n_{M1}$ in this region.

In principle, the light guide can comprise further jackets. Particularly preferably at least one of the further jackets, preferably several or all of them, a refractive index which is lower than the refractive index $n_K$ of each core. Preferably, the light guide has one or two or three or four or more than four further jackets which surround the jacket M1. Preferably, the further jackets which surround the jacket M1 have a refractive index which is lower than the refractive index $n_{M1}$ of the jacket M1.

Preferably, the light guide has one or two or three or four or more than four further jackets which surround the cores and which are surrounded by the jacket M1, i.e. situated between the cores and the jacket M1. Furthermore, preferably, the further jackets situated between the cores and the jacket M1 have a refractive index which is higher than the refractive index $n_{M1}$ of the jacket M1.

Preferably, the refractive index decreases from the core of the light guide to the outermost jacket. The reduction in the refractive index from the core to the outermost jacket can occur in steps or continuously. The reduction in the refractive index can have different sections. Furthermore, preferably, the refractive index can be stepped in at least one section and be continuous in at least one other section. The steps can be of the same or different height. It is certainly possible to arrange sections with increasing refractive index between sections with decreasing refractive index.

The different refractive indices of the different jackets can for example be configured by doping of the jacket M1, of the further jackets and/or of the cores.

Depending on the manner of preparation of a core, a core can already have a first jacket layer M0 following its preparation. This jacket layer M0 which is directly adjacent to the core is sometimes also called an integral jacket layer. The jacket layer M0 is situated closer to the middle point of the core than the jacket M1 and, if they are present, the further jackets. The jacket layer M0 commonly does not serve for light conduction or radiation conduction. Rather, the jacket layer M0 serves more to keep the radiation inside the core, where it is transported. The radiation which is conducted in the core is thus preferably reflected at the interface from the core to the jacket layer M0. This interface from the core to the jacket layer M0 is preferably characterised by a change in refractive index. The refractive index of the jacket layer M0 is preferably lower than the refractive index $n_K$ of the core. Preferably, the jacket layer M0 comprises the same material as the core, but has a lower refractive index to the core on account of doping or of additives.

According to the invention, the jacket M1 is made of silicon dioxide and has
 a) an OH content of less than 10 ppm, for example less than 5 ppm, particularly preferably less than 1 ppm; and
 b) a chlorine content of less than 60 ppm, preferably less than 40 ppm, for example less than 40 ppm or less than 2 ppm or less than 0.5 ppm, particularly preferably less than 0.1 ppm; and
 c) an aluminium content of less than 200 ppb, preferably less than 100 ppb, for example less than 80 ppb, particularly preferably less than 60 ppb,
 wherein the ppb and ppm are each based on the total weight of the jacket M1.

OH content means the content of OH ions in the jacket M1. This includes both permanent and also mobile OH groups. Permanent OH groups means OH groups which are bound covalently to the silicon of the silicon dioxide granulate or covalently bound with further elements which the silicon dioxide granulate comprises. Permanent OH groups are not removed by a temperature treatment in a range from 800 to 1700° C. Mobile OH groups means non-permanent OH groups comprised in the jacket. Mobile OH groups can be removed by tempering at over 800° C., as is later described for the thermal treatment of the silicon dioxide particle or powder.

Preferably, the jacket layer M1 has an OH content of less than 10 ppm, for example less than 5 ppm or of less than 1 ppm or in a range from 1 ppb to 10 ppm or in a range from 1 ppb to 5 ppm, particularly preferably in a range from 1 ppb to 1 ppm.

A chlorine content means the content of elemental chlorine or chloride ions in the jacket M1. Preferably, the jacket M1 has a chlorine content of less than 60 ppm, preferably less than 40 ppm, for example less than 40 ppm or less than 2 ppm or less than 0.5 ppm, particularly preferably less than 0.1 ppm. Often, the chlorine content of the jacket M1 is at least 1 ppb.

An aluminium content means the content of elemental aluminium or aluminium ions in the jacket M1. Preferably, the jacket M1 has less than 200 ppb aluminium, for example less than 100 ppb or of less than 80 ppb or of less than 60 ppb, in a range from 1 to 200 ppb or in a range from 1 to 100 ppb, particularly preferably in a range from 1 to 60 ppb.

In a preferred embodiment of the light guide, the jacket M1 has at least one, preferably several or all of the following features:

d) an ODC content of less than $5 \times 10^{15}/cm^3$, for example in a range from $0.1 \times 10^{15}$ to $3 \times 10^{15}/cm^3$, particularly preferably in a range from $0.5 \times 10^{15}$ to $2.0 \times 10^{15}/cm^3$;

e) a metal content of metals which are different to aluminium of less than 1 ppm, for example less than 0.5 ppm, particularly preferably less than 0.1 ppm;

f) a viscosity (p=1013 hPa) in a range from $\log_{10} (\eta(1200°$ C.$)/dPas)=13.4$ to $\log_{10} (\eta(1200°$ C.$)/dPas)=13.9$ and/or $\log_{10} (\eta(1300°$ C.$)/dPas)=11.5$ to $\log_{10} (\eta(1300°$ C.$)/dPas)=12.1$ and/or $\log_{10} (\eta(1350°$ C.$)/dPas)=1.2$ to $\log_{10} (\eta(1350°$ C.$)/dPas)=10.8$;

g) a curl parameter of more than 6 m;

h) a standard deviation of the OH content of not more than 10%, preferably not more than 5%, based on the OH content a) of the jacket M1;

i) a standard deviation of the Cl content of not more than 10%, preferably not more than 5%, based on the Cl content b) of the jacket M1;

j) a standard deviation of the Al content of not more than 10%, preferably not more than 5%, based on the Al content c) of the jacket M1 k) a refractive index homogeneity of less than $1 \times 10^{-4}$;

l) a transformation point $T_g$ in a range from 1150 to 1250° C., particularly preferably in a range from 1180 to 1220° C., wherein the ppb and ppm are each based on the total weight of the jacket M1.

Preferably, the jacket M1 of light guide has a combination of features selected from the group consisting of: a)b), a)c), a)d), b)c), b)d), c)d), a)b)c), a)b)d), b)c)d) and a)b)c)d).

The abbreviation "ODC" means "oxygen deficient centre". According to the invention, "ODC" means a defect centre in the silicon dioxide of the quartz glass. According to the invention, "ODC content" means the content of ODC's per $cm^3$ of quartz glass, for example of the jacket M1 or of a quartz glass body. ODCs in the quartz glass can be: ≡Si—Si≡ and O=Si.

Preferably, the jacket M1 has an ODC content of less than $5 \times 10^{15}/cm^3$, for example in a range from $0.1 \times 10^{15}$ to $3 \times 10^{15}/cm^3$, particularly preferably in a range from $0.5 \times 10^{15}$ to $2.0 \times 10^{15}/cm^3$, in each case based on the ODC content of the entire jacket M1. The ODC content of the jacket M1 can vary axially, radially or axially and radially. Often, at a measuring point of the jacket M1, variation of up to $10^{14}/cm^3$ can arise, for example up to $0.5 \times 10^{14}/cm^3$, in each case based on the ODC content of the entire jacket M1. Preferably, the variations of the ODC content are below $10^{13}/cm^3$, in each case based on the ODC content of the entire jacket M1. Preferably, in at least 95% of the jacket M1, the ODC content is in a range of less than $5 \times 10^{15}/cm^3$.

Preferably, the jacket M1 has a metal content of metals different to aluminium of less than 1000 ppb, for example less than 500 ppb, particularly preferably less than 100 ppb, in each case based on the total weight of the jacket M1. Often however, the jacket M1 has a metal content of metals different to aluminium of at least 1 ppb. Such metals are for example sodium, lithium, potassium, magnesium, calcium, strontium, germanium, copper, molybdenum, titanium, iron and chromium. These can for example be present as elements, as an ion, or as part of a molecule or of an ion or of a complex.

The jacket M1 can comprise further constituents. Preferably, the jacket M1 comprises less than 500 ppm of further constituents, for example less than 450 ppm, particularly preferably less than 400 ppm, wherein the ppm is in each case based on the total weight of the jacket M1. Examples of further constituents are carbon, fluorine, iodine, bromine and phosphorus. These can be present for example as an element, as an ion, or as part of a molecule or of an ion or of a complex.

Preferably, the jacket M1 comprises less than 50 ppm of carbon, for example less than 40 ppm or less than 30 ppm, particularly preferably less than 20 ppm, in each case based on the total weight of the jacket M1.

Preferably, the jacket M1 has a homogeneously distributed OH content, chlorine content or aluminium content. An indicator for the homogeneity of the jacket M1 is the standard deviation of the OH content, chlorine content or aluminium content. The standard deviation is the measure of the width of spread of the values of a variable, in this case the OH content, chlorine content or aluminium content, about the arithmetic mean. For measuring the standard deviation, the content of the component in question in the sample, e.g. OH, chlorine or aluminium, is measured at at least seven measuring points.

Preferably, the jacket has a refractive index homogeneity of less than $1 \times 10^{-4}$. The refractive index homogeneity is the maximum deviation of the refractive index at each point in the sample, for example of a jacket M1 or of a quartz glass body, based on the mean value of all refractive indices measured in the sample. For measuring the mean value, the refractive index is measured at at least seven measuring points. Preferably, the jacket has a refractive index homogeneity of less than $1 \times 10^{-4}$, for example less than $2 \times 10^{-5}$, particularly preferably less than $1 \times 10^{-5}$.

In a preferred embodiment of the light guide the content by weight of the jacket M1 is at least 60 wt.-%, for example at least 70 wt.-%, particularly preferably at least 80 wt.-%, in each case based on the total weight of the jacket M1 and the cores. Preferably, the content by weight of jacket M1 is at least 60 wt.-%, for example at least 70 wt.-%, particularly preferably at least 80 wt.-%, in each case based on the total weight of the jacket M1, the cores and the further jackets situated between the jacket M1 and the cores. Preferably, the content by weight of jacket M1 is at least 60 wt.-%, for example at least 70 wt.-%, particularly preferably at least 80 wt.-%, in each case based on the total weight of the light guide.

Preferably, the jacket M1 has a density in a range from 2.1 to 2.3 g/cm$^3$, particularly preferably in a range from 2.18 to 2.22 g/cm$^3$.

The jacket M1 surrounds the core or the cores of the light guide. If the light guide comprises only one core, the jacket surrounds the one core. If the light guide comprises more than one core, the jacket can in principle be configured in any form which ensures that all cores are surrounded by the jacket. For example, multiple cores can be present as a bundle. In this case, the bundle is surrounded by the jacket. According to another, preferred, embodiment, the jacket is configured as a matrix. A matrix means a jacket in which the cores are embedded and surrounded by the jacket. In between adjacent cores there is also embedding matrix.

The jacket M1 preferably has the feature combination a)/b)/c)/d) or a)/b)/c)/e) or a)/b)/c)/f), further preferred the feature combination a)/b)/c)/d)/e) or a)/b)/c)/d)/f) or a)/b)/c)/e)/f), further preferably the feature combination a)/b)/c)/d)/e)/f).

The jacket M1 preferably has the feature combination a)/b)/c)/d), wherein the OH content is less than 5 ppm, the chlorine content is less than 40 ppm, the aluminium content is less than 80 ppb and the ODC content is in a range from $0.1 \times 10^{15}$ to $3 \times 10^{15}$/cm$^3$.

The jacket M1 preferably has the feature combination a)/b)/c)/e), wherein the OH content is less than 5 ppm, the chlorine content is less than 40 ppm, the aluminium content is less than 80 ppb and the total content of metals which are different to aluminium is less than 0.1 ppm.

The jacket M1 preferably has the feature combination a)/b)/c)/f), wherein the OH content is less than 5 ppm, the chlorine content is less than 40 ppm, the aluminium content is less than 80 ppb and the viscosity (p=1013 hPa) is in a range from $\log_{10}(\eta(1200°\text{ C.})/\text{dPas})=13.4$ to $\log_{10}(\eta(1200°\text{ C.})/\text{dPas})=13.9$.

The jacket M1 preferably has the feature combination a)/b)/c)/d)/e), wherein the OH content is less than 5 ppm, the chlorine content is less than 40 ppm, the aluminium content is less than 80 ppb, the ODC content is in a range from $0.1 \times 10^{15}$ to $3 \times 10^{15}$/cm$^3$ and the total content of metals which are different to aluminium is less than 0.1 ppm.

The jacket M1 preferably has the feature combination a)/b)/c)/d)/f), wherein the OH content is less than 5 ppm, the chlorine content is less than 40 ppm, the aluminium content is less than 80 ppb, the ODC content is in a range from $0.1 \times 10^{15}$ to $3 \times 10^{15}$/cm$^3$ and the viscosity (p=1013 hPa) is in a range from $\log_{10}(\eta(1200°\text{ C.})/\text{dPas})=13.4$ to $\log_{10}(\eta(1200°\text{ C.})/\text{dPas})=13.9$.

The jacket M1 preferably has the feature combination a)/b)/c)/e)/f), wherein the OH content is less than 5 ppm, the chlorine content is less than 40 ppm, the aluminium content is less than 80 ppb, the total content of metals which are different to aluminium is less than 0.1 ppm and the viscosity (p=1013 hPa) is in a range from $\log_{10}(\eta(1200°\text{ C.})/\text{dPas})=13.4$ to $\log_{10}(\eta(1200°\text{ C.})/\text{dPas})=13.9$.

The jacket M1 preferably has the feature combination a)/b)/c)/d)/e)/f), wherein the OH content is less than 5 ppm, the chlorine content is less than 40 ppm, the aluminium content is less than 80 ppb, the ODC content is in a range from $0.1 \times 10^{15}$ to $3 \times 10^{15}$/cm$^3$, the total content of metals which are different to aluminium is less than 0.1 ppm and the viscosity (p=1013 hPa) is in a range from $\log_{10}(\eta(1200°\text{ C.})/\text{dPas})=13.4$ to $\log_{10}(\eta(1200°\text{ C.})/\text{dPas})=13.9$.

Silicon Dioxide Granulate I

A second aspect of the invention is a silicon dioxide granulate I characterised by the following features:

[A] a chlorine content of less than 200 ppm, preferably less than 150 ppm, for example less than 100 ppm, or of less than 50 ppm, or of less than 1 ppm, or of less than 500 ppb, or of less than 200 ppb, or in a range from 1 ppb to less than 200 ppm, or from 1 ppb to 100 ppm, or from 1 ppb to 1 ppm, or from 10 ppb to 500 ppb, or from 10 ppb to 200 ppb, particularly preferably from 1 ppb to 80 ppb; and

[B] an aluminium content of less than 200 ppb, preferably less than 100 ppb, for example less than 50 ppb or from 1 to 200 ppb or from 1 to 100 ppb, particularly preferably in a range from 1 to 50 ppb;

wherein the ppb and ppm are based on the total weight of the silicon dioxide granulate I.

A powder means particles of dry solid materials with a primary particle size in the range from 1 to less than 100 nm.

The silicon dioxide granulate can be obtained by granulating silicon dioxide powder. A silicon dioxide granulate commonly has a BET surface area of 3 m$^2$/g or more and a density of less than 1.5 g/cm$^3$. Granulating means transforming powder particles into granules. During granulation, clusters of multiple silicon dioxide powder particles, i.e. larger agglomerates, form which are referred to as "silicon dioxide granules". These are often also called "silicon dioxide granulate particles" or "granulate particles". Collectively, the granules form a granulate, e.g. the silicon dioxide granules form a "silicon dioxide granulate". The silicon dioxide granulate has a larger particle diameter than the silicon dioxide powder.

The granulation procedure, for transforming a powder into a granulate, will be described in more detail later.

Silicon dioxide grain in the present context means silicon dioxide particles which are obtainable by reduction in size of a silicon dioxide body, in particular of a quartz glass body. A silicon dioxide grain commonly has a density of more than 1.2 g/cm$^3$, for example in a range from 1.2 to 2.2 g/cm$^3$, and particularly preferably of about 2.2 g/cm$^3$. Furthermore, the BET surface area of a silicon dioxide grain is preferably generally less than 1 m$^2$/g, determined according to DIN ISO 9277:2014-01.

In principle, all silicon dioxide particles which are considered to be suitable by the skilled man can be selected. Preferred are silicon dioxide granulate and silicon dioxide grain.

Particle diameter or particle size mean the diameter of a particle, given as the "area equivalent circular diameter $\chi_{Ai}$" according to the formula $$x_{Ai} = \sqrt{\frac{4A_i}{\pi}},$$

wherein Ai stands for the surface area of the observed particle by means of image analysis. Suitable methods for the measurement are for example ISO 13322-1:2014 or ISO 13322-2:2009. Comparative disclosures such as "greater particle diameter" always mean that the values being compared are measured by the same method.

In a preferred embodiment of the silicon dioxide granulate I, it is characterised by at least one, preferably several or all of the following features:

[C] a metal content of metals which are different to aluminium of less than 1000 ppb, preferably in a range from 40 to 900 ppb, for example in a range from 50 to 700 ppb, particularly preferably in a range from 60 to 500 ppb;

[D] a BET surface area in a range from 20 to 50 m$^2$/g, for example in a range from 20 to 40 m$^2$/g; particularly preferably in a range from 25 to 35 m$^2$/g; wherein the micro pore content preferably accounts for a BET surface area in a range from 4 to 5 m$^2$/g; for example in a range from 4.1 to 4.9 m$^2$/g; particularly preferably in a range from 4.2 to 4.8 m$^2$/g;

[E] a pore volume in a range from 0.1 to 1.5 mL/g, for example in a range from 0.15 to 1.1 mL/g; particularly preferably in a range from 0.2 to 0.8 mL/g;

[F] a residual moisture content of less than 10 wt.-%, preferably in a range from 0.01 wt.-% to 5 wt.-%, for example from 0.02 to 1 wt.-%, particularly preferably from 0.03 to 0.5 wt.-%;

[G] a bulk density in a range from 0.5 to 1.2 g/cm$^3$, for example in a range from 0.6 to 1.1 g/cm$^3$, particularly preferably in a range from 0.7 to 1.0 g/cm$^3$;

[H] a tamped density in a range from 0.5 to 1.2 g/cm$^3$, for example in a range from 0.6 to 1.1 g/cm$^3$, particularly preferably in a range from 0.75 to 1.0 g/cm$^3$;

[I] a carbon content of less than 50 ppm;

[J] a particle size distribution $D_{10}$ in a range from 50 to 150 µm;

[K] a particle size distribution $D_{50}$ in a range from 150 to 300 µm;

[L] a particle size distribution $D_{90}$ in a range from 250 to 620 µm, wherein the wt.-%, ppb and ppm are based on the total weight of the silicon dioxide granulate I.

Furthermore preferably, the granules of the silicon dioxide granulate I have a spherical morphology. A spherical morphology means a round to oval form of the particle. The granules of the silicon dioxide granulate I preferably have a mean sphericity in a range from 0.7 to 1.3 SPHT3, for example a mean sphericity in a range from 0.8 to 1.2 SPHT3, particularly preferably a mean sphericity in a range from 0.85 to 1.1 SPHT3. The feature SPHT3 is described in the test methods.

Furthermore preferably, the granules of the silicon dioxide granulate have a mean symmetry in a range from 0.7 to 1.3 Symm3, for example a mean symmetry in a range from 0.8 to 1.2 Symm3, particularly preferably a mean symmetry in a range from 0.85 to 1.1 Symm3. The feature of the mean symmetry Symm3 is described in the test methods.

The silicon dioxide granulate I can comprise further constituents, for example in the form of molecules, ions or elements. Preferably, the silicon dioxide granulate I comprises less than 500 ppm of further constituents, for example less than 200 ppm, particularly preferably less than 100 ppm, in each case based on the total weight of the silicon dioxide granulate I. The further constituents can be selected from the group consisting of carbon, fluoride, iodide, bromide, phosphorus or a mixture of at least two thereof. Preferably, the silicon dioxide granulate I comprises less than 50 ppm carbon, for example less than 40 ppm or less than 30 ppm, particularly preferably less than 20 ppm, in each case based on the total weight of the silicon dioxide granulate I. Preferably, the silicon dioxide granulate I comprises less than 100 ppm of constituents other than silicon dioxide, OH ions, chlorine/chloride, or aluminium, for example less than 70 ppm, particularly preferably less than 50 ppm, in each case based on the total weight of the silicon dioxide granulate I.

The silicon dioxide granulate I preferably has a density in a range from 2.1 to 2.3 g/cm$^3$, particularly preferably in a range from 2.18 to 2.22 g/cm$^3$.

The definition of the bulk density and of the tamped density is as for the process for the preparation of silicon dioxide granulates.

The silicon dioxide granulate I preferably has a mean particle size in a range from 200 to 300 µm, for example in a range from 220 to 280 µm, particularly preferably in a range from 230 to 270 µm.

The silicon dioxide granulate I preferably has a particle size $D_{50}$ in a range from 150 to 300 µm, for example in a range from 180 to 280 µm, particularly preferably in a range from 220 to 270 µm. Furthermore preferably, the silicon dioxide granulate I has a particle size $D_{10}$ in a range from 50 to 150 µm, for example in a range from 80 to 150 µm, particularly preferably in a range from 100 to 150 µm. Furthermore preferably, the silicon dioxide granulate I has a particle size $D_{90}$ in a range from 250 to 620 µm, for example in a range from 280 to 550 µm, particularly preferably in a range from 300 to 450 µm.

The silicon dioxide granulate I preferably has the feature combination [A]/[B]/[D] or [A]/[B]/[G] or [A]/[B]/[K], further preferred the feature combination [A]/[B]/[D]/[G] or [A]/[B]/[D]/[K] or [A]/[B]/[G]/[K], further preferably the feature combination [A]/[B]/[D]/[G]/[K].

The silicon dioxide granulate I preferably has the feature combination [A]/[B]/[D], wherein the chlorine content is less than 100 ppm, the aluminium content is less than 100 ppb and the BET surface area is in a range from 10 to 40 m$^2$/g.

The silicon dioxide granulate I preferably has the feature combination [A]/[B]/[G], wherein the chlorine content is less than 100 ppm, the aluminium content is less than 100 ppb and the bulk density is in a range from 0.6 to 1.1 g/cm$^3$.

The silicon dioxide granulate I preferably has the feature combination [A]/[B]/[K], wherein the chlorine content is less than 100 ppm, the aluminium content is less than 100 ppb and the particle size distribution $D_{50}$ is in a range from 150 to 300 µm.

The silicon dioxide granulate I preferably has the feature combination [A]/[B]/[D]/[G], wherein the chlorine content is less than 100 ppm, the aluminium content is less than 100 ppb, the BET surface area is in a range from 10 to 40 m$^2$/g and the bulk density is in a range from 0.6 to 1.1 g/cm$^3$.

The silicon dioxide granulate I preferably has the feature combination [A]/[B]/[D]/[K], wherein the chlorine content is less than 100 ppm, the aluminium content is less than 100 ppb, the BET surface area is in a range from 10 to 40 m$^2$/g and the particle size distribution $D_{50}$ is in a range from 150 to 300 µm.

The silicon dioxide granulate I preferably has the feature combination [A]/[B]/[G]/[K], wherein the chlorine content is less than 100 ppm, the aluminium content is less than 100 ppb, the bulk density is in a range from 0.6 to 1.1 g/cm$^3$ and the particle size distribution $D_{50}$ is in a range from 150 to 300 µm.

The silicon dioxide granulate I preferably has the feature combination [A]/[B]/[D]/[G]/[K], wherein the chlorine content is less than 100 ppm, the aluminium content is less than 100 ppb, the BET surface area is in a range from 10 to 40 m$^2$/g, the bulk density is in a range from 0.6 to 1.1 g/cm$^3$ and the particle size distribution $D_{50}$ is in a range from 150 to 300 µm.

Particle size means the size of the particles of aggregated primary particles, which are present in a silicon dioxide powder, in a slurry or in a silicon dioxide granulate. The mean particle size means the arithmetic mean of all particle sizes of the material in question. The $D_{50}$ value indicates that 50% of the particles, based on the total number of particles, are smaller than the indicated value. The $D_{10}$ value indicates that 10% of the particles, based on the total number of particles, are smaller than the indicated value. The $D_{90}$ value indicates that 90% of the particles, based on the total number of particles, are smaller than the indicated value. The particle size is measured by the dynamic photo analysis process according to ISO 13322-2:2006-11.

A third aspect of the invention relates to a process for the preparation of silicon dioxide granulate I. The process comprises the following steps:
  I. Providing a silicon dioxide powder;
  II. Providing a liquid;
  III. Mixing the components from steps I. and II. to obtain a slurry; and
  IV. Spray drying, preferably spray granulate, of the slurry to obtain a silicon dioxide granulate I.

The silicon dioxide powder has the following features:
  a. a chlorine content of less than 200 ppm, for example in the range from 1 ppb to 150 ppm, or from 10 ppb to 100 ppm, particularly preferably in the range from 100 ppb to 80 ppm, in each case based on the total weight of the silicon dioxide powder; and
  b. an aluminium content of less than 200 ppb, for example in the range from 1 to 150 ppb or from 1 to 100 ppb, particularly preferably in the range from 1 to 80 ppb, in each case based on the total weight of the silicon dioxide powder,
wherein the ppb and ppm are each based on the total weight of the silicon dioxide powder.

The silicon dioxide powder preferably has at least one, for example at least two or at least three or at least four, particularly preferably all of the following features:
  c. a BET surface area in a range from 20 to 60 m²/g, for example from 25 to 55 m²/g, or from 30 to 50 m²/g, particularly preferably from 20 to 40 m²/g;
  d. a bulk density in a range from 0.01 to 0.3 g/cm³, for example in the range from 0.02 to 0.2 g/cm³, preferably in the range from 0.03 to 0.15 g/cm³;
  e. a carbon content of less than 50 ppm;
  f. a total content of metals which are different to aluminium of less than 5 ppm, for example less than 2 ppm, particularly preferably in a range from 1 ppb to 1 ppm;
  g. at least 70 wt.-% of the powder particles have a primary particle size in a range from 10 to 100 nm, for example in the range from 15 to less than 100 nm, particularly preferably in the range from 20 to less than 100 nm;
  h. a tamped density in a range from 0.001 to 0.3 g/cm³, for example in the range from 0.002 to 0.2 g/cm³ or from 0.005 to 0.1 g/cm³, preferably in the range from 0.01 to 0.06 g/cm³;
  i. a residual moisture content of less than 5 wt.-%, for example in the range from 0.25 to 3 wt.-%, particularly preferably in the range from 0.5 to 2 wt.-%;
  j. a particle size distribution $D_{10}$ in the range from 1 to 7 µm, for example in the range from 2 to 6 µm or in the range from 3 to 5 µm, particularly preferably in the range from 3.5 to 4.5 µm;
  k. a particle size distribution $D_{50}$ in the range from 6 to 15 µm, for example in the range from 7 to 13 µm or in the range from 8 to 11 µm, particularly preferably in the range from 8.5 to 10.5 µm;
  l. a particle size distribution $D_{90}$ in the range from 10 to 40 µm, for example in the range from 15 to 35 µm, particularly preferably in the range from 20 to 30 µm;
wherein the wt.-%, ppb and ppm are each based on the total weight of the silicon dioxide powder.

Silicon Dioxide Powder

Silicon dioxide primary particles accumulate as so called "Soot" in the preparation of synthetic quartz glass. "Soot" can be deposited during the operation of flame hydrolysis burners. For this, a rotating carrier tube with a cylinder jacket surface is moved back and forth along a row of burners. For this, oxygen and hydrogen can be fed to the flame hydrolysis burners as fuel as well as the starting materials for forming the silicon dioxide particles. The silicon dioxide primary particles produced by the flame hydrolysis aggregate and agglomerate to yield silicon dioxide soot particles with particle sizes in the nano region. These silicon dioxide soot particles are deposited on the cylinder jacket layer of the carrier tube which is rotating about its length axis, whereby gradually, sheet by sheet, a so called soot body is built up. Another part of the silicon dioxide soot particles does not end up being formed into the soot body, but ends up being extracted into a filtering system. These silicon dioxide soot particles accumulate as so called "soot dust". The "soot dust" is often a by-product of the process for the preparation of quartz glass via the previously mentioned soot body route. The by-product is often disposed of at a cost and with effort. In the case of the present invention, it can be employed as starting material and is referred to in the following as "silicon dioxide powder".

Therefore, soot dust which is produced as a by-product in the preparation of quartz glass is a source of the "silicon dioxide powder" in the claims according to the invention.

I Deliberately producing silicon dioxide powder as soot dust by flame hydrolysis is an alternative means of synthisising silicon dioxide powder. In this case, the silicon dioxide particles formed in the flame hydrolysis are removed before agglomerates or aggregates form. In this case, soot dust is the primary product. This is a second source for the silicon dioxide powder in the claims according to the invention.

Suitable raw materials for creating the silicon dioxide powder are preferably siloxanes, silicon alkoxides and inorganic silicon compounds. Siloxanes mean linear and cyclic polyalkylsiloxanes. Preferably, polyalkylsiloxanes have the general formula $$Si_pO_pR_{2p},$$

wherein p is an integer of at least 2, preferably from 2 to 10, particularly preferably from 3 to 5, and R is an alkyl group with 1 to 8 C-atoms, preferably with 1 to 4 C-atoms, particularly preferably a methyl group.

Particularly preferred are siloxanes selected from the group consisting of hexamethyldisiloxane (D3), hexamethylcyclotrisiloxane (D4), octamethylcyclotetrasiloxane, and decamethylcyclopentasiloxane (D5) or a combination of two or more thereof. If the siloxane comprises D3, D4 and D5, then D4 is preferably the main component. The main component is preferably present in an amount of at least 70 wt.-%, preferably of at least 80 wt.-%, for example of at least 90 wt.-% or of at least 94 wt.-%, particularly preferably of at least 98 wt.-%, in each case based on the total amount of the silicon dioxide powder. Preferred silicon alkoxides are tetramethoxysilane and methyltrimethoxysilane. Preferred inorganic silicon compounds as raw material for silicon dioxide powder are silicon halogenides, silicates, silicon carbide and silicon nitride. Particularly preferred inorganic silicon compounds as raw material for silicon dioxide powder are $SiCl_4$ and $SiHCl_3$.

The silicon dioxide powder contains silicon dioxide. Preferably, the silicon dioxide powder contains a proportion of silicon dioxide of more than 95 wt.-%, for example more than 98 wt.-% or more than 99 wt.-% or more than 99.9 wt.-%, in each case based on the total weight of the silicon dioxide powder. Particularly preferably, the silicon dioxide powder contains a proportion of silicon dioxide of more than 99.99 wt.-%, based on the total weight of the silicon dioxide powder.

Preferably, the silicon dioxide powder has a metal content of metals different to aluminium of less than 1000 ppb, for example less than 800 ppb or less than 500 ppb or less than 300 ppb, particularly preferably less than 150 ppb, in each case based on the total weight of the silicon dioxide powder. Often however, the silicon dioxide powder has a metal content of metals different to aluminium of at least 1 ppb. Such metals are for example sodium, lithium, potassium, magnesium, calcium, strontium, germanium, copper, molybdenum, titanium, iron and chromium. These can be present for example as element, as ion, or as part of a molecule or ion or complex.

Preferably, the silicon dioxide powder has a total content of impurities of less than 1000 ppb, for example less than 700 ppb or of less than 500 ppb or less than 300 ppb, and particularly preferably less than 200 ppb, the ppb in each case based on the total weight of the silicon dioxide powder.

Preferably, at least 70% of the powder particles of the silicon dioxide powder, based on the number of powder particles, have a primary particle size of less than 100 nm, for example in the range from 10 to less than 100 nm or from 15 to less than 100 nm, and particularly preferably in the range from 20 to less than 100 nm. The primary particle size is measured by dynamic light scattering according to ISO 13320:2009-10.

Preferably at least 75% of the powder particles of the silicon dioxide powder, based on the number of powder particles, have a primary particle size of less than 100 nm, for example in the range from 10 to less than 100 nm or from 15 to less than 100 nm, and particularly preferably in the range from 20 to less than 100 nm.

Preferably, at least 80% of the powder particles of the silicon dioxide powder, based on the number of powder particles, have a primary particle size of less than 100 nm, for example in the range from 10 to less than 100 nm or from 15 to less than 100 nm, and particularly preferably in the range from 20 to less than 100 nm.

Preferably, at least 85% of the powder particles of the silicon dioxide powder, based on the number of powder particles, have a primary particle size of less than 100 nm, for example in the range from 10 to less than 100 nm or from 15 to less than 100 nm, and particularly preferably in the range from 20 to less than 100 nm Preferably, at least 90% of the powder particles of the silicon dioxide powder, based on the number of powder particles, have a primary particle size of less than 100 nm, for example in the range from 10 to less than 100 nm or from 15 to less than 100 nm, and particularly preferably in the range from 20 to less than 100 nm.

Preferably, at least 95% of the powder particles of the silicon dioxide powder, based on the number of powder particles, have a primary particle size of less than 100 nm, for example in the range from 10 to less than 100 nm or from 15 to less than 100 nm, and particularly preferably in the range from 20 to less than 100 nm.

Preferably, the silicon dioxide powder has a particle size $D_{10}$ in the range from 1 to 7 μm, for example in the range from 2 to 6 μm or in the range from 3 to 5 μm, particularly preferably in the range from 3.5 to 4.5 μm. Preferably, the silicon dioxide powder has a particle size $D_{50}$ in the range from 6 to 15 μm, for example in the range from 7 to 13 μm or in the range from 8 to 11 μm, particularly preferably in the range from 8.5 to 10.5 μm. Preferably, the silicon dioxide powder has a particle size $D_{90}$ in the range from 10 to 40 μm, for example in the range from 15 to 35 μm, particularly preferably in the range from 20 to 30 μm.

If the starting material for the silicon dioxide powder is a mixture comprising D3, D4 and D5, silicon dioxide powder preferably comprises D3 and D5 in a ratio in the range from 1:100 to 100:1, for example in a ratio in the range from 1:50 to 50:1 or 1:25 to 25:1, particularly preferably in a ratio in the range from 1:10 to 10:1.

Preferably, the silicon dioxide powder has a specific surface area (BET surface area) in a range from 10 to 60 $m^2/g$, for example from 15 to 50 $m^2/g$, particularly preferably from 20 to 40 $m^2/g$. The BET surface area is measured by the method of Brunauer, Emmet and Teller (BET) according to DIN ISO 9277:2014-01 and based on gas absorption at the surface under investigation.

Preferably, the silicon dioxide powder has a pH value of less than 7, for example in the range from 3 to 6.5 or from 3.5 to 6 or from 4 to 5.5, particularly preferably in the range from 4.5 to 5. The pH value can by means of a single rod measuring electrode (4 wt.-% silicon dioxide powder in water).

The silicon dioxide powder preferably has the feature combination a./b./c. or a./b./d. or a./b./e., further preferred the feature combination a./b./c./d. or a./b./c./e. or a./b./d./e., further preferably the feature combination a./b./c./e./e.

The silicon dioxide powder preferably has the feature combination a./b./c., wherein the chlorine content is in a range from 1 ppb to 150 ppm, the aluminium content is in a range from 1 to 150 ppb and the BET surface area is in a range from 20 to 40 $m^2/g$.

The silicon dioxide powder preferably has the feature combination a./b./d., wherein the chlorine content is in a range from 1 ppb to 150 ppm, the aluminium content is in a range from 1 to 150 ppb and the particle size distribution D50 is in a range from 7 to 13 μm.

The silicon dioxide powder preferably has the feature combination a./b./e., wherein the chlorine content is in a range from 1 ppb to 150 ppm, the aluminium content is in a range from 1 to 150 ppb and the bulk density is in a range from 0.02 to 0.2 $g/cm^3$.

The silicon dioxide powder further preferably has the feature combination a./b./c./d., wherein the chlorine content is in a range from 1 ppb to 150 ppm, the aluminium content is in a range from 1 to 150 ppb, the BET surface area is in a range from 20 to 40 $m^2/g$ and the particle size distribution D50 is in a range from 7 to 13 μm.

The silicon dioxide powder further preferably has the feature combination a./b./c./e., wherein the chlorine content is in a range from 1 ppb to 150 ppm, the aluminium content is in a range from 1 to 150 ppb, the BET surface area is in a range from 20 to 40 $m^2/g$ and the bulk density is in a range from 0.02 to 0.2 $g/cm^3$.

The silicon dioxide powder further preferably has the feature combination a./b./d./e., wherein the chlorine content is in a range from 1 ppb to 150 ppm, the aluminium content is in a range from 1 to 150 ppb, the particle size distribution $D_{50}$ is in a range from 7 to 13 μm and the bulk density is in a range from 0.02 to 0.2 $g/cm^3$.

The silicon dioxide powder has particularly preferably the feature combination a./b./c./d./e., wherein the chlorine content is in a range from 1 ppb to 150 ppm, the aluminium content is in a range from 1 to 150 ppb, the BET surface area is in a range from 20 to 40 m$^2$/g, the particle size distribution $D_{50}$ is in a range from 7 to 13 μm and the bulk density is in a range from 0.02 to 0.2 g/cm$^3$.

Liquid

The liquid is preferably selected from the group consisting of solvents in which the solubility of the silicon dioxide powder is less than 0.5 g/L solvent, preferably less than 0.25 g/L solvent, particularly preferably less than 0.15 g/L solvent.

Suitable liquids are for example polar solvents. Preferably, the liquid is selected from the group consisting of water, methanol, ethanol, n-propanol, iso-propanol, n-butanol, tert-butanol and more than one thereof. Particularly preferably, the liquid is water. Particularly preferably, the liquid is distilled or deionized water.

Slurry

The silicon dioxide powder is processed further to obtain a slurry. "Slurry" means a suspension of the liquid and the silicon dioxide powder. The silicon dioxide powder is almost insoluble in the liquid at room temperature, but can be introduced into the liquid in high weight proportions to obtain the slurry.

The silicon dioxide powder and the liquid can be mixed in any manner. For example, the silicon dioxide powder can be added to the liquid or the liquid to the silicon dioxide powder and subsequently stirred or shaken. Preferably, the silicon dioxide powder can be added to the liquid under stirring. Further preferably, a part of the silicon dioxide powder can be added to the liquid and the mixture so obtained can be mixed with the remaining part of the silicon dioxide powder. Also, a part of the liquid can be added to the silicon dioxide powder and the mixture so obtained can be mixed with the remaining part of the liquid.

By mixing the silicon dioxide powder and the liquid, a slurry of the silicon dioxide powder in the liquid is obtained. Preferably, the slurry is a suspension, in which the silicon dioxide powder is homogeneously distributed in the liquid. "Homogeneous" means that the density and composition of the slurry at each point varies by not more than 10% from the average density and composition, in each case based on the total amount of slurry.

Preferably, the slurry has a weight per litre in the range 1000 to 2000 g/L, for example in the range from 1200 to 1900 g/L or from 1300 to 1800 g/L, particularly preferably in the range from 1400 to 1700 g/L. The weight per litre is measured by weighing a volume calibrated container.

Preferably, the slurry has an isoelectric point of less than 7, for example in the range from 1 to 5 or in the range from 2 to 4, particularly preferably in the range from 3 to 3.5. "Isoelectric point" means the pH value, at which the zeta potential has the value 0. At this pH value, the surface of the solid suspended in the liquid carries no electrical charges. At a pH value above the isoelectric point, the surface of the solid suspended in the liquid is negatively charged, at a pH below the isoelectric point it is positively charged. The zeta potential is measured according to ISO 13099-2:2012.

Preferably, the slurry can have a pH set to a value of at least 7, for example of more than 7 or a pH value in the range from 7.5 to 13 or from 8 to 11, particularly preferably from 8.5 to 10. Preferably, the pH value of the slurry can be set using NaOH or NH$_3$, for example as aqueous solution.

Preferably, the solids content of the slurry is at least 40 wt.-%, for example in the range from 45 to 90 wt.-%, or from 50 to 80 wt.-%, or from 55 to 75 wt.-%, or particularly preferably in the range from 60 to 70 wt.-%, in each case based on the total weight of the slurry.

At a solids content of 30 wt.-% in water, the viscosity of the slurry lies in a range from 500 to 2000 mPa·s, for example in the range from 600 to 1700 mPa·s, particularly preferably in the range from 1000 to 1600 mPa·s. The viscosity is measured according to D1N53019-1 (30%, 23° C., water, 5 rpm).

Preferably, the slurry has a thixotropic behaviour. The thixotropic index is in the range from 3 to 6, for example in the range from 3.5 to 5, particularly preferably in the range from 4.0 to 4.5. The thixotropic index is measured according to DIN SPEC 91143-2 (30%, 23° C., water, 5 rpm, 50 rpm).

The silicon dioxide powder is formed in the slurry by clustering of two or more powder particles. Preferably, the particles have a mean particle size in the range from 100 to 500 nm in a 4 wt.-% aqueous slurry, particularly preferably in the range from 200 to 300 nm. Preferably, the particles have a particle size $D_{10}$ in the range from 50 to 250 nm in a 4 wt.-% aqueous slurry, particularly preferably in the range from 100 to 150 nm. Preferably, the particles have a particle size $D_{50}$ in the range from 100 to 400 nm in a 4 wt.-% aqueous slurry, particularly preferably in the range from 200 to 250 nm. Preferably, the particles have a particle size $D_{90}$ in the range from 200 to 600 nm in a 4 wt.-% aqueous slurry, particularly preferably in the range from 350 to 400 nm.

Granulation

The silicon dioxide granulate is obtained from the silicon dioxide powder by granulation. Granulation means the transformation of powder particles into granules. During granulation, larger agglomerates which are referred to as "silicon dioxide granules" are formed by agglomeration of multiple silicon dioxide powder particles. These are often also called "silicon dioxide particles", "silicon dioxide granulate particles" or "granulate particles". Collectively, granules make up a granulate, e.g. the silicon dioxide granules make up a "silicon dioxide granulate".

In the present case, any granulation process which is known to the skilled man and appears to him to be suitable for the granulation of silicon dioxide powder can in principle be selected. Granulation processes can be categorised as agglomeration granulation processes or press granulation processes, and further categorised as wet and dry granulation processes. Known methods are roll granulation in a granulation plate, spray granulation, centrifugal pulverisation, fluidised bed granulation, granulation processes employing a granulation mill, compactification, roll pressing, briquetting, scabbing or extruding.

Preferably, a silicon dioxide granulate is formed in the processing which has granules having a spherical morphology; wherein the process is further preferably performed by spray granulation or roll granulation. Further preferably, a silicon dioxide granulate with granules having a spherical morphology comprises at most 50% of granules, preferably at most 40% of granules, further preferred at most 20% of granules, more preferably between 0 and 50%, between 0 and 40% or between 0 and 20%, or between 10 and 50%, between 10 and 40% or between 10 and 20% of granules not having a spherical morphology, the percentages in each case based on the total number of granules in the granulate. The granules with a spherical morphology have the SPHT3 values described in the description.

Spray Drying

Preferably, silicon dioxide granules are obtained by spray granulation, also referred to as spray drying. The spray drying belongs to the group of wet granulation processes.

During the spray drying, the slurry is sprayed under pressure and temperature in a gas flow. Drops of the slurry form, which dry immediately due to the direct and intensive heat exchange. First, dry minute particle form ("nuclei"), which are maintained in a floating state as a fluidised bed and form a surface for drying further droplets.

The pressure is preferably in the range from 1 to 40 bar, for example in the range from 5 to 35 bar or from 10 to 30 bar, or particularly preferably in the range from 14 to 28 bar, wherein the pressure is given as an absolute pressure.

The gas flow is preferably made of air, an inert gas, at least two inert gases or a combination of air with at least one inert gas, preferably a combination of air with at least two inert gases. Inert gasses are preferably selected from the list consisting of nitrogen, helium, neon, argon, krypton and xenon. For example, the gas flow is preferably made of air, nitrogen or argon, particularly preferably air.

The gas flow preferably has a temperature from 100° C. to 600° C., for example from 200° C. to 550° C. or from 300° C. to 500° C., or particularly preferably a temperature from 350° C. to 450° C.

Each of the silicon dioxide granules so obtained is present as an agglomerate of individual particles of silicon dioxide powder. The mean particle size of the individual particles of the silicon dioxide powder is preferably in the range from 150 to 300 µm, for example in the range from 170 to 250 µm, or particularly preferably in the range from 180 to 240 µm. The mean particle size of these particles can be measured according to ISO 13322-2:2006-11.

The spray drying can be carried out in the presence of auxiliaries such as binding agents. In principle, any materials which are known to the skilled person and which appear suitable for the present purpose can be employed as auxiliaries. Examples of suitable binding agents are metal oxides such as calcium oxide, metal carbonates such as calcium carbonate and polysaccharides such as cellulose, cellulose ether, starch and starch derivatives. Particularly preferably, the spray drying is carried out without auxiliaries.

A fourth aspect of the present invention is a silicon dioxide granulate I obtainable by the process according to the third aspect of the invention.

A silicon dioxide granule which is obtainable by this process preferably has the features described in the context of the third aspect of the invention.

Silicon Dioxide Granulate II

A fifth aspect of the invention is a silicon dioxide granulate II characterised by following features:
(A) a chlorine content of less than 500 ppm, preferably less than 400 ppm, for example less than 350 ppm or preferably less than 330 ppm or in a range from 1 ppb to 500 ppm or from 1 ppb to 450 ppm particularly preferably from 1 ppb to 300 ppm;
(B) an aluminium content of less than 200 ppb, for example less than 150 ppb or of less than 100 ppb or from 1 to 150 ppb or from 1 to 100 ppb, particularly preferably in a range from 1 to 80 ppb;
wherein the ppb and ppm are each based on the total weight of the silicon dioxide granulate II.

In a preferred embodiment, the silicon dioxide granulate II is characterised by at least one of the following features:
(C) a metal content of metals which are different to aluminium of less than 1000 ppb, for example in a range from 1 to 400 ppb, particularly preferably in a range from 1 to 200 ppb, in each case based on the total weight of the silicon dioxide granulate II;
(D) a BET surface area in a range from 10 to 35 m$^2$/g, for example in a range from 10 to 30 m$^2$/g, particularly preferably in a range from 20 to 30 m$^2$/g; wherein the micro pore contribution preferably accounts for a BET surface area in a range from 1 to 2 m$^2$/g; for example in a range from 1.2 to 1.9 m$^2$/g; particularly preferably in a range from 1.3 to 1.8 m$^2$/g;
(E) a pore volume in a range from 0.1 to 2.5 mL/g, for example in a range from 0.2 to 1.5 mL/g; particularly preferably in a range from 0.4 to 1 mL/g;
(F) a residual moisture content of less than 3 wt.-%, for example in a range from 0.001 wt.-% to 2 wt.-%, particularly preferably from 0.01 to 1 wt.-%;
(G) a bulk density in a range from 0.7 to 1.2 g/cm$^3$, for example in a range from 0.75 to 1.1 g/cm$^3$, particularly preferably in a range from 0.8 to 1.0 g/cm$^3$;
(H) a tamped density in a range from 0.7 to 1.2 g/cm$^3$, for example in a range from 0.75 to 1.1 g/cm$^3$, particularly preferably in a range from 0.8 to 1.0 g/cm$^3$;
(I) a particle size D50 in a range from 150 to 250 µm;
(J) a carbon content of less than 5 ppm, for example less than 4.5 ppm, particularly preferably less than 4 ppm;
wherein the wt.-%, ppb and ppm are each based on the total weight of the silicon dioxide granulate II.

The silicon dioxide granulate II can comprise further constituents, for example in the form of molecules, ions or elements. Preferably, the silicon dioxide granulate II comprises less than 500 ppm of further constituents, for example less than 300 ppm, particularly preferably less than 100 ppm, in each case based on the total weight of the silicon dioxide granulate II. Often, at least 1 ppb of other constituents are contained. The further constituents can be selected from the group consisting of carbon, fluoride, iodide, bromide, phosphorus or a mixture of at least two therefrom. Preferably, the silicon dioxide granulate II comprises less than 40 ppm carbon, for example less than 30 ppm, particularly preferably less than 20 ppm, in each case based on the total weight of the silicon dioxide granulate II. Preferably, the silicon dioxide granulate II comprises less than 100 ppm of constituents other than silicon dioxide, OH ions, chlorine/chloride or aluminium, for example less than 80 ppm, particularly preferably less than 70 ppm, in each case based on the total weight of the silicon dioxide granulate II.

The silicon dioxide granulate II preferably has a density in a range from 0.5 to 2.0 g/cm$^3$, for example from 0.6 to 1.5 g/cm$^3$, particularly preferably from 0.8 to 1.2 g/cm$^3$. The density is measured as described in the test methods.

The silicon dioxide granulate II preferably has a particle size $D_{50}$ in a range from 150 to 250 µm, for example in a range from 180 to 250 µm, particularly preferably in a range from 200 to 250 µm. Furthermore preferably, the silicon dioxide granulate II has a particle size $D_{10}$ in a range from 50 to 150 µm, for example in a range from 80 to 150 µm, particularly preferably in a range from 100 to 150 µm. Furthermore preferably, the silicon dioxide granulate II has a particle size $D_{90}$ in a range from 250 to 450 µm, for example in a range from 280 to 420 µm, particularly preferably in a range from 300 to 400 µm.

The silicon dioxide granulate II preferably has the feature combination (A)/(B)/(D) or (A)/(B)/(H) or (A)/(B)/(I), further preferred the feature combination (A)/(B)/(D)/(H) or (A)/(B)/(D)/(I) or (A)/(B)/(H)/(I), further preferably the feature combination (A)/(B)/(D)/(H)/(I).

The silicon dioxide granulate II preferably has the feature combination (A)/(B)/(D), wherein the chlorine content is less than 350 ppm, the aluminium content is less than 100 ppb and the BET surface area is in a range from 10 to 30 m$^2$/g.

The silicon dioxide granulate II preferably has the feature combination (A)/(B)/(H), wherein the chlorine content is less than 350 ppm, the aluminium content is less than 100 ppb and the tamped density is in a range from 0.75 to 1.1 g/cm$^3$.

The silicon dioxide granulate II preferably has the feature combination (A)/(B)/(I), wherein the chlorine content is less than 350 ppm, the aluminium content is less than 100 ppb and the particle size distribution $D_{50}$ is in a range from 150 to 250 μm.

The silicon dioxide granulate II preferably has the feature combination (A)/(B)/(D)/(H), wherein the chlorine content is less than 350 ppm, the aluminium content is less than 100 ppb, the BET surface area is in a range from 10 to 30 m$^2$/g and the tamped density is in a range from 0.75 to 1.1 g/cm$^3$.

The silicon dioxide granulate II preferably has the feature combination (A)/(B)/(D)/(I), wherein the chlorine content is less than 350 ppm, the aluminium content is less than 100 ppb, the BET surface area is in a range from 10 to 30 m$^2$/g and the particle size distribution $D_{50}$ is in a range from 150 to 250 μm.

The silicon dioxide granulate II preferably has the feature combination (A)/(B)/(H)/(I), wherein the chlorine content is less than 350 ppm, the aluminium content is less than 100 ppb, the tamped density is in a range from 0.75 to 1.1 g/cm$^3$ and the particle size distribution $D_{50}$ is in a range from 150 to 250 μm.

The silicon dioxide granulate II preferably has the feature combination (A)/(B)/(D)/(H)/(I), wherein the chlorine content is less than 350 ppm, the aluminium content is less than 100 ppb, the BET surface area is in a range from 10 to 30 m$^2$/g, the tamped density is in a range from 0.75 to 1.1 g/cm$^3$ and the particle size distribution $D_{50}$ is in a range from 150 to 250 μm.

A sixth aspect of the present invention is a process for the preparation of a silicon dioxide granulate II. The process comprises at least the following steps:
(I) Providing silicon dioxide granulate I; and
(II) Treating the silicon dioxide granulate I from step (I) to obtain silicon dioxide granulate II.

The silicon dioxide granulate I has the following features:
A) a chlorine content of less than 200 ppm; and
B) an aluminium content of less than 200 ppb,
wherein the ppb and ppm are each based on the total weight of the silicon dioxide granulate I.

Preferably, the silicon dioxide granulate I provided in step (I) is characterised by the features described in the context of the second or fourth aspect of the present invention. Preferably, the silicon dioxide granulate I provided in step (I) is a silicon dioxide granulate I according to the second or fourth aspect of the present invention.

Step (II)

Before the silicon dioxide granulate I is processed further to obtain quartz glass bodies, it is pre-treated, whereby a silicon dioxide granulate II is formed (step (II)). This pre-treatment can serve various purposes which either facilitate the processing to obtain quartz glass bodies or influence the properties of the resulting quartz glass bodies. For example, the silicon dioxide granulate I can be compacted, purified, surface modified or dried.

Preferably, the silicon dioxide granulate I can be subjected to a thermal, mechanical or chemic treatment or a combination of two or more treatments, whereby a silicon dioxide granulate II is obtained.

Chemical

Preferably, the silicon dioxide granulate I has a carbon content $w_{C(1)}$. The carbon content $w_{C(1)}$ is preferably less than 50 ppm, for example less than 40 ppm or less than 30 ppm, particularly preferably in a range from 1 ppb to 20 ppm, in each case based on the total weight of the silicon dioxide granulate I.

Preferably, the silicon dioxide granulate I comprises at least two particles. Preferably, the at least two particles can carry out a motion relative to each other. As means for bringing about the relative motion, in principle all means known to the skilled man and which appear to him to be suitable can be considered. Particularly preferred is a mixing. A mixing can in principle be carried out in any manner. Preferably, a feed-oven is selected for this. Accordingly, the at least two particles can preferably perform a motion relative to each other by being agitated in a feed-oven, for example in a rotary kiln.

Feed-ovens mean ovens for which loading and unloading of the oven, so-called charging, is carried out continuously. Examples of feed-ovens are rotary kilns, roll-over type furnaces, belt conveyor ovens, conveyor ovens, continuous pusher-type furnaces. Preferably, for treatment of the silicon dioxide granulate I rotary kilns are used.

In the context of the present invention, continuous in relation to a process means that it can be operated continuously. This means that introduction and removal of substances and materials involved in the process can be effected whilst the process is being performed. It is not necessary for the process to be interrupted for this.

Continuous as an attribute for an object, e.g. in relation to a "continuous oven", means that this object is so adapted that a process carried out in it or a process step carried out in it can be carried out continuously.

Preferably, the silicon dioxide granulate I is treated with a reactant to obtain a silicon dioxide granulate II. The treatment is carried out in order to change the concentration of certain materials in the silicon dioxide granulate. The silicon dioxide granulate I can have impurities or certain functionalities, the content of which should be reduced, such as for example: OH groups, carbon containing compounds, transition metals, alkali metals and alkali earth metals. The impurities and functionalities can originate from the starting materials or can be introduced in the course of the process. The treatment of the silicon dioxide granulate I can serve various purposes. For example, employing treated silicon dioxide granulate I, i.e. silicon dioxide granulate II, can simplify the processing of the silicon dioxide granulate to obtain quartz glass bodies. Furthermore, this selection can be employed to tune the properties of the resulting quartz glass body. For example, the silicon dioxide granulate I can be purified or surface modified. Furthermore, this treatment can be employed for improving the properties of the resulting quartz glass body.

Preferably, a gas or a combination of multiple gases is suitable as reactant. This is also referred to as a gas mixture. In principle, all gases known to the skilled man can be employed, which are known for the specified treatment and which appear to be suitable. Preferably, a gas selected from the group consisting of HCl, $Cl_2$, $F_2$, $O_2$, $O_3$, $H_2$, $C_2F_4$, $C_2F_6$, $HClO_4$, air, inert gas, e.g. $N_2$, He, Ne, Ar, Kr, or combinations of two or more thereof is employed. Preferably, the treatment is carried out in the presence of a gas or a combination of two or more gases. Preferably, the treatment is carried out in a gas counter flow or a gas co-flow.

Preferably, the reactant is selected from the group consisting of HCl, $Cl_2$, $F_2$, $O_2$, $O_3$ or combinations of two or more thereof. Preferably, mixtures of two or more of the above-mentioned gases are used for the treatment of silicon dioxide granulate I. Through this presence of F, Cl or both, metals which are contained in silicon dioxide granulates I as impurities, such as for example transition metals, alkali metals and alkali earth metals, can be removed. In this connection, the above mentioned metals can be converted along with constituents of the gas mixture under the process conditions to obtain gaseous compounds which are subsequently drawn out and thus are no longer present in the granulate. Furthermore, preferably, the OH content in the silicon dioxide granulate I can be decreased by the treatment of the silicon dioxide granulate I with these gases.

Preferably, a gas mixture of HCl and $Cl_2$ is employed as reactant. Preferably, the gas mixture has a HCl content in a range from 1 to 30 vol.-%, for example in a range from 2 to 15 vol.-%, particularly preferably in a range from 3 to 10 vol.-%. Likewise, the gas mixture preferably has a $Cl_2$ content in a range from 20 to 70 vol.-%, for example in a range from 25 to 65 vol.-%, particularly preferably in a range from 30 to 60 vol.-%. The remainder up to 100 vol.-% can be made up of one or more inert gases, e.g. $N_2$, He, Ne, Ar, Kr, or of air. Preferably, the proportion of inert gas in the reactants is in a range from 0 to less than 50 vol.-%, for example in a range from 1 to 40 vol.-% or from 5 to 30 vol.-%, particularly preferably in a range from 10 to 20 vol.-%, in each case based on the total volume of the reactant.

$O_2$, $C_2F_2$, or mixtures thereof with $Cl_2$ are preferably used for purifying silicon dioxide granulate I which has been prepared from a siloxane or from a mixture of multiple siloxanes.

The reactant in the form of a gas or of a gas mixture is preferably contacted with the silicon dioxide granulate as a gas flow or as part of a gas flow with a throughput in a range from 50 to 2000 L/h, for example in a range from 100 to 1000 L/h, particularly preferably in a range from 200 to 500 L/h. A preferred embodiment of the contacting is a contact of the gas flow and silicon dioxide granulate in a feed-oven, for example in a rotary kiln. Another preferred embodiment of the contacting is a fluidised bed process.

Through treatment of the silicon dioxide granulate I with the reactant, a silicon dioxide granulate II with a carbon content $w_{C(2)}$ is obtained. The carbon content $w_{C(2)}$ of the silicon dioxide granulate II is less than the carbon content $w_{C(1)}$ of the silicon dioxide granulate I, based on the total weight of the respective silicon dioxide granulate. Preferably, $w_{C(2)}$ is 0.5 to 50%, for example 1 to 45%, particularly preferably 1.5 to 45% less than $w_{C(1)}$.

Thermal

Preferably, the silicon dioxide granulate I is additionally subjected to a thermal or mechanical treatment or to a combination of these treatments. One or more of these additional treatments can be carried out before or during the treatment with the reactant. Alternatively or additionally, the additional treatment can also be carried out on the silicon dioxide granulate II. In what follows, the term "silicon dioxide granulate" comprises the alternatives "silicon dioxide granulate I" and "silicon dioxide granulate II". It is equally possible to carry out the treatments described in the following to the "silicon dioxide granulate I", or to the treated silicon dioxide granulate I, the "silicon dioxide granulate II".

The treatment of the silicon dioxide granulate can serve various purposes. For example, this treatment facilitates the processing of the silicon dioxide granulate to obtain quartz glass bodies. The treatment can also influence the properties of the resulting glass body. For example, the silicon dioxide granulate can be compacted, purified, surface modified or dried. In this connection, the specific surface area (BET) can decrease. Likewise, the bulk density and the mean particle size can increase due to agglomerations of silicon dioxide particles. The thermal treatment can be carried out dynamically or statically.

For the dynamic thermal treatment, all ovens in which the silicon dioxide granulate can be thermally treated whilst being agitated are in principle suitable. For the dynamic thermal treatment, preferably feed-ovens are used.

A preferred mean holding time of the silicon dioxide granulate in the dynamic thermal treatment is quantity dependent. Preferably, the mean holding time of the silicon dioxide granulate in the dynamic thermal treatment is in the range from 10 to 180 min, for example in the range from 20 to 120 min or from 30 to 90 min. Particularly preferably, the mean holding time of the silicon dioxide granulate in the dynamic thermal treatment is in the range from 30 to 90 min.

In the case of a continuous process, a defined portion of the flow of silicon dioxide granulate is used as a sample load for the measurement of the holding time, e.g. a gram, a kilogram or a tonne. The start and end of the holding time are determined by the introduction into and exiting from the continuous oven operation.

Preferably, the throughput of the silicon dioxide granulate in a continuous process for dynamic thermal treatment is in the range from 1 to 50 kg/h, for example in the range from 5 to 40 kg/h or from 8 to 30 kg/h. Particularly preferably, the throughput here is in the range from 10 to 20 kg/h.

In the case of a discontinuous process for dynamic thermal treatment, the treatment time is given as the period of time between the loading and subsequent unloading of the oven.

In the case of a discontinuous process for dynamic thermal treatment, the throughput is in a range from 1 to 50 kg/h, for example in the range from 5 to 40 kg/h or from 8 to 30 kg/h. Particularly preferably, the throughput is in the range from 10 to 20 kg/h. The throughput can be achieved using a sample load of a determined amount which is treated for an hour. According to another embodiment, the throughput can be achieved through a number of loads per hour, wherein the weight of a single load corresponds to the throughput per hour divided by the number of loads. In this event, time of treatment corresponds to the fraction of an hour which is given by 60 minutes divided by the number of loads per hour.

Preferably, the dynamic thermal treatment of the silicon dioxide granulate is carried out at an oven temperature of at least 500° C., for example in the range from 510 to 1700° C. or from 550 to 1500° C. or from 580 to 1300° C., particularly preferably in the range from 600 to 1200° C.

Normally, the oven has the indicated temperature in the oven chamber. Preferably, this temperature deviates from the indicated temperature by less than 10% downwards or upwards, based on the entire treatment period and the entire length of the oven as well as at every point in time in the treatment as well as at every position in the oven.

Alternatively, in particular the continuous process of a dynamic thermal treatment of the silicon dioxide granulate can by carried out at differing oven temperatures. For example, the oven can have a constant temperature over the treatment period, wherein the temperature varies in sections over the length of the oven. Such sections can be of the same length or of different lengths. Preferably, in this case, the temperature increases from the entrance of the oven to the exit of the oven. Preferably, the temperature at the entrance is at least 100° C. lower than at the exit, for example 150° C. lower or 200° C. lower or 300° C. lower or 400° C. lower. Furthermore, preferably, the temperature at the entrance is preferably at least 500° C., for example in the range from 510 to 1700° C. or from 550 to 1500° C. or from 580 to 1300° C., particularly preferably in the range from 600 to 1200° C. Furthermore, preferably, the temperature at the entrance is preferably at least 300° C., for example from 400 to 1000° C. or from 450 to 900° C. or from 500 to 800° C. or from 550 to 750° C., particularly preferably from 600 to 700° C. Furthermore, each of the temperature ranges given at the oven entrance can be combined with each of the temperature ranges given at the oven exit. Preferred combinations of oven entrance temperature ranges and oven exit temperature ranges are:

| Oven entrance temperature range [° C.] | Oven exit temperature range [° C.] |
|---|---|
| 400-1000 | 510-1300 |
| 450-900 | 550-1260 |
| 480-850 | 580-1200 |
| 500-800 | 600-1100 |
| 530-750 | 630-1050 |

For the static thermal treatment of the silicon dioxide granulate crucibles arranged in an oven are preferably used. Suitable crucibles are sinter crucibles or metal sheet crucibles. Preferred are rolled metal sheet crucibles made out of multiple sheets which are riveted together. Examples of preferred crucible materials are refractory metals, in particular tungsten, molybdenum and tantalum. The crucible can furthermore be made of graphite or in the case of the crucible of refractory metals can be lined with graphite foil. Furthermore, preferably, the crucibles can be made of silicon dioxide. Particularly preferably, silicon dioxide crucibles are employed.

The mean holding time of the silicon dioxide granulate in the static thermal treatment is quantity dependent. Preferably, the mean holding time of the silicon dioxide granulate in the static thermal treatment for a 20 kg amount of silicon dioxide granulate I is in the range from 10 to 180 min, for example in the range from 20 to 120 min, particularly preferably in the range from 30 to 90 min.

Preferably, the static thermal treatment of the silicon dioxide granulate is carried out at an oven temperature of at least 800° C., for example in the range from 900 to 1700° C. or from 950 to 1600° C. or from 1000 to 1500° C. or from 1050 to 1400° C., particularly preferably in the range from 1100 to 1300° C.

Preferably, the static thermal treatment of the silicon dioxide granulate I is carried out at constant oven temperature. The static thermal treatment can also be carried out at a varying oven temperature. Preferably, in this case, the temperature increases during the treatment, wherein the temperature at the start of the treatment is at least 50° C. lower than at the end, for example 70° C. lower or 80° C. lower or 100° C. lower or 110° C. lower, and wherein the temperature at the end is preferably at least 800° C., for example in the range from 900 to 1700° C. or from 950 to 1600° C. or from 1000 to 1500° C. or from 1050 to 1400° C., particularly preferably in the range from 1100 to 1300° C.

Mechanical

According to a further preferred embodiment, the silicon dioxide granulate I can be mechanically treated. The mechanical treatment can be carried out for increasing the bulk density. The mechanical treatment can be combined with the above mentioned thermal treatment. A mechanical treatment can avoid the agglomerates in the silicon dioxide granulate and therefore the mean particle size of the individual, treated silicon dioxide granules in the silicon dioxide granulate becoming too large. An enlargement of the agglomerates can hinder the further processing or have disadvantageous impacts on the properties of the quartz glass bodies prepared by the inventive process, or a combination of both effects. A mechanical treatment of the silicon dioxide granulate also promotes a uniform contact of the surfaces of the individual silicon dioxide granules with the gas or gases. This is in particular achieved by concurrent mechanical and chemical treatment with one or more gases. In this way, the effect of the chemical treatment can be improved.

The mechanical treatment of the silicon dioxide granulate can be carried out by moving two or more silicon dioxide granules relative to each other, for example by rotating the tube of a rotary kiln.

Preferably, the silicon dioxide granulate I is treated chemically, thermally and mechanically. Preferably, a simultaneous chemical, thermal and mechanical treatment of the silicon dioxide granulate I is carried out.

In the chemical treatment, the content of impurities in the silicon dioxide granulate I is reduced. For this, the silicon dioxide granulate I can be treated in a rotary kiln at raised temperature and under a chlorine and oxygen containing atmosphere. Water present in the silicon dioxide granulate I evaporates, organic materials react to form CO and $CO_2$. Metal impurities can be converted to volatile chlorine containing compounds.

Preferably, the silicon dioxide granulate I is treated in a chlorine and oxygen containing atmosphere in a rotary kiln at a temperature of at least 500° C., preferably in a temperature range from 550 to 1300° C. or from 600 to 1260° C. or from 650 to 1200° C. or from 700 to 1000° C., particularly preferably in a temperature range from 700 to 900° C. The chlorine containing atmosphere contains for example HCl or $Cl_2$ or a combination of both. This treatment causes a reduction of the carbon content.

Furthermore, preferably alkali and iron impurities are reduced. Preferably, a reduction of the number of OH groups is achieved. At temperatures under 700° C., treatment periods can be long, at temperatures above 1100° C. there is a risk that pores of the granulate close, trapping chlorine or gaseous chlorine compounds.

Preferably, it is also possible to carry out sequentially multiple chemical treatment steps, each concurrent with thermal and mechanical treatment. For example, the silicon dioxide granulate can first be treated in a chlorine containing atmosphere and subsequently in an oxygen containing atmosphere. The low concentrations of carbon, hydroxyl groups and chlorine resulting therefrom facilitate the melting down of the silicon dioxide granulate II.

According to a further preferred embodiment, step II.2) is characterised by at least one, for example by at least two or at least three, particularly preferably by a combination of all of the following features:

N1) The reactant comprises HCl, $Cl_2$ or a combination therefrom;
N2) The treatment is carried out in a rotary kiln;
N3) The treatment is carried out at a temperature in a range from 600 to 900° C.;
N4) The reactant forms a counter flow;
N5) The reactant has a gas flow in a range from 50 to 2000 L/h, preferably 100 to 1000 L/h, particularly preferably 200 to 500 L/h;
N6) The reactant has a volume proportion of inert gas in a range from 0 to less than 50 vol.-%.

Preferably, the silicon dioxide granulate I has a particle diameter which is greater than the particle diameter of the silicon dioxide powder. Preferably, the particle diameter of the silicon dioxide granulate I is up to 300 times as great as the particle diameter of the silicon dioxide powder, for example up to 250 times as great or up to 200 times as great or up to 150 times as great or up to 100 times as great or up to 50 times as great or up to 20 times as great or up to 10 times as great, particularly preferably 2 to 5 times as great.

A seventh aspect of the present invention is a silicon dioxide granulate II obtainable by the process according to the sixth aspect of the invention.

A silicon dioxide granulate which is obtainable by this process preferably has the properties described in the context of the fifth aspect of the invention.

An eighth aspect of the present invention is a process for the preparation of a quartz glass body. The process comprises at least the following steps:
i) Providing silicon dioxide granulate II;
ii) Warming the silicon dioxide granulate II from step i) to obtain a glass melt;
iii) Removing at least a part of the glass melt and forming a quartz glass body.

The silicon dioxide granulate II has the following features:
A) a chlorine content of less than 500 ppm; and
B) an aluminium content of less than 200 ppb,
wherein the ppm and ppb are each based on the total weight of the silicon dioxide granulate II.

Preferably, the silicon dioxide granulate II provided in step i) is characterised by features described in the context of the fifth or seventh aspect of the present invention. Preferably, the silicon dioxide granulate II provided in step i) is a silicon dioxide granulate II according to the fifth or seventh aspect of the present invention.

Step ii)

A glass melt is made from the silicon dioxide granulate II provided in step i). Preferably, the silicon dioxide granulate II is warmed to obtain the glass melt. The warming of the silicon dioxide granulate II to obtain a glass melt can in principle be performed in any way known to the skilled person for this purpose.

Vacuum Sintering

The warming of the silicon dioxide granulate II to obtain a glass melt can be performed by vacuum sintering. This process is a discontinuous process in which the silicon dioxide granulate II is warmed to melting in batches.

Preferably, the silicon dioxide granulate II is warmed in a vacuum crucible. The crucible is arranged in a melting oven. The crucible can be arranged standing or hanging, preferably hanging. The crucible can be a sinter crucible or a metal sheet crucible. Rolled metal sheet crucibles of multiple plates riveted together are preferred. Examples of suitable crucible materials are refractory metals, in particular W, Mo and Ta, graphite or a crucible lined with graphite foil, particularly preferred are graphite crucibles.

In the vacuum sintering, the silicon dioxide granulate II is warmed to melting under vacuum. Under vacuum means a residual pressure of less than 2 mbar. For this, the crucible containing the silicon dioxide granulate II is evacuated to a residual pressure of less than 2 mbar.

Preferably, the crucible is warmed in a melting oven up to a melting temperature in the range from 1500 to 2500° C., for example in the range from 1700 to 2300° C., particularly preferably in the range from 1900 to 2100° C.

The preferred holding time for the silicon dioxide granulate II in the crucible at the melting temperature depends on the quantity. Preferably, the holding time of the silicon dioxide granulate II in the crucible at the melting temperature is 0.5 to 10 hours, for example 1 to 8 hours or 1.5 to 6 hours, particularly preferably 2 to 5 hours.

The silicon dioxide granulate II can be agitated during warming. The agitation of the silicon dioxide granulate II is preferably performed by stirring, shaking or slewing.

Gas pressure Sintering

The warming of the silicon dioxide granulate II to obtain a glass melt can be performed by gas pressure sintering. This process is a static process in which the silicon dioxide granulate II is warmed to melting in batches.

Preferably, the silicon dioxide granulate II is put into a closable crucible and introduced into a melting oven. Examples of suitable crucible materials are graphite, refractory metals, in particular W, Mo and Ta, or crucibles lined with graphite foil, particularly preferably graphite crucibles. The crucible comprises at least one gas inlet and at least one gas outlet. Gas can be introduced into the crucible interior through the gas inlet. Gas can be removed from the crucible interior through the gas outlet. Preferably, it is possible to operate the crucible in a gas flow and in a vacuum.

In the gas pressure sintering, the silicon dioxide granulate II is warmed to melting in the presence of at least one gas or two or more gases. Suitable gases are for example $H_2$, and inert gases ($N_2$, He, Ne, Ar, Kr) as well as two or more thereof. Preferably, the gas pressure sintering is performed in reducing atmosphere, particularly preferably in the presence of $H_2$ or $H_2$/He. A gas exchange between air and $H_2$ or $H_2$/He takes place.

Preferably, the silicon dioxide granulate II is warmed to melting at a gas pressure of more than 1 bar, for example in the range from 2 to 200 bar or from 5 to 200 bar or from 7 to 50 bar, particularly preferably from 10 to 25 bar.

Preferably, the crucible is warmed in the oven to a melting temperature in the range from 1500 to 2500° C., for example in the range from 1550 to 2100° C. or from 1600 to 1900° C., particularly preferably in the range from 1650 to 1800° C.

The preferred holding time of the silicon dioxide granulate II in the crucible at the melting temperature under gas pressure is quantity dependent. Preferably, the holding time of the silicon dioxide granulate II in the crucible at the melting temperature when the quantity is 20 kg is 0.5 to 10 hours, for example 1 to 9 hours or 1.5 to 8 hours, particularly preferably 2 to 7 hours.

Preferably, the silicon dioxide granulate II is first brought to melting in vacuum, subsequently in a $H_2$ atmosphere or an atmosphere comprising $H_2$ and He, particularly preferably in a counterflow of these gases. In this process, the temperature in the first step is preferably lower than in the further step. The temperature difference between the warming in vacuum and in the presence of the gas or the gases is preferably 0 to 200° C., for example 10 to 100° C., particularly preferably 20 to 80° C.

Formation of a Part Crystalline Phase Before Melting

It is in principle also possible for the silicon dioxide granulate II to be pre-treated before melting. For example, the silicon dioxide granulate II can be warmed in such a way that an at least partially crystalline phase is formed, before the part crystalline silicon dioxide granulate is heated to melting.

For formation of a part crystalline phase, the silicon dioxide granulate II is preferably warmed at reduced pressure or in the presence of one or multiple gases. Suitable gases are for example HCl, $Cl_2$, $F_2$, $O_2$, $H_2$, $C_2F_6$, air, inert gas ($N_2$, He, Ne, Ar, Kr) as well as two or more therefrom. Preferably, the silicon dioxide granulate II is warmed at reduced pressure.

Preferably, the silicon dioxide granulate II is warmed to a treatment temperature at which the silicon dioxide granulate II softens without fully melting, for example to a temperature in the range from 1000 to 1700° C. or from 1100 to 1600° C. or from 1200 to 1500° C., particularly preferably to a temperature in the range from 1250 to 1450° C.

Preferably, the silicon dioxide granulate II is warmed in a crucible which is arranged in an oven. The crucible can be arranged standing or hanging, preferably hanging. The crucible can be a sinter crucible or a metal sheet crucible. Rolled metal sheet crucibles made of multiple plates riveted together are preferred. Examples of suitable crucible materials are refractory metals, in particular W, Mo and Ta, graphite or crucibles lined with graphite foil, preferably graphite crucibles. Preferably, the holding time of the silicon dioxide granulate II in the crucible at the treatment temperature is 1 to 6 hours, for example 2 to 5 hours, particularly preferably 3 to 4 hours.

Preferably, the silicon dioxide granulate II is warmed in a continuous process, particularly preferably in a rotary kiln. The mean holding time in the oven is preferably 10 to 180 min, for example 20 to 120 min, particularly preferably 30 to 90 min.

Preferably, the oven employed for the pre-treatment can be integrated into the supply line to the melting oven in which the silicon dioxide granulate II is warmed to melting. Furthermore preferably, the pre-treatment can be performed in the melting oven.

Step iii)

A quartz glass body is formed from at least part of the glass melt prepared in step ii).

Preferably, the quartz glass body is formed from at least part of the glass melt made in step ii). In principle, the quartz glass body can be formed from at least part of the glass melt in the melting oven or after removal of at least part of the glass melt from the melting oven, preferably after removal of at least part of the glass melt from the melting oven.

The removal from the melting oven of part of the glass melt prepared in step ii) can be performed continuously or after termination of the glass melt preparation. The glass melt is removed from the oven through the outlet, preferably through a nozzle.

The glass melt can be cooled to a temperature which allows forming the glass melt before, during or after removal. On cooling of the glass melt, the viscosity of the glass melt rises. The glass melt is preferably cooled to such an extent that when formed the imparted form remains and the forming can be as performed as easily and reliably as possible and with as little effort as possible. The skilled person can easily establish the viscosity of the glass melt for forming by varying the temperature of the glass melt in the forming apparatus. Preferably, the glass melt is cooled to a temperature of less than 500° C., for example less than 200° C. or less than 100° C. or less than 50° C., particularly preferably to a temperature in the range from 20 to 30° C.

Further preferably, the cooling is performed at a rate in a range from 0.1 to 50 K/min, for example from 0.2 to 10 K/min or from 0.3 to 8 K/min or from 0.5 to 5 K/min, particularly preferably in a range from 1 to 3 K/min.

It is further preferred to cool according to the following profile:

1. Cooling to a temperature in a range from 1180 to 1220° C.;
2. Holding at this temperature for a duration from 30 to 120 min, for example from 40 to 90 min, particularly preferably from 50 to 70 min;
3. Cooling to a temperature of less than 500° C., for example less than 200° C. or less than 100° C. or less than 50° C., particularly preferably to a temperature in the range from 20 to 30° C., wherein the cooling is in each case performed at a rate in a range from 0.1 to 50 K/min, for example from 0.2 to 10 K/min or from 0.3 to 8 K/min or from 0.5 to 5 K/min, particularly preferably in a range from 1 to 3 K/min.

The quartz glass body which is formed can be a solid body or a hollow body. A solid body means a body which is made substantially of a single material. Equally well, a solid body can have one or multiple inclusions, e.g. gas bubbles. Such inclusions in a solid body often have a size of 65 $mm^3$ or less, for example less than 40 $mm^3$, or of less than 20 $mm^3$, or of less than 5 $mm^3$, or of less than 2 $mm^3$, particularly preferably less than 0.5 $mm^3$.

The quartz glass body has an exterior form. Exterior form means the form of the outer edge of the cross section of the quartz glass body. The exterior form of the quartz glass body in cross section is preferably round, elliptical or polygonal with three or more corners, for example 4, 5, 6, 7 or 8 corners, particularly preferably the quartz glass body is round.

Preferably, the quartz glass body has a length in the range from 100 to 10000 mm, for example from 1000 to 4000 mm, particularly preferably from 1200 to 2000 mm.

Preferably, the quartz glass body has an outer diameter in the range from 10 to 1500 mm, for example in a range from 50 to 1000 mm or from 100 to 500 mm, particularly preferably in a range from 150 to 300 mm.

The forming of the quartz glass body can be performed by means of a nozzle. For this, the glass melt is sent through the nozzle. The exterior form of a quartz glass body formed by the nozzle is determined by the form of the nozzle opening. If the nozzle opening is round, the quartz glass body will be formed as a cylinder. The nozzle can be integrated into the melting oven or arranged separately. If the nozzle is not integrated into the melting oven, it can be provided upstream with a container into which the glass melt can be introduced following melting and prior to forming. Preferably, the nozzle is integrated into the melting oven. Preferably, it is integrated into the melting oven as part of the outlet. This process for forming the quartz glass body is preferred when the silicon dioxide granulate is heated to melting in a vertically arranged oven which is suitable for a continuous process.

The forming of the quartz glass body can be performed by forming the glass melt into a mould, for example a formed crucible. Preferably, the glass melt is cooled in the mould and subsequently removed. The cooling can preferably be performed by cooling the mould from the outside. This process for forming the quartz glass body is preferred when the silicon dioxide is heated to melting by means of gas pressure sintering or by means of vacuum sintering.

Preferably, the quartz glass body is cooled after formation. Preferably, the quartz glass body is cooled to a temperature of less than 500° C., for example less than 200° C. or less than 100° C. or less than 50° C., particularly preferably to a temperature in the range from 20 to 30° C.

Preferably, the cooling is performed at a rate in a range from 0.1 to 50 K/min, for example from 0.2 to 10 K/min or from 0.3 to 8 K/min or from 0.5 to 5 K/min, particularly preferably in a range from 1 to 3 K/min.

It is further preferred to cool according to the following profile:
1. Cooling to a temperature in a range from 1180 to 1220° C.;
2. Holding at this temperature for a duration from 30 to 120 min, for example from 40 to 90 min, particularly preferably from 50 to 70 min;
3. Cooling to a temperature of less than 500° C., for example less than 200° C. or less than 100° C. or less than 50° C., particularly preferably to a temperature in the range from 20 to 30° C.,
wherein the cooling is in each case performed at a rate in a range from 0.1 to 50 K/min, for example from 0.2 to 10 K/min or from 0.3 to 8 K/min or from 0.5 to 5 K/min, particularly preferably in a range from 1 to 3 K/min.

According to an embodiment of the eighth aspect of the invention, the process comprises the following process steps:
iv.) Making a hollow body with at least one opening from the quartz glass body.

The hollow body which is made, has an interior and an exterior form. Interior form means the form of the inner edge of the cross section of the hollow body. The interior and exterior form of the cross section of the hollow body can be the same or different. The interior and exterior form of the hollow body in cross section can be round, elliptical or polygonal with three or more corners, for example 4, 5, 6, 7 or 8 corners.

Preferably, the exterior form of the cross section corresponds to the interior form of the hollow body. Particularly preferably, the hollow body has in cross section a round interior and a round exterior form.

In another embodiment, the hollow body can differ in the interior and exterior form. Preferably, the hollow body has in cross section a round exterior form and a polygonal interior form. Particularly preferably, the hollow body in cross section has a round exterior form and a hexagonal interior form.

Preferably, the hollow body has a length in a range from 100 to 10000 mm, for example from 1000 to 4000 mm, particularly preferably from 1200 to 2000 mm.

Preferably, the hollow body has a wall thickness in a range from 1 to 1000 mm, for example in a range from 10 to 500 mm or from 30 to 200 mm, particularly preferably in a range from 50 to 125 mm.

Preferably, the hollow body has an outer diameter in a range from 10 to 1500 mm, for example in a range from 50 to 1000 mm or from 100 to 500 mm, particularly preferably in a range from 150 to 300 mm.

Preferably, the hollow body has an inner diameter in a range from 1 to 500 mm, for example in a range from 5 to 300 mm or from 10 to 200 mm, particularly preferably in a range from 20 to 100 mm.

The hollow body comprises one or more openings. Preferably, the hollow body comprises exactly one opening. Preferably, the hollow body comprises an even number of openings, for example 2, 4, 6, 8, 10, 12, 14, 16, 18 or 20 openings. Preferably, the hollow body comprises two openings. Preferably, the hollow body is a tube. This form of the hollow body is particularly preferred when the light guide comprises only one core.

The hollow body can comprise more than two openings. The openings are preferably placed as oppositely situated pairs situated in the ends of the quartz glass body. For example, each end of the quartz glass body can have 2, 3, 4, 5, 6, 7 or more than 7 openings, particularly preferably 5, 6 or 7 openings.

The hollow body can in principle be formed using ways known to the skilled person. Preferably, the hollow body is formed by means of a nozzle. Preferably, the nozzle comprises a device in the middle of its opening which deflects the glass melt during forming. In this way, a hollow body can be formed from a glass melt.

The forming of a hollow body can be performed by using a nozzle and subsequently post treating. Suitable post treatments are in principle all processes known to the skilled person which are for preparation of a hollow body from a solid body, for example piercing channels, drilling, honing or grinding. Preferably, a suitable post treatment is send the solid body over one or more mandrels, whereby a hollow body is formed. Also, the mandrel can be introduced into the solid body to form the hollow body. Preferably, the hollow body is cooled after the formation.

The forming to obtain a hollow body can be performed by forming the glass melt in a mould, for example in a formed crucible. Preferably, the glass melt is cooled in the mould and subsequently removed from it. The cooling can preferably be performed by cooling the mould from outside.

Preferably, the hollow body is cooled to a temperature of less than 500° C., for example less than 200° C. or less than 100° C. or less than 50° C., particularly preferably to a temperature in the range from 20 to 30° C.

Preferably, the cooling is performed at a rate in a range from 0.1 to 50 K/min, for example from 0.2 to 10 K/min or from 0.3 to 8 K/min or from 0.5 to 5 K/min, particularly preferably in a range from 1 to 3 K/min.

It is further preferred to cool according to the following profile:
1. Cooling to a temperature in a range from 1180 to 1220° C.;
2. Holding at this temperature for a duration from 30 to 120 min, for example from 40 to 90 min, particularly preferably from 50 to 70 min;
3. Cooling to a temperature of less than 500° C., for example less than 200° C. or less than 100° C. or less than 50° C., particularly preferably to a temperature in the range from 20 to 30° C.,
wherein the cooling is in each case performed at a rate in a range from 0.1 to 50 K/min, for example from 0.2 to 10 K/min or from 0.3 to 8 K/min or from 0.5 to 5 K/min, particularly preferably in a range from 1 to 3 K/min.

A ninth aspect of the present invention is a quartz glass body obtainable by the process according to the eighth aspect of the invention, wherein the quartz glass body is preferably made of silicon dioxide, wherein the silicon dioxide has the following features:
A] an OH content of less than 10 ppm; and
B] a chlorine content of less than 60 ppm; and
C] an aluminium content of less than 200 ppb,
wherein the ppb and ppm are each based on the total weight of the quartz glass body.

Preferably, the quartz glass body is characterised by at least one, for example at least two or at least three or at least four, particularly preferably all of the following features:
D] an ODC content of less than $5 \times 10^{15}/cm^3$, for example in a range from $0.1 \times 10^{15}$ to $3 \times 10^{15}/cm^3$, particularly preferably in a range from $0.5 \times 10^{15}$ to $2.0 \times 10^{15}/cm^3$;

E] a metal content of metals which are different to aluminium of less than 300 ppb, for example less than 200 ppb, particularly preferably in a range from 1 to 150 ppb;

F] a viscosity (p=1013 hPa) in a range from $\log_{10} (\eta(1200°\ C.)/dPas)=13.4$ to $\log_{10} (\eta(1200°\ C.)/dPas)=13.9$ and/or $\log_{10} (\eta(1300°\ C.)/dPas)=11.5$ to $\log_{10} (\eta(1300°\ C.)/dPas)=12.1$ and/or $\log_{10} (\eta(1350°\ C.)/dPas)=1.2$ to $\log_{10} (\eta(1350°\ C.)/dPas)=10.8$;

G] a standard deviation of the OH content of not more than 10%, preferably not more than 5%, based on the OH content A] des quartz glass body;

H] a standard deviation of the Cl content of not more than 10%, preferably not more than 5%, based on the Cl content B] of the quartz glass body;

I] a standard deviation of the Al content of not more than 10%, preferably not more than 5%, based on the Al content C] of the quartz glass body;

J] a refractive index homogeneity of less than $1\times10^{-4}$, for example less than $5\times10^{-5}$, particularly preferably less than $1\times10^{-6}$;

K] a cylindrical form;

L] a transformation point $T_g$ in a range from 1150 to 1250° C.;

M] a fictive temperature in a range from 1055 to 1200° C.;

wherein the ppb and ppm are each based on the total weight of the quartz glass body.

For preferred embodiments of this aspect, reference is made to the preferred embodiments described for the first to eighth aspects. These are also the preferred embodiments of this aspect of the invention.

Preferably, the quartz glass body has a homogeneously distributed OH content, chlorine content or aluminium content. An indicator for the homogeneity of the of the quartz glass body can be expressed as the standard deviation of the OH content, chlorine content or aluminium content. The standard deviation is the measure of the width of spread of the values of the variables, in this case the OH content, chlorine content or aluminium content, about their arithmetic mean. For measuring the standard deviation, the content of the component in question, e.g. OH, chlorine or aluminium, is measured at at least seven measuring locations in the sample.

The quartz glass body preferably has the feature combination A]/B]/C]/D] or A]/B]/C]/E] or A]/B]/C]/F], further preferred the feature combination A]/B/C]/D]/E] or A]/B]/C]/D]/F] or A]/B]/C]/E]/F], further preferably the feature combination A]/B]/C]/D]/E]/F].

The quartz glass body preferably has the feature combination A]/B]/C]/D], wherein the OH content is less than 10 ppm, the chlorine content is less than 60 ppm, the aluminium content is less than 200 ppb and the ODC content is in a range from $0.1\cdot10^{15}$ to $3\cdot10^{15}$/cm$^3$.

The quartz glass body preferably has the feature combination A]/B]/C]/E], wherein the OH content is less than 10 ppm, the chlorine content is less than 60 ppm, the aluminium content is less than 200 ppb and the metal content of metals which are different to aluminium is less than 200 ppb.

The quartz glass body preferably has the feature combination A]/B]/C]/F], wherein the OH content is less than 10 ppm, the chlorine content is less than 60 ppm, the aluminium content is less than 200 ppb and the viscosity (p=1013 hPa) is in a range from $\log_{10} (\eta(1200°\ C.)/dPas)=13.4$ to $\log_{10} (\eta(1200°\ C.)/dPas)=13.9$.

The quartz glass body preferably has the feature combination A]/B]C]/D]/E], wherein the OH content is less than 10 ppm, the chlorine content is less than 60 ppm, the aluminium content is less than 200 ppb, the ODC content is in a range from $0.1\cdot10^{15}$ to $3\cdot10^{15}$/cm$^3$ and the metal content of metals which are different to aluminium is less than 200 ppb.

The quartz glass body preferably has the feature combination A]/B]/C]/D]/F], wherein the OH content is less than 10 ppm, the chlorine content is less than 60 ppm, the aluminium content is less than 200 ppb, the ODC content is in a range from $0.1\cdot10^{15}$ to $3\cdot10^{15}$/cm$^3$ and the viscosity (p=1013 hPa) is in a range from $\log_{10} (\eta(1200°\ C.)/dPas)=13.4$ to $\log_{10} (\eta(1200°\ C.)/dPas)=13.9$.

The quartz glass body preferably has the feature combination A]/B]/C]/E]/F], wherein the OH content is less than 10 ppm, the chlorine content is less than 60 ppm, the aluminium content is less than 200 ppb, the metal content of metals which are different to aluminium is less than 200 ppb and the viscosity (p=1013 hPa) is in a range from $\log_{10} (\eta(1200°\ C.)/dPas)=13.4$ to $\log_{10} (\eta(1200°\ C.)/dPas)=13.9$.

The quartz glass body preferably has the feature combination A]/B]/C]/D]E]//F], wherein the OH content is less than 10 ppm, the chlorine content is less than 60 ppm, the aluminium content is less than 200 ppb, the ODC content is in a range from $0.1\cdot10^{15}$ to $3\cdot10^{15}$/cm$^3$, the metal content of metals which are different to aluminium is less than 200 ppb and the viscosity (p=1013 hPa) is in a range from $\log_{10} (\eta(1200°\ C.)/dPas)=13.4$ to $\log_{10} (1200°\ C.)/dPas)=13.9$.

According to a preferred embodiment of the ninth aspect of the invention, is a quartz glass body obtainable by a process comprising the steps:

i) Providing silicon dioxide granulate II obtainable by a process comprising the following steps:
(I) Providing silicon dioxide granulate I obtainable by a process comprising the following steps:
  I. Providing silicon dioxide powder;
  II. Providing a liquid;
  III. Mixing the components from steps I. and II. to obtain a slurry; and
  IV. Spray drying the slurry to obtain silicon dioxide granulate I;
(II) Treating the silicon dioxide granulate I from step (I) to obtain silicon dioxide granulate II;

ii) Forming a glass melt from the silicon dioxide granulate II from step (I);

iii) Forming a quartz glass body from at least part of the glass melt;

iv) Optionally forming a hollow body with at least one opening from the quartz glass body.

A tenth aspect of the present invention is a quartz glass body, wherein the quartz glass body is made of silicon dioxide and has A] an OH content of less than 10 ppm;

B] a chlorine content of less than 60 ppm; and

C] an aluminium content of less than 200 ppb, wherein the ppb and ppm are in each case based on the total weight of the quartz glass body.

Preferably, the quartz glass body is characterised by at least one, for example at least two or at least three or at least four, particularly preferably at least five of the following features:

D] an ODC content of less than $5\times10^{15}$/cm$^3$, for example in a range from $0.1\times10^{15}$ to $3\times10^{15}$/cm$^3$, particularly preferably in a range from $0.5\times10^{15}$ to $2.0\times10^{15}$/cm$^3$;

E] a metal content of metals which are different to aluminium of less than 300 ppb, for example less than 200 ppb, particularly preferably in a range from 1 to 150 ppb;

F] a viscosity (p=1013 hPa) in a range from $\log_{10}$ ($\eta$(1200° C.)/dPas)=13.4 to $\log_{10}$ ($\eta$(1200° C.)/dPas)= 13.9 and/or $\log_{10}$ ($\eta$(1300° C.)/dPas)=11.5 to $\log_{10}$ ($\eta$(1300° C.)/dPas)=12.1 and/or $\log_{10}$ ($\eta$(1350° C.)/dPas)=1.2 to $\log_{10}$ ($\eta$(1350° C.)/dPas)=10.8;

G] a standard deviation of the OH content of not more than 10%, preferably not more than 5%, based on the OH content A] of the quartz glass body;

H] a standard deviation of the Cl content of not more than 10%, preferably not more than 5%, based on the Cl content B] of the quartz glass body;

I] a standard deviation of the Al content of not more than 10%, preferably not more than 5%, based on the Al content C] of the quartz glass body;

J] a refractive index homogeneity of less than $1\times10^{-4}$, for example less than $5\times10^{-5}$, particularly preferably less than $1\times10^{-6}$;

K] a cylindrical form;

L] a transformation point $T_g$ in a range from 1150 to 1250° C.;

M] a fictive temperature in a range from 1055 to 1200° C.; wherein the ppb and ppm are each based on the total weight of the quartz glass body.

For preferred embodiments of this aspect, reference is made to the preferred embodiments described for the first to ninth aspects. These are also the preferred embodiments for this aspect of the invention. In particular, the features directed to the jacket layer of the first aspect of the invention are also preferred features of the jacket layer of the tenth aspect of the invention.

An eleventh aspect of the present invention is a process for the preparation of a light guide comprising the following steps:

A/Providing
   A1/a hollow body with at least one opening obtainable by a process according to the eighth aspect of the invention comprising step iv.), or
   A2/a quartz glass body according to the ninth or tenth aspect of the invention, wherein the quartz glass body is first processed to obtain a hollow body with at least one opening;

B/Introducing one or more core rods into the quartz glass body through the least one opening to obtain a precursor, C/Drawing the precursor from step B/in the warm to obtain the light guide with one or multiple cores and a jacket M1.

Step A/

The quartz glass body provided in step A/is a hollow body with at least two openings. The quartz glass body provided in step A/is preferably characterised by the features according to the tenth aspect of the present invention. Preferably, the quartz glass body provided in step A/is obtainable by a process according to the eighth aspect of the invention comprising as step iv.) the formation of a hollow body with at least two openings from the quartz glass body. Particularly preferably, the quartz glass body prepared in this way has the features according to the tenth aspect of the invention. Preferably, the quartz glass body provided in step A/is a quartz glass body with the features according to the ninth aspect of the invention. Particularly preferably, the quartz glass body provided in step A/has the features according to the ninth aspect of the invention and the features according to the tenth aspect of the invention. Preferably, the quartz glass body provided in step A/is a quartz glass body according to the tenth aspect of the invention.

Step B/

One or multiple core rods are introduced through at least one of the openings of the quartz glass body (step B/). In the context of the present invention, a core rod means an object which is adapted for being introduced into a jacket, for example a jacket M1, and processed to obtain a light guide. The core rod has a core of quartz glass. Preferably, the core rod comprises a core of quartz glass and a jacket layer M0 surrounding the core.

Each core rod has a form which is selected in such a way that it fits into the quartz glass body. Preferably, the outer form of the core rod corresponds to the form of the opening of the quartz glass body. Particularly preferably, the quartz glass body is a tube and the core rod is a rod with a round cross section.

The diameter of the core rod is less than the inner diameter of the hollow body. Preferably, the diameter of the core rod is 0.1 to 3 mm smaller than the inner diameter of the hollow body, for example 0.3 to 2.5 mm smaller or 0.5 to 2 mm smaller or 0.7 to 1.5 mm smaller, particularly preferably 0.8 to 1.2 mm smaller.

Preferably, the ratio of the inner diameter of the quartz glass body to the diameter of the core rod is in the range from 2:1 to 1.0001:1, for example in the range from 1.8:1 to 1.001:1 or in the range from 1.6:1 to 1.005:1 or in the range from 1.4:1 to 1.01:1, particularly preferably in the range from 1.2:1 to 1.05:1.

Preferably, a region inside the quartz glass body which is not filled by the core rod can be filled with at least one further component, for example with a silicon dioxide powder or with a silicon dioxide granulate.

It is also possible for a core rod which is already present in at least one further quartz glass body to be introduced into a quartz glass body. The further quartz glass body in this case has an outer diameter which is smaller than the inner diameter of the quartz glass body. The core rod which is introduced into the quartz glass body can also be present inside two or more further quartz glass bodies, for example in 3 or more further quartz glass bodies.

A quartz glass body fitted with one or multiple core rods which is obtained in this way is referred to as "precursor" in the following.

Step C/

The precursor is drawn in the warm (step C/). The product obtained in this way is a light guide with one or multiple cores and at least one jacket M1.

Preferably, the precursor is drawn at a rate in the range from 0.05 m/h to 110 km/h.

Preferably, the drawing in the warm is performed at a temperature of up to 2500° C., for example at a temperature in the range from 1700 to 2400° C., particularly preferably at a temperature in the range from 2100 to 2300° C.

Preferably, the precursor is fed through an oven which heats the precursor from the outside.

Preferably, the precursor is lengthened, until the required thickness of the light guide is achieved. Preferably, the precursor is lengthened to 1,000 to 6,000,000 times the length, for example 10,000 to 500,000 times the length or 30,000 to 200,000 the length, in each case based on the length of the quartz glass body provided in step A/. Particularly preferably, the precursor is lengthened 100,000 to 10,000,000 times in length, for example 150,000 to 5,800,000 times in length or 160,000 to 640,000 times in length or 1,440,000 to 5,760,000 times in length or 1,440,000 to 2,560,000 in length, in each case based on the length of the precursor provided in step B/.

Preferably, the diameter of the precursor is reduced by the lengthening by a factor in a range from 100 to 3,500, for example in a range from 300 to 3,000 or from 400 to 800 or from 1,200 to 2,400 or from 1,200 to 1,600, in each case based on the diameter of the precursor provided in step B/.

The light guide obtained in step C/ can be post treated in various steps.

The light guide can be provided with a coating. Preferably, the light guide can be provided with a coating after the drawing and before performing further post treatment steps. The coating serves as protection against mechanical impairment as well as protection against humidity, heat, cold and other external influences. Without further coating, the danger of micro tears on the fibre surface increased, which may lead to a significant reduction of the mechanical resilience. The coating can be made of one or from two or more layers. Preferably, the coating is made of two layers. A coating with two layers preferably has a first layer surrounding the jacket layer, the lacquer, which keeps humidity away from the core and jacket layer, as well as a further layer surrounding the first layer which protects the light guide against thermal and mechanical damage. Suitable coating materials are in particular cross-linked polymers, preferred coating materials being cross-linked acrylates, polyimides, silicone or two or more thereof. The first layer is particularly preferably made of cross-linked polyacrylate. The first layer preferably has a thickness in the range from 10 to 100 µm, for example from in a range from 15 to 50 µm, particularly preferably in the range from 20 to 30 µm. The further layer is for example made of a combination of cross-linked polymers. The further layer preferably has a thickness in the range from 5 to 500 µm, for example in a range from 10 to 100 µm or from 15 to 50 µm, particularly preferably from 20 to 30 µm.

A twelfth aspect of the invention is a light guide obtainable by a process according to the eleventh aspect of the present invention.

Preferably, the light guide obtainable by a process according to the eleventh aspect of the present invention has a jacket M1 and one or multiple cores,
wherein the jacket M1 surrounds the cores;
wherein each core has a refractive index profile perpendicular to the maximum extension of the core, wherein at least one refractive index $n_K$ of each refractive index profile is greater than the refractive index $n_{M1}$ of the jacket M1;
wherein the jacket M1 is made of silicon dioxide and has
  a) an OH content of less than 10 ppm; and
  b) a chlorine content of less than 60 ppm; and
  c) an aluminium content of less than 200 ppb;
  wherein the ppb and ppm are each based on the total weight of the jacket M1.

Preferably, the jacket M1 has at least one of the following features:
  d) an ODC content of less than $5 \times 10^{15}/cm^3$, for example in a range from $0.1 \times 10^{15}$ to $3 \times 10^{15}/cm^3$, particularly preferably in a range from $0.5 \times 10^{15}$ to $2.0 \times 10^{15}/cm^3$;
  e) a metal content of metals which are different to aluminium of less than 1 ppm, for example less than 0.5 ppm, particularly preferably less than 0.1 ppm;
  f) a viscosity (p=1013 hPa) in a range from $\log_{10}(\eta(1200°$ C.)/dPas$)=13.4$ to $\log_{10}(\eta(1200°$ C.)/dPas$)=13.9$ and/or $\log_{10}(\eta(1300°$ C.)/dPas$)=11.5$ to $\log_{10}(\eta(1300°$ C.)/dPas$)=12.1$ and/or $\log_{10}(\eta(1350°$ C.)/dPas$)=1.2$ to $\log_{10}(\eta(1350°$ C.)/dPas$)=10.8$;
  g) a curl parameter of more than 6 m;
  h) a standard deviation of the OH content of not more than 10%, preferably not more than 5%, based on the OH content a) of the jacket M1;
  i) a standard deviation of the Cl content of not more than 10%, preferably not more than 5%, based on the Cl content b) of the jacket M1;
  j) a standard deviation of the Al content of not more than 10%, preferably not more than 5%, based on the Al content c) of the jacket M1
  k) a refractive index homogeneity of less than $1 \times 10^{-4}$, for example less than $5 \times 10^{-5}$, particularly preferably less than $1 \times 10^{-6}$;
  l) a transformation point $T_g$ in a range from 1150 to 1250° C., particularly preferably in a range from 1180 to 1220° C.,
  wherein the ppb and ppm are each based on the total weight of the jacket M1.

Preferred is a light guide obtainable by a process comprising the following steps:
  A/ Providing a quartz glass body preferably obtainable by a process comprising the following steps:
    i) Providing silicon dioxide granulate II obtainable by a process comprising the following steps:
      (I) Providing silicon dioxide granulate I obtainable by a process comprising the following steps:
        I. Providing silicon dioxide powder;
        II. Providing a liquid;
        III. Mixing the components from steps I. and II. to obtain a slurry; and
        IV. Spray drying the slurry to obtain silicon dioxide granulate I;
      (II) Treating the silicon dioxide granulate I from step (I) to obtain silicon dioxide granulate II;
    ii) Making a glass melt from the silicon dioxide granulate II from step (II);
    iii) Making a quartz glass body from at least part of the glass melt;
    iv) Making a hollow body with at least one opening from the quartz glass body;
  B/ Introducing one or multiple core rods into the quartz glass body through the at least one opening to obtain a precursor,
  C/ Drying the precursor in the warm to obtain the light guide with a core and at least one jacket layer M1.

In this context, the silicon dioxide granulate I has at least one of the following features:
  A) a chlorine content of less than 200 ppm;
  B) an aluminium content of less than 200 ppb;
in each case based on the total weight of the silicon dioxide granulate I.

In this context, the silicon dioxide powder has following features:
  a. a chlorine content of less than 200 ppm; and
  b. an aluminium content of less than 200 ppb;
  in each case based on the total weight of the silicon dioxide powder.

In this context, the silicon dioxide granulate II has at least one of the following features:
  (A) a chlorine content of less than 500 ppm;
  (B) an aluminium content of less than 200 ppb;
  in each case based on the total weight of the silicon dioxide granulate II.

For preferred embodiments of this aspect, reference is made to the preferred embodiments described for the sixth to eleventh aspects. These are also preferred embodiments of this aspect of the invention.

A thirteenth aspect of the present invention is a light guide cable comprising at least two light guides according to the first or twelfth aspects of the invention.

Preferably, the light guide cable comprises at least two light guides, particularly preferably 10 to 2000.

The at least two light guides can be arranged in the cable in any way. Preferably, the light guide is present in the cable as bundles or twisted. A bundle of light guides means multiple light guides situated next to each other, preferably 10. Twisted light guides means light guides which are wrapped around each other.

Preferably, the at least two light guides are jacketed. The jacket can be applied directly to the at least two light guides. Directly means that an empty space of not more than 1 mm is present between the at least two light guides and the jacket. The jacket can surround the at least two light guides in such a way that a separation of more than 1 mm remains free.

The jacket serves as protection against mechanical damage as well as protection against humidity, heat, cold and other external influences. The jacket can be made of one or of two or more layers. Preferably, the jacket is made of two or more layers, of an outer situated layer and at least one inner situated layer. The outer situated layer serves primarily as protection against mechanical damage. The at least one inner situated layer protects against humidity, thermal, mechanical and other external influences. Particularly suitable materials for the layers are cross-linked polymers.

The at least two light guides are preferably arranged in the light guide cable in such a way that the ends of the at least two light guides coincide with the ends of the light guide cable. Particularly preferably, the at least two light guides of a cable are equally long. "Equally long" means a deviation of the length of a light guide of not more than 5%, based on the average length of the light guides of the cable.

Preferably, the light guide cable has a device at at least one end, preferably at both ends, through which the light guide cable can be connected with other light guide cables or with other components. Preferably, the light guide cable has a plug connection or a splice connection at at least one end, preferably at both ends.

A fourteenth aspect of the present invention is a process for the preparation of a light guide cable comprising the following steps:

A} Providing at least two light guides according to the first or twelfth aspect of the invention;
B} Process the at least two light guides from A} to obtain a light guide cable.

Preferably, the light guide cable which is obtainable by this process is characterised by the features according to the thirteenth aspect of the present invention.

The at least two light guides provided in step A} have at least the features A] to C]. Preferably, the at least two light guides provided in step A} have at least one of the features D] to G]. Preferably, the at least two light guides provided in step A} are characterised by the features according to the first or twelfth aspect of the present invention.

The at least two light guides provided in step A} are processed in the step B}. The processing can comprise steps by which a light guide cable made of two or more light guides can be obtained.

For example, the processing according to step B} can comprise following steps:

The two or more light guides can be provided with a jacket.
The two or more light guide can be twisted.
The two or more light guides can be bundled. The bundle of the two or more light guides can preferably be held together by a separate device. For example, the bundle can be held together by a jacket.
The two or more light guides can be provided with a device at the ends, preferably with a plug or splicing device.

A preferred embodiment of the fourteenth aspect of the invention is a process for the preparation of the light guide cable comprising providing light guides which are obtainable according to the twelfth aspect of the invention. A light guide cable is therefore preferably obtainable by a process comprising the following steps:

A} Providing at least two light guides, preferably obtainable according to the process previously described for the preparation of a light guide;
B} Processing the at least two light guides from A} to obtain a light guide cable.

For preferred embodiments of this aspect, reference is made to the preferred embodiments described for the third to thirteenth aspects. These are also preferred embodiments for this aspect of the invention.

A fifteenth aspect of the present invention relates to a use of silicon dioxide granulate according to the second or fourth aspect of the invention for preparation of products selected from the group consisting of jacket materials for optical fibres, light guides and light guide cables.

Jacket materials means materials which, in a further step in the value chain, are processed to obtain a sheath or a coating of an optical fibre, a light guide or another body which is to be protected by a sheath or coating.

FIGURES

FIG. 1 flow diagram (process for the preparation of a quartz glass body)
FIG. 2 flow diagram (process for the preparation of a silicon dioxide granulate I)
FIG. 3 flow diagram (process for the preparation of a silicon dioxide granulate II)
FIG. 4 schematic representation of a spray tower
FIG. 5 schematic representation of a cross section of a light guide
FIG. 6 schematic representation of a top view of a light guide
FIG. 7 schematic representation of a gas pressure sinter oven (GDS oven)

Preferably, for the melting, moulds are employed which can be introduced into and removed from an oven. Such moulds are often made from graphite. They provide a negative form of the casting. The silicon dioxide granulate is filled into the mould in the third step 103 and first brought to melting in the mould. Subsequently, the quartz glass body forms in the mould by cooling the melt. This is then freed from the mould and processed further, for example in an optional step 104. This procedure is discontinuous. The formation of the melt is preferably performed at reduced pressure, in particular in a vacuum. It is also possible, during step 103, to intermittently charge the oven with a reducing, hydrogen containing atmosphere.

In another procedure, the crucible is preferably a hanging or standing crucible. In this case, the silicon dioxide granulate is introduced into the melting crucible and warmed therein until a glass melt is formed. In this case, the melting is preferably performed in a reducing hydrogen containing atmosphere. In a third step 103, a quartz glass body is formed. The forming of the quartz glass body is performed here by removing at least part of the glass melt from the crucible and cooling, for example through a nozzle on the underside of the of the crucible. In this case, the form of the quartz glass body can be determined by the layout of the nozzle. In this way, solid bodies can be obtained for example. Hollow bodies are obtained for example, if a mandrel is additionally present in the nozzle. This exemplary process for the preparation of quartz glass bodies, and in particular step 103, is preferably performed continuously. In an optional step 104, a hollow body can be formed from a solid quartz glass body.

Figure 1:
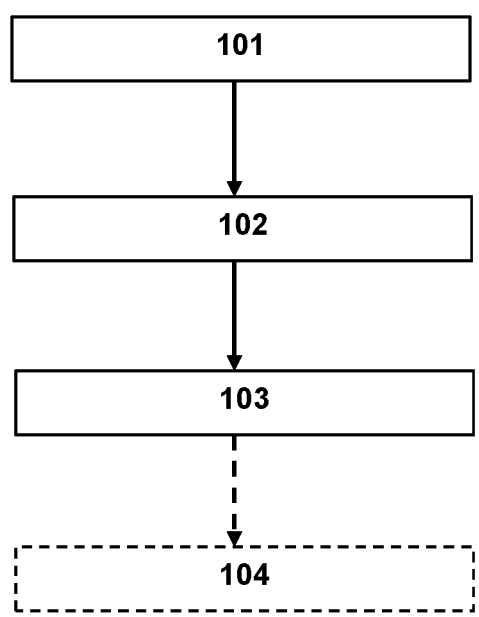
FIG. 1 shows a flow diagram containing the steps 101 to 104 of a process 100 for the preparation of a quartz glass body according to the present invention. In a first step 101, a silicon dioxide granulate is provided. In a second step 102, a glass melt is made from the silicon dioxide granulate.
Figure 2:
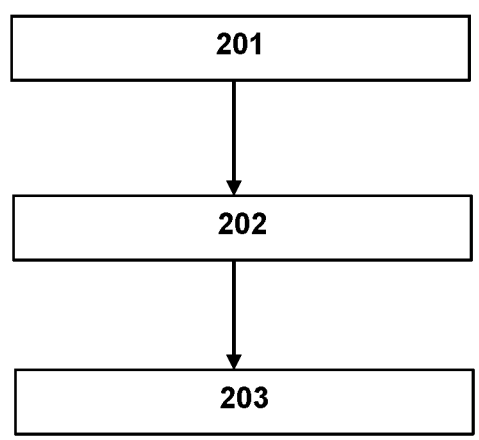

FIG. 2 shows a flow diagram containing the steps 201, 202 and 203 of a process 200 for the preparation of a silicon dioxide granulate I. In a first step 201, a silicon dioxide powder is provided. A silicon dioxide powder is preferably obtained from a synthetic process in which a silicon containing material, for example a siloxane, a silicon alkoxide or a silicon halogenide is converted into silicon dioxide in a pyrogenic process. In a second step 202, the silicon dioxide powder is mixed with a liquid, preferably with water, to obtain a slurry. In a third step 203, the silicon dioxide contained in the slurry is transformed into a silicon dioxide granulate. The granulation is performed by spray granulation. For this, the slurry is sprayed through a nozzle into a spray tower and dried to obtain granules, wherein the contact surface between the nozzle and the slurry comprises a glass or a plastic.

Figure 3:
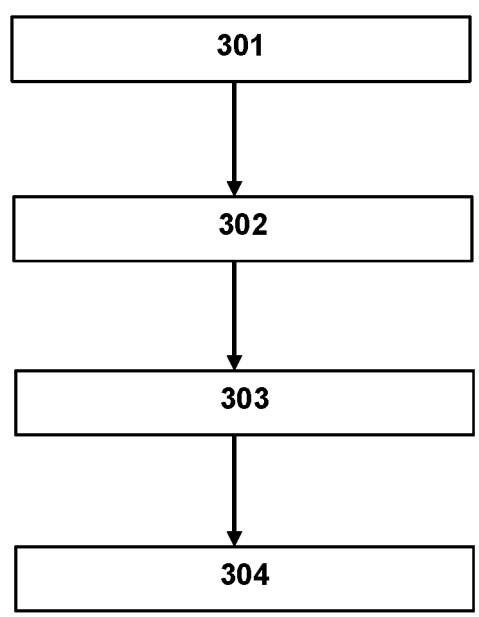

FIG. 3 shows a flow diagram containing the steps 301, 302, 303 and 304 of a process 300 for the preparation of a silicon dioxide granulate II. The steps 301, 302 and 303 proceed corresponding to the steps 201, 202 and 203 according to FIG. 2. In step 304, the silicon dioxide granulate I obtained in step 303 is processed to obtain a silicon dioxide granulate II. This is preferably performed by warming the silicon dioxide granulate I in a chlorine containing atmosphere.

Figure 4:
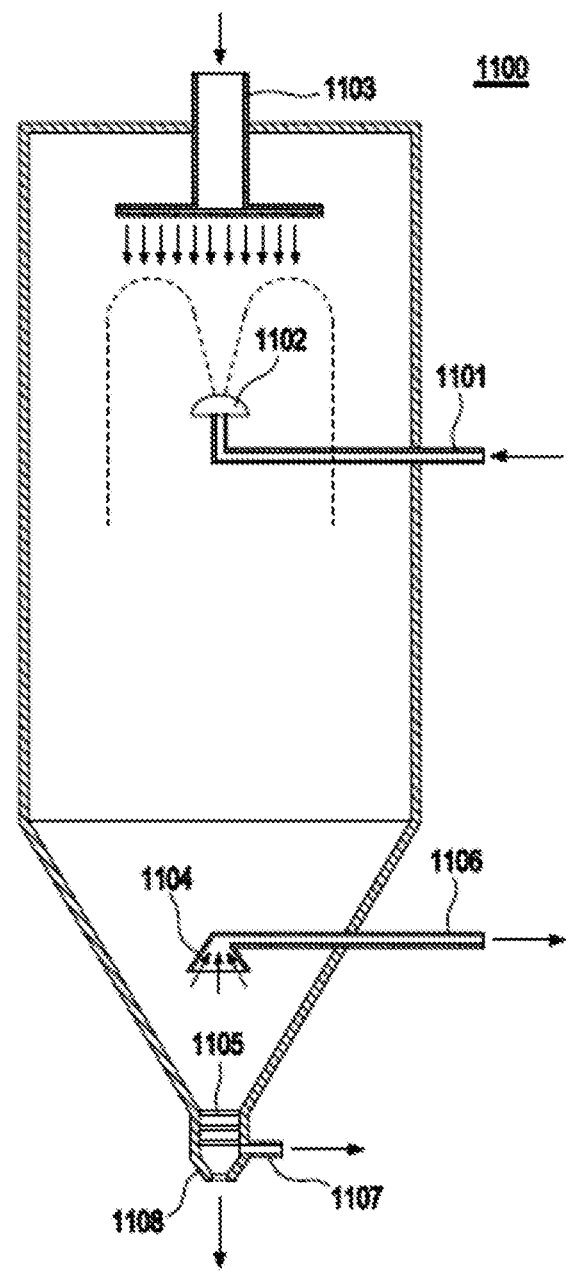

In FIG. 4 is shown a preferred embodiment of a spray tower 1100 for spray granulating silicon dioxide. The spray tower 1100 comprises a feed 1101 through which a pressurised slurry containing silicon dioxide powder and a liquid are fed into the spray tower. At the end of the pipeline is a nozzle 1102 through which the slurry is introduced into the spray tower as a finely spread distribution. Preferably, the nozzle slopes upward, so that the slurry is sprayed into the spray tower as fine droplets in the nozzle direction and then falls down in an arc under the influence of gravity. At the upper end of the spray tower there is a gas inlet 1103. By introduction of a gas through the gas inlet 1103, a gas flow is created in the opposite direction to the exit direction of the slurry out of the nozzle 1102. The spray tower 1100 also comprises a screening device 1104 and a sieving device 1105. Particles which are smaller than a defined particle size are extracted by the screening device 1104 and removed through the discharge 1106. The extraction strength of the screening device 1104 can be configured to correspond to the particle size of the particles to be extracted. Particles above a defined particle size are sieved off by the sieving device 1105 and removed through the discharge 1107. The sieve permeability of the sieving device 1105 can be selected to correspond to the particle size to be sieved off. The remaining particles, a silicon dioxide granulate having the desired particle size, is removed through the outlet 1108.

Figure 5:
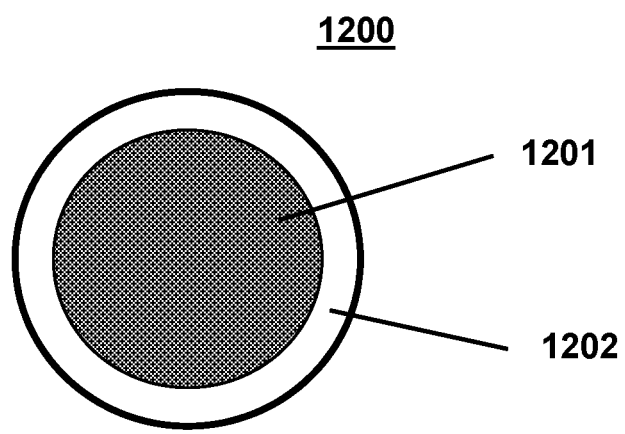

In FIG. 5 is shown a schematic cross section through a light guide 1200 according to the invention which has a core 1201 and a jacket M1 1202 which surrounds the core 1201.

Figure 6:
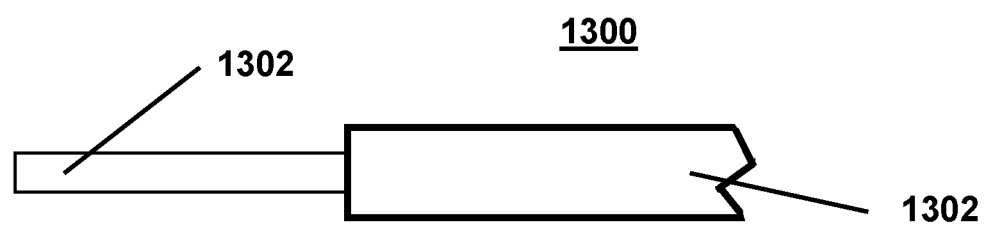

FIG. 6 shows schematically a top view of a guide 1300 which has cable structure. In order to represent the arrangement of the core 1301 and the jacket M1 1302 around the core 1301, a part of the core 1301 is shown without the jacket M1 1302. Typically however, the core 1301 is sheathed over its entire length by the jacket M1 1302.

Figure 7:
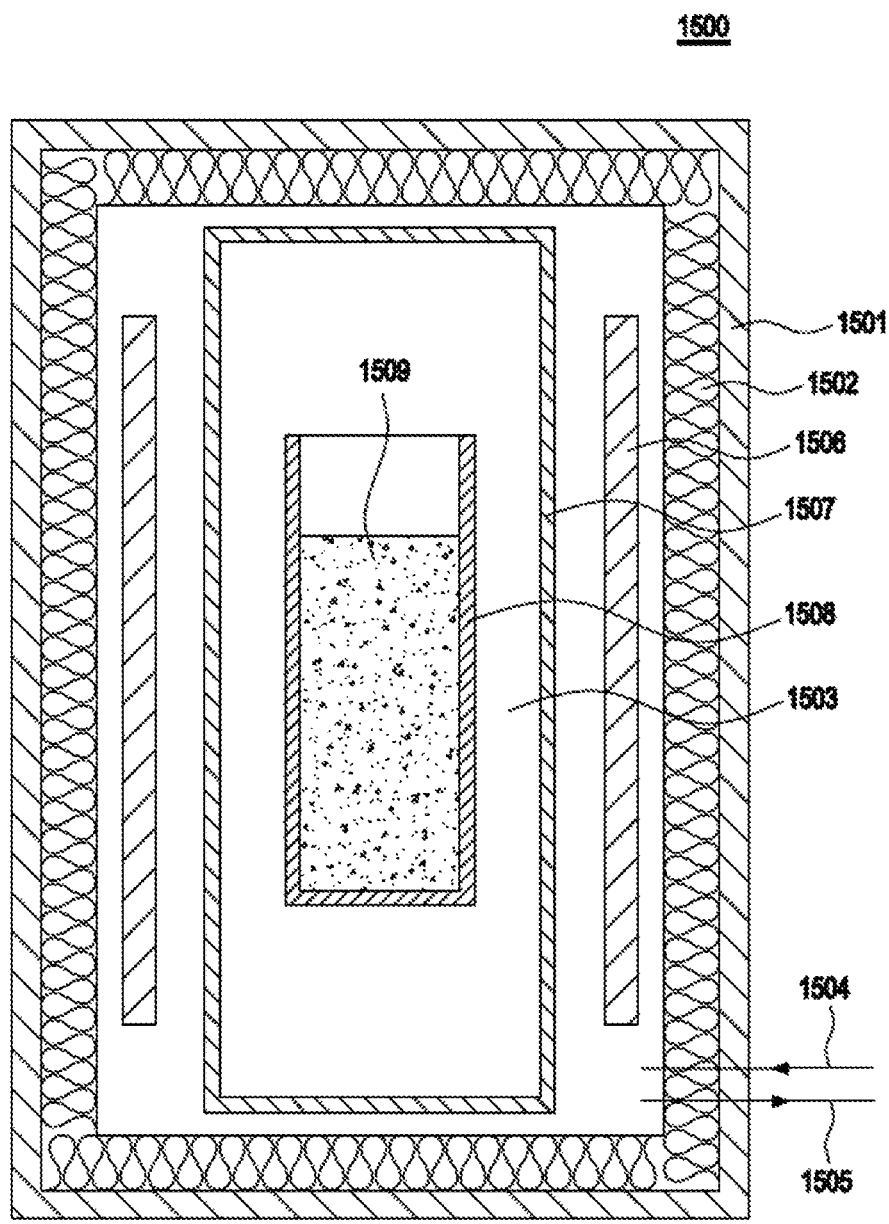

FIG. 7 shows a preferred embodiment of an oven 1500 which is suitable for a vacuum sinter process, a gas pressure sinter process and in particular a combination thereof. The oven has, starting from the outside and going inward, a pressure resistant jacket 1501 and a thermally isolating layer 1502. The space which is surrounded thereby, also referred to as oven interior, can be charged via a gas feeder 1504 with a gas or with a gas mixture. Further, the oven interior is provided with a gas outlet 1505, through which the gas can be removed. According to the relationship in the gas transport between gas feeding 1504 and gas removal at 1505, an over pressure, a vacuum or also a gas flow can be produced in the interior of the oven 1500. Further, heating elements 1506 are provided in the interior of the oven 1500. These are often placed on the isolating layer 1502 (not shown here). For protecting the melt material from contamination, the interior of the oven is provided with a so called "liner" 1507 which separates the oven chamber 1503 from the heating elements 1506. Melt moulds 1508 with melt material 1509 can be introduced into the oven chamber 1503. The melt mould 1508 can be open on one side (shown here) or can entirely surround the melt material 1509 (not shown).

Test Methods a. Fictive Temperature

The fictive temperature is measured by Raman spectroscopy using the Raman scattering intensity at about 606 $cm^{-1}$. The procedure and analysis described in the contribution of Pfleiderer et. al.; "The UV-induced 210 nm absorption band in fused Silica with different thermal history and stoichiometry"; Journal of Non-Crystalline Solids, volume 159 (1993), pages 145-153.

b. OH Content

The OH content of the glass is measured by infrared spectroscopy. The method of D. M. Dodd & D. M. Fraser "Optical Determinations of OH in Fused Silica" (J.A.P. 37, 3991 (1966)) is employed. Instead of the device named therein, an FTIR-spectrometer (Fourier transform infrared spectrometer, current System 2000 of Perkin Elmer) is employed. The analysis of the spectra can in principle be performed on either the absorption band at ca. 3670 $cm^{-1}$ or on the absorption band at ca. 7200 $cm^{-1}$. The selection of the band is made on the basis that the transmission loss through OH absorption is between 10 and 90%.

c. Oxygen Deficiency Centres (ODCs)

For the quantitative detection, the ODC(I) absorption is measured at 165 nm by means of a transmission measurement at samples with thickness between 1-2 mm using a vacuum UV spectrometer, model VUVAS 2000, of McPherson, Inc. (USA).

Then:

$N=\alpha/\sigma$ with

N=defect concentration [$1/cm^3$]
α=optical absorption [1/cm, base e] of the ODC(I) band
σ=effective cross section [$cm^2$]

wherein the effective cross section is set to $\sigma=7.5\cdot10^{-17}$ $cm^2$ (from L. Skuja, "Color Centres and Their Transformations in Glassy SiO$_2$", Lectures of the summer school "Photosensitivity in optical Waveguides and glasses", Jul. 13-18 1998, Vitznau, Switzerland).

d. Elemental Analysis d-1) Solid samples are crushed. Then, ca. 20 g of the sample is cleaned by introducing it into a HF-resistant vessel fully, covering it with HF and thermally treating at 100° C. for an hour. After cooling, the acid is discarded and the sample cleaned several times with high purity water. Then, the vessel and the sample are dried in the drying cabinet.

Next, ca. 2 g of the solid sample (crushed material cleaned as above; dusts etc. directly without pre-treatment) is weighed into an HF resistant extraction vessel and dissolved in 15 ml HF (50 wt.-%). The extraction vessel is closed and thermally treated at 100° C. until the sample is completely dissolved. Then, the extraction vessel is opened and further thermally treated at 100° C., until the solution is completely evaporated. Meanwhile, the extraction vessel is filled 3× with 15 ml of high purity water. 1 ml HNO$_3$ is introduced into the extraction vessel, in order to dissolve separated impurities and filled up to 15 ml with high purity water. The sample solution is then ready.

d-2) ICP-MS/ICP-OES Measurement

Whether OES or MS is employed depends on the expected elemental concentrations. Typically, measurements of MS are 1 ppb, and for OES they are 10 ppb (in each case based on the weighed sample). The measurement of the elemental concentration with the measuring device is performed according to the stipulations of the device manufacturer (ICP-MS: Agilent 7500ce; ICP-OES: Perkin Elmer 7300 DV) and using certified reference liquids for calibration. The elemental concentrations in the solution (15 ml) measured by the device are then converted based on the original weight of the sample (2 g).

Note: It is to be kept in mind that the acid, the vessels, the water and the devices must be sufficiently pure in order to measure the elemental concentrations in question. This is checked by extracting a blank sample without quartz glass.

The following elements are measured in this way: Li, Na, Mg, K, Ca, Fe, Ni, Cr, Hf, Zr, Ti, (Ta), V, Nb, W, Mo, Al.

d-3) The measurement of samples present as a liquid is carried out as described above, wherein the sample preparation according to step d-1) is skipped. 15 ml of the liquid sample are introduced into the extraction flask. No conversion based on the original sample weight is made.

e. Determination of Density of a Liquid

For measuring the density of a liquid, a precisely defined volume of the liquid is weighed into a measuring device which is inert to the liquid and its constituents, wherein the empty weight and the filled weight of the vessel are measured. The density is given as the difference between the two weight measurements divided by the volume of the liquid introduced.

f. Fluoride Detection 15 g of a quartz glass sample is crushed and cleaned by treating in nitric acid at 70° C. The sample is then washed several times with high purity water and then dried. 2 g of the sample is weighed into a nickel crucible and covered with 10 g Na$_2$CO$_3$ and 0.5 g ZnO. The crucible is closed with a Ni-lid and roasted at 1000° C. for an hour. The nickel crucible is then filled with water and boiled up until the melt cake has dissolved entirely. The solution is transferred to a 200 ml measuring flask and filled up to 200 ml with high purity water. After sedimentation of undissolved constituents, 30 ml are taken and transferred to a 100 ml measuring flask, 0.75 ml of glacial acetic acid and 60 ml TISAB are added and filled up with high purity water. The sample solution is transferred to a 150 ml glass beaker.

The measurement of the fluoride content in the sample solution is performed by means of an ion sensitive (fluoride) electrode, suitable for the expected concentration range, and display device as stipulated by the manufacturer, here a fluoride ion selective electrode and reference electrode F-500 with R503/D connected to a pMX 3000/pH/ION from Wissenschaftlich-Technische Werkstätten GmbH. With the fluoride concentration in the solution, the dilution factor and the sample weight, the fluoride concentration in the quartz glass is calculated.

g. Determination of Chlorine ($\geq$50 ppm)

15 g of a quartz glass sample is crushed and cleaned by treating with nitric acid at ca. 70° C. Subsequently, the sample is rinsed several times with high purity water and then dried. 2 g of the sample are then filled into a PTFE-insert for a pressure container, 15 ml NaOH (c=10 mol/l) are added, closed with a PTFE-lid and placed in the pressure container. This is closed and thermally treated at ca. 155° C. for 24 hours. After cooling, the PTFE-insert is removed and the solution is transferred entirely to a 100 ml measuring flask. There, 10 ml HNO$_3$ (65 wt.-%) and 15 ml acetate buffer are added, allowed to cool and filled to 100 ml with high purity water. The sample solution is transferred to a 150 ml glass beaker. The sample solution has a pH value in the range between 5 and 7.

The measurement of the chloride content in the sample solution is performed by means of an ion sensitive (Chloride) electrode which is suitable for the expected concentration range, and a display device as stipulated by the manufacturer, here an electrode of type C1-500 and a reference electrode of type R-503/D attached to a pMX 3000/pH/ION from Wissenschaftlich-Technische Werkstätten GmbH.

h. Chlorine Content (<50 ppm)

Chlorine contents<50 ppm up to 0.1 ppm in quartz glass are measured by neutron activation analysis (NAA). For this, 3 bores, each of 3 mm diameter and 1 cm length are taken from the quartz glass body under investigation. These are given to a research institute for analysis, in this case to the institute for nuclear chemistry of the Johannes-Gutenberg University in Mainz, Germany. In order to exclude contamination of the sample with chlorine, a thorough cleaning of the sample in an HF bath on location directly before the measurement was arranged. Each bore is measured several times. The results and the bores are then sent back by the research institute.

i. Optical Properties

The transmission of quartz glass samples is measured with the commercial grating- or FTIR-spectrometer from Perkin Elmer (Lambda 900 [190-3000 nm] or System 2000 [1000-5000 nm]). The selection is determined by the required measuring range.

For measuring the absolute transmission, the sample bodies are polished on parallel planes (surface roughness RMS<0.5 nm) and the surface is cleared off all residues by ultrasound treatment. The sample thickness is 1 cm. In the case of an expected strong transmission loss due to impurities, dopants etc., a thicker or thinner sample can be selected in order to stay within the measuring range of the device. A sample thickness (measuring length) is selected at which only slight artefacts are produced on account of the passage of the radiation through the sample and at the same time a sufficiently detectable effect is measured.

The measurement of the opacity, the sample is placed in front of an integrating sphere. The opacity is calculated using the measured transmission value T according to the formula: $O=1/T=I_0/I$.

j. Refractive Index and Refractive Index Profile in a Tube or Rod

The refractive index profile of tubes/rods can be characterised by means of a York Technology Ltd. Preform Profiler P102 or P104. For this, the rod is placed lying in the measuring chamber the chamber is closed tight. The measuring chamber is then filled with an immersion oil which has a refractive index at the test wavelength of 633 nm which is very similar to that of the outermost glass layer at 633 nm. The laser beam then goes through the measuring chamber. Behind the measuring chamber (in the direction of the radiation) is mounted a detector which measures the angle of deviation (of the radiation entering the measuring chamber compared to the radiation exiting the measuring chamber). Under the assumption of radial symmetry of the refractive index profile of the rod, the diametric refractive index profile can be reconstructed by means of an inverse Abel transformation. These calculations are performed by the software of the device manufacturer York.

The refractive index of a sample is measured with the York Technology Ltd. Preform Profiler P104 analogue to the above description. In the case of isotropic samples, measurement of therefractive index profile gives only one value, the refractive index.

k. Carbon Content

The quantitative measurement of the surface carbon content of silicon dioxide granulate and silicon dioxide powder is performed with a carbon analyser RC612 from Leco Corporation, USA, by the complete oxidation of all surface carbon contamination (apart from SiC) with oxygen to obtain carbon dioxide. For this, 4.0 g of a sample are weighed and introduced into the carbon analyser in a quartz glass dish. The sample is bathed in pure oxygen and heated for 180 seconds to 900° C. The $CO_2$ which forms is measured by the infrared detector of the carbon analyser. Under these measuring conditions, the detection limit lies at ≤1 ppm (weight-ppm) carbon.

A quartz glass boat which is suitable for this analysis using the above named carbon analyser is obtainable as a consumable for the LECO analyser with LECO number 781-335 on the laboratory supplies market, in the present case from Deslis Laborhandel, Flurstraße 21, D-40235 Dusseldorf (Germany), Deslis-No. LQ-130XL. Such a boat has width/length/height dimensions of ca. 25 mm/60 mm/15 mm. The quartz glass boat is filled up to half its height with sample material. For silicon dioxide powder, a sample weight of 1.0 g sample material can be reached. The lower detection limit is then <1 weight ppm carbon. In the same boat, a sample weight of 4 g of a silicon dioxide granulate is reached for the same filling height (mean particle size in the range from 100 to 500 μm). The lower detection limit is then about 0.1 weight ppm carbon. The lower detection limit is reached when the measurement surface integral of the sample is not greater than three times the measurement surface integral of an empty sample (empty sample=the above process but with an empty quartz glass boat).

1. Curl Parameter

The curl parameter (also called: "Fibre Curl") is measured according to DIN EN 60793-1-34:2007-01 (German version of the standard IEC 60793-1-34:2006). The measurement is made according to the method described in Annex A in the sections A.2.1, A.3.2 and A.4.1 ("extrema technique").

m. Attenuation

The attenuation is measured according to DIN EN 60793-1-40:2001 (German version of the standard IEC 60793-1-40:2001). The measurement is made according to the method described in the annex ("cut-back-method") at a wavelength of $\lambda=1550$ nm.

n. Viscosity of the Slurry

The slurry is set to a concentration of 30 weight-% solids content with demineralised water (Direct-Q 3UV, Millipore, Water quality: 18.2 MΩcm). The viscosity is then measured with a MCR102 from Anton-Paar. For this, the viscosity is measured at 5 rpm. The measurement is made at a temperature of 23° C. and an air pressure of 1013 hPa.

o. Thixotropy

The concentration of the slurry is set to a concentration of 30 weight-% of solids with demineralised water (Direct-Q 3UV, Millipore, water quality: 18.2 MΩcm). The thixotropy is then measured with an MCR102 from Anton-Paar with a cone and plate arrangement. The viscosity is measured at 5 rpm and at 50 rpm. The quotient of the first and the second value gives the thixotropic index. The measurement is made at a temperature of 23° C.

p. Zeta Potential of the Slurry

For zeta potential measurements, a zeta potential cell (Flow Cell, Beckman Coulter) is employed. The sample is dissolved in demineralised water (Direct-Q 3UV, Millipore, water quality: 18.2 MΩcm) to obtain a 20 mL solution with a concentration of 1 g/L. The pH is set to 7 through addition of $HNO_3$ solutions with concentrations of 0.1 mol/L and 1 mol/L and an NaOH solution with a concentration of 0.1 mol/L. The measurement is made at a temperature of 23° C.

q. Isoelectric Point of the Slurry

The isoelectric point, a zeta potential measurement cell (Flow Cell, Beckman Coulter) and an auto titrator (DelsaNano AT, Beckman Coulter) is employed. The sample is dissolved in demineralised water (Direct-Q 3UV, Millipore, water quality: 18.2 MΩcm) to obtain a 20 mL solution with a concentration of 1 g/L. The pH is varied by adding $HNO_3$ solutions with concentrations of 0.1 mol/L and 1 mol/L and an NaOH solution with a concentration of 0.1 mol/L. The isoelectric point is the pH value at which the zeta potential is equal to 0. The measurement is made at a temperature of 23° C.

r. pH Value of the Slurry

The pH value of the slurry is measured using a WTW 3210 from Wissenschaftlich-Technische-Werkstätten GmbH. The pH 3210 Set 3 from WTW is employed as electrode. The measurement is made at a temperature of 23° C.

s. Solids Content

A weighed portion $m_1$ of a sample is heated for 4 hours to 500° C. reweighed after cooling ($m_2$). The solids content w is given as $m_2/m_1*100$ [wt.-%].

t. Bulk Density

The bulk density is measured according to the standard DIN ISO 697:1984-01 with an SMG 697 from Powtec. The bulk material (silicon dioxide powder or granulate) does not clump.

u. Tamped Density (Granulates)

The tamped density is measured according to the standard DIN ISO 787:1995-10.

v. Measurement of the Pore Size Distribution

The pore size distribution is measured according to DIN 66133 (with a surface tension of 480 mN/m and a contact angle of 140°). For the measurement of pore sizes smaller than 3.7 nm, the Pascal 400 from Porotec is used. For the measurement of pore sizes from 3.7 nm to 100 μm, the Pascal 140 from Porotec is used. The sample is subjected to a pressure treatment prior to the measurement. For this a manual hydraulic press is used (Order-Nr. 15011 from Specac Ltd., River House, 97 Cray Avenue, Orpington, Kent BR5 4HE, U.K.). 250 mg of sample material is weighed in a pellet die with 13 mm inner diameter from Specac Ltd. and loaded with 1 t, as per the display. This load is maintained for 5 s and readjusted if necessary. The load on the sample is then released and the sample is dried for 4 h at 105±2° C. in a recirculating air drying cabinet.

The sample is weighed into the penetrometer of type 10 with an accuracy of 0.001 g and in order to give a good reproducibility of the measurement it is selected such that the stem volume used, i.e. the percentage of potentially used Hg volume for filling the penetrometer is in the range between 20% to 40% of the total Hg volume. The penetrometer is then slowly evacuated to 50 µm Hg and left at this pressure for 5 min. The following parameters are provided directly by the software of the measuring device: total pore volume, total pore surface area (assuming cylindrical pores), average pore radius, modal pore radius (most frequently occurring pore radius), peak n. 2 pore radius (µm).

w. Primary Particle Size

The primary particle size is measured using a scanning electron microscope (SEM) model Zeiss Ultra 55. The sample is suspended in demineralised water (Direct-Q 3UV, Millipore, water quality: 18.2 MΩcm), to obtain an extremely dilute suspension. The suspension is treated for 1 min with the ultrasound probe (UW 2070, Bandelin electronic, 70 W, 20 kHz) and then applied to a carbon adhesive pad.

x. Mean Particle Size in Suspension

The mean particle size in suspension is measured using a Mastersizer 2000, available from Malvern Instruments Ltd., UK, according to the user manual, using the laser deflection method. The sample is suspended in demineralised water (Direct-Q 3UV, Millipore, water quality: 18.2 MΩcm) to obtain a 20 mL suspension with a concentration of 1 g/L. The suspension is treated with the ultrasound probe (UW 2070, Bandelin electronic, 70 W, 20 kHz) for 1 min.

y. Particle Size and Grain Size of the Solid

The particle size and grain size of the solid are measured using a Camsizer XT, available from Retsch Technology GmbH, Deutschland according to the user manual. The software gives the $D_{10}$, $D_{50}$ and $D_{90}$ values for a sample.

z. BET Measurement

For the measurement of the specific surface area, the static volumetric BET method according to DIN ISO 9277:2010 is used. For the BET measurement, a "NOVA 3000" or a "Quadrasorb" (available from Quantachrome), which operate according to the SMART method ("Sorption Method with Adaptive Dosing Rate"), is used. The micro pore analysis is performed using the t-plot process ($p/p_0$=0.1-0.3) and the meso pore analysis is performed using the MBET process ($p/p_0$=0.0-0.3). As reference material, the standards alumina SARM-13 and SARM-214, available from Quantachrome are used. The tare weight of the measuring cell (clean and dry) is weighed. The type of measuring cell is selected such that the sample material which is introduced and the filler rod fill the measuring cell as much as possible and the dead space is reduced to a minimum. The sample material is introduced into the measuring cell. The amount of sample material is selected so that the expected value of the measurement value corresponds to 10-20 m²/g. The measuring cells are fixed in the roasting positions of the BET measuring device (without filler rod) and evacuated to <200 mbar. The speed of the evacuation is set so that no material leaks from the measuring cell Baking is performed in this state at 200° C. for 1 h. After cooling, the measuring cell filled with the sample is weighed (raw value). The tare weight is then subtracted from the raw value of the weight=nett weight=weight of the sample. The filling rod is then introduced into the measuring cell, this is again fixed at the measuring location of the BET measuring device. Prior to the start of the measurement, the sample identifications and the sample weights are entered into the software. The measurement is started. The saturation pressure of nitrogen gas (N2 4.0) is measured. The measuring cell is evacuated and cooled down to 77 K using a nitrogen bath. The dead space is measured using helium gas (He 4.6). The measuring cell is evacuated again. A multi point analysis with at least 5 measuring points is performed. N2 4.0 is used as absorptive. The specific surface area is given in m²/g.

za. Viscosity of Glass Bodies

The viscosity of the glass is measured using the beam bending viscosimeter of type 401—from TA Instruments with the manufacturer's software WinTA (current version 9.0) in Windows 10 according to the DIN ISO 7884-4:1998-02 standard. The support width between the supports is 45 mm. Sample rods with rectangular cross section are cut from regions of homogeneous material (top and bottom sides of the sample have a finish of at least 1000 grain). The sample surfaces after processing have a grain size=9 µm & RA=0.15 µm. The sample rods have the following dimensions: length=50 mm, width=5 mm & height=3 mm (assignment: length, width, height as in the standards document). Three samples are measured and the mean is calculated. The sample temperature is measured using a thermocouple tight against the sample surface. The following parameters are used: heating rate=25 K up to a maximum of 1500° C., loading weight=100 g, maximum bending=3000 µm (deviation from the standards document).

zc. Residual Moisture (Water Content)

The measurement of the residual moisture of a sample of silicon dioxide granulate is performed using a Moisture Analyzer HX204 from Mettler Toledo. The device functions using the principle of thermogravimetry. The HX204 is equipped with a halogen light source as heating element. The drying temperature is 220° C. The starting weight of the sample is 10 g±10%. The "Standard" measuring method is selected. The drying is carried out until the weight change reaches not more than 1 mg/140 s. The residual moisture is given as the difference between the initial weight of the sample and the final weight of the sample, divided by the initial weight of the sample.

The measurement of residual moisture of silicon dioxide powder is performed according to DIN EN ISO 787-2:1995 (2 h, 105° C.).

Examples

The invention further illustrated in the following with examples. The invention is not limited to the examples.

A. 1. Preparation of Silicon Dioxide Powder (OMCTS Route)

The aerosol formed by atomising a siloxane with air (A) is introduced into a flame using pressure which is formed by igniting a mixture of oxygen enriched air (B) and hydrogen. Further, a gas flow (C) surrounding the flame is introduced and the process mixture subsequently cooled with process gas. The product is separated off at a filter. The process parameters are given in table 1 and the specification of the resulting product in table 2. Experimental values for this example are indicated with A1-x.

2. Modification 1: Raised Carbon Content

The process described in A.1. was performed, except that the burning of the siloxane was performed in such a way that an amount of carbon was also formed. Experimental values for this example are marked with A2-x.

TABLE 1

| | | Example | | |
|---|---|---|---|---|
| | | A1-1 | A2-1 | A2-2 |
| Aerosol formation | | | | |
| Siloxane | | OMCTS* | OMCTS* | OMCTS* |
| Feed | kg/h | 10 | 10 | 10 |
| | (kmol/h) | (0.0337) | (0.0337) | (0.0337) |
| Air feed (A) | $Nm^3/h$ | 14 | 10 | 12 |
| Pressure | barO | 1.2 | 1.2 | 1.2 |
| Burner feed | | | | |
| Oxygen enriched air (B) | $Nm^3/h$ | 69 | 65 | 68 |
| $O_2$ content | Vol. % | 32 | 30 | 32 |
| Total $O_2$ feed | $Nm^3/h$ | 25.3 | 21.6 | 24.3 |
| | kmol/h | 1.130 | 0.964 | 1.083 |
| Hydrogen feed | $Nm^3/h$ | 27 | 27 | 12 |
| | kmol/h | 1.205 | 1.205 | 0.536 |
| Feed of carbon compounds | | — | — | |
| Material | | | | Methane |
| Amount | $Nm^3/h$ | | | 5.5 |
| Air flow (C) | $Nm^3/h$ | 60 | 60 | 60 |
| Stoichiometric ratio | | | | |
| V | | 2.099 | 1.789 | 2.011 |
| X | | 0.938 | 0.80 | 2.023 |
| Y | | 0.991 | 0.845 | 0.835 |

V = molar ratio of $O_2$ employed/$O_2$ required for complete oxidation of the siloxane;
X = $O_2/H_2$ as molar ratio;
Y = (mol. ratio of $O_2$ employed/$O_2$ required for stoichiometric conversion of OMCTS + fuel gas);
*OMCTS = Octamethylcyclotetrasiloxane.

TABLE 2

| | | Example | | |
|---|---|---|---|---|
| | | A1-1 | A2-1 | A2-2 |
| BET | $m^2/g$ | 30 | 33 | 34 |
| Bulk density | g/ml | 0.114 ± 0.011 | 0.105 ± 0.011 | 0.103 ± 0.011 |
| Tamped density | g/ml | 0.192 ± 0.015 | 0.178 ± 0.015 | 0.175 ± 0.015 |
| Primary particle size | nm | 94 | 82 | 78 |
| Particle size distribution $D_{10}$ | μm | 3.978 ± 0.380 | 5.137 ± 0.520 | 4.973 ± 0.455 |
| Particle size distribution $D_{50}$ | μm | 9.383 ± 0.686 | 9.561 ± 0.690 | 9.423 ± 0.662 |
| Particle size distribution $D_{90}$ | μm | 25.622 ± 1.387 | 17.362 ± 0.921 | 18.722 ± 1.218 |
| C content | ppm | 34 ± 4 | 73 ± 6 | 80 ± 6 |
| Cl content | ppm | <60 | <60 | <60 |
| Al content | ppb | 20 | 20 | 20 |
| Total content of metals other than Al | ppb | <700 | <700 | <700 |
| Residual moisture | wt.-% | 0.02-1.0 | 0.02-1.0 | 0.02-1.0 |
| pH value in water 4% (IEP) | | — | 4.8 | 4.6 | 4.5 |
| Viscosity at 5 rpm, aqueous suspension 30 wt-%, 23° C. | mPas | 753 | 1262 | 1380 |
| Alkali earth metal content | ppb | 538 | 487 | 472 |

B. 1. Preparation of Silicon Dioxide Powder (Silicon Source: $SiCl_4$)

An amount of silicon tetrachloride ($SiCl_4$) is vaporised at a temperature T and introduced with a pressure P into a flame of a burner which is formed by igniting a mixture of oxygen enriched air and hydrogen. The mean normalised gas flow at the mouth of the burner is held constant. The process mixture is subsequently cooled with process gas. The product was separated off at a filter. The process parameters are given in table 3 and the specifications for the resulting products in Table 4. They are marked with B1-x.

2. Modification: Raised Carbon Content

The process was performed as described under B.1., except that the burning of the silicon tetrachloride was performed in such a way that an amount of carbon was also formed. Experimental values for this example are marked with B2-1.

TABLE 3

| | | Example | |
|---|---|---|---|
| | | B1-1 | B2-1 |
| Aerosol formation | | | |
| Feed of silicon tetrachloride | kg/h | 50 | 50 |
| | (kmol/h) | (0.294) | (0.294) |
| Temperature T | ° C. | 90 | 90 |
| Pressure p | barO | 1.2 | 1.2 |
| Burner feed | | | |
| Oxygen enriched air, | $Nm^3/h$ | 145 | 115 |
| $O_2$ content therein | Vol. % | 45 | 30 |
| Feed of carbon compounds | | — | |
| Material | | | Methane |
| Amount | $Nm^3/h$ | | 2.0 |
| Hydrogen feed | $Nm^3/h$ | 115 | 60 |
| | kmol/h | 5.13 | 2.678 |
| Stoichiometric ratio | | | |
| X | | 0.567 | 0.575 |
| Y | | 0.946 | 0.85 |

X = $O_2/H_2$ as molar ratio;
Y = mol. ratio of $O_2$ employed/$O_2$ required for stoichiometric reaction with $SiCl_4$ + $H_2$ + $CH_4$)

TABLE 4

| | | Example | |
|---|---|---|---|
| | | B1-1 | B2-1 |
| BET | $m^2/g$ | 49 | 47 |
| Bulk density | g/ml | 0.07 ± 0.01 | 0.06 ± 0.01 |
| Tamped density | g/ml | 0.11 ± 0.01 | 0.10 ± 0.01 |

TABLE 4-continued

| | | Example | |
|---|---|---|---|
| | | B1-1 | B2-1 |
| Primary particle size | nm | 48 | 43 |
| Particle size distribution $D_{10}$ | μm | 5.0 ± 0.5 | 4.5 ± 0.5 |
| Particle size distribution $D_{50}$ | μm | 9.3 ± 0.6 | 8.7 ± 0.6 |
| Particle size distribution $D_{90}$ | μm | 16.4 ± 0.5 | 15.8 ± 0.7 |
| C content | ppm | <4 | 76 |
| Cl content | ppm | 280 | 330 |
| Al content | ppb | 20 | 20 |
| Total of the concentrations of Ca, Co, Cr, Cu, Fe, Ge, Hf, K, Li, Mg, Mn, Mo, Na, Nb, Ni, Ti, V, W, Zn, Zr | ppb | <1300 | <1300 |
| Residual moisture | wt.-% | 0.02-1.0 | 0.02-1.0 |
| pH value in water 4% (IEP) | pH | 3.8 | 3.8 |
| Viscosity at 5 rpm, aqueous suspension 30 wt-%, 23° C. | mPas | 5653 | 6012 |
| Alkali earth metal content | ppb | 550 | 342 |

C. Steam Treatment

A particle flow of silicon dioxide powder is introduced through the top of a standing column. Steam with a temperature (A) and air are introduced through the base of the column. The column is held by an internal heater at a temperature (B) at the top of the column and a second temperature (C) at the column base. After leaving the column (holding time (D)) the silicon dioxide powder has in particular the properties shown in Table 6. The process parameters are given in Table 5.

TABLE 5

| | | Example | |
|---|---|---|---|
| | | C-1 | C-2 |
| Educt: Product from | | B1-1 | B2-1 |
| Educt feed | kg/h | 100 | 100 |
| Steam feed | kg/h | 5 | 5 |
| Steam temperature (A) | ° C. | 120 | 120 |
| Air feed | Nm³/h | 4.5 | 4.5 |
| Column | | | |
| height | m | 2 | 2 |
| Timer diameter | mm | 600 | 600 |
| T (B) | ° C. | 260 | 260 |
| T (C) | ° C. | 425 | 425 |
| Holding time (D) of silicon dioxide powder | s | 10 | 10 |

TABLE 6

| | | Example | |
|---|---|---|---|
| | | C-1 | C-2 |
| pH value in water 4% (IEP) | — | 4.6 | 4.6 |
| Cl content | ppm | <60 | <60 |
| C content | ppm | <4 | 36 |
| Viscosity at 5 rpm, aqueous suspension 30 wt-%, 23° C. | mPas | 1523 | 1478 |

The silicon dioxide powder obtained in examples C-1 and C-2 each have a lower chlorine content, as well as a moderate pH value in suspension. The carbon content of example C-2 higher than for C-1.

D. Treatment with Neutralising Agent

A particle flow of silicon dioxide powder is introduced through the top of a standing column. Through the base of the column, a neutralising agent and air are added. The column is held by an internal heater at a temperature (B) at the top of the column and a second temperature (C) at the column base. After leaving the column (Holding time (D)), the silicon dioxide powder has in particular the properties shown in Table 8. The process parameters are given in Table 7.

TABLE 7

| | | Example D-1 |
|---|---|---|
| Educt: Product from | | B1-1 |
| Educt feed | kg/h | 100 |
| Neutralising agent | | Ammonia |
| Feed of neutralising agent | kg/h | 1.5 |
| Specification of neutralising agent | | Obtainable from Air Liquide: Ammonia N38, purity ≥99.98 Vol. % |
| Air feed | Nm³/h | 4.5 |
| Column | | |
| height | m | 2 |
| inner diameter | mm | 600 |
| T (B) | ° C. | 200 |
| T (C) | ° C. | 250 |
| Holding time (D) for silicon dioxide powder | s | 10 |

TABLE 8

| | | Example D-1 |
|---|---|---|
| pH value in water 4% (IEP) | — | 4.8 |
| Cl content | ppm | 210 |
| C content | ppm | <4 |
| Viscosity at 5 rpm, aqueous suspension 30 wt-%, 23° C. | mPas | 821 |

E. 1. Preparation of Silicon Dioxide Granulate from Silicon Dioxide Powder

A silicon dioxide powder is dispersed in fully desalinated water. For this, an intensive mixer of type R from Maschinenfabrik Gustav Eirich is employed. The suspension so produced is pumped through a membrane pump, charged with pressure, and converted into droplets by a nozzle. These are dried in a spray tower and collect on the floor thereof. The process parameters are given in Table 9, the properties of the obtained granulates in Table 10. Experimental values for this example are marked with E1-x.

2. Modification: Raised Carbon Content

A process is performed analogous to the description E.1. Additionally, carbon powder is dispersed into the suspension as additive. Experimental values for this example are marked with E2-1. In E2-21 to E2-23, aluminium oxide is added as additive.

TABLE 9

| Example | | E1-1 | E1-2 | E1-3 | E1-4 | E1-5 | E2-1 | E2-21 | E2-22 | E2-23 |
|---|---|---|---|---|---|---|---|---|---|---|
| Educt = Product from | | A1-1 | A2-1 | B1-1 | C-1 | C-2 | A1-1 | A1-1 | A1-1 | A1-1 |
| Amount of educt | kg | 10 | 10 | 10 | 10 | 10 | 10 | 1000 | 1000 | 1000 |

TABLE 9-continued

| Example | | E1-1 | E1-2 | E1-3 | E1-4 | E1-5 | E2-1 | E2-21 | E2-22 | E2-23 |
|---|---|---|---|---|---|---|---|---|---|---|
| Additive | | | | | | | | | | |
| Material | | — | — | — | — | — | C** | $Al_2O_3^+$ | $Al_2O_3^+$ | $Al_2O_3^+$ |
| Max. Particle size | | | | | | | 75 μm | 65 μm | 65 μm | 65 μm |
| Amount | | | | | | | 1 g | 0.32 g | 0.47 g | 0.94 g |
| Water | Grade* | FD 5.4 | FD 5.4 | FD 5.4 | FD 5.4 | FD 5.4 | FD 5.4 | FD 5.4 | FD 5.4 | FD 5.4 |
| | Litre | | | | | | | | | |
| Dispersion | | | | | | | | | | |
| Solids content | wt.-% | 65 | 65 | 65 | 65 | 65 | 65 | 65 | 65 | 65 |
| Nozzle | | | | | | | | | | |
| Diameter | mm | 2.2 | 2.2 | 2.2 | 2.2 | 2.2 | 2.2 | 2.2 | 2.2 | 2.2 |
| Temperature | ° C. | 25 | 25 | 25 | 25 | 25 | 25 | 25 | 25 | 25 |
| Pressure | bar | 16 | 16 | 16 | 16 | 16 | 16 | 16 | 16 | 16 |
| Mounting height | m | 6.5 | 6.5 | 6.5 | 6.5 | 6.5 | 6.5 | 6.5 | 6.5 | 6.5 |
| Spray tower | | | | | | | | | | |
| Height | m | 18.20 | 18.20 | 18.20 | 18.20 | 18.20 | 18.20 | 18.20 | 18.20 | 18.20 |
| Inner diameter | m | 6.30 | 6.30 | 6.30 | 6.30 | 6.30 | 6.30 | 6.30 | 6.30 | 6.30 |
| T (Feed gas) | ° C. | 380 | 380 | 380 | 380 | 380 | 380 | 380 | 380 | 380 |
| T (exhaust) | ° C. | 110 | 110 | 110 | 110 | 110 | 110 | 110 | 110 | 110 |
| Air flow | m³/h | 6500 | 6500 | 6500 | 6500 | 6500 | 6500 | 6500 | 6500 | 6500 |

Mounting height = distance between the nozzle and the lowest point of the spray tower interior in the direction of the gravitational force vector.
*FD = fully desalinated, conductivity ≤ 0.1 μS;
**C 006011: graphite powder, max. particle size: 75 μm, high purity (obtainable from Goodfellow GmbH, Bad Nauheim (Germany)).
⁺Aeroxide Alu 65: highly dispersed pyrogenic aluminium oxide, particle size 65 μm (Evonik Industries AG, Essen (Germany)).

TABLE 10

| Example | | E1-1 | E1-2 | E1-3 | E1-4 | E1-5 | E2-1 | E2-21 | E2-22 | E2-23 |
|---|---|---|---|---|---|---|---|---|---|---|
| BET | m²/g | 30 | 33 | 49 | 49 | 47 | 28 | 32 | 30 | 32 |
| Bulk density | g/ml | 0.8 ± 0.1 | 0.8 ± 0.1 | 0.8 ± 0.1 | 0.8 ± 0.1 | 0.8 ± 0.1 | 0.8 ± 0.1 | 0.8 ± 0.1 | 0.8 ± 0.1 | 0.8 ± 0.1 |
| Tamped density | g/ml | 0.9 ± 0.1 | 0.9 ± 0.1 | 0.9 ± 0.1 | 0.9 ± 0.1 | 0.9 ± 0.1 | 0.9 ± 0.1 | 0.9 ± 0.1 | 0.9 ± 0.1 | 0.9 ± 0.1 |
| Mean particle size | μm | 255 | 255 | 255 | 255 | 255 | 255 | 255 | 255 | 255 |
| Particle size distribution $D_{10}$ | μm | 110 | 110 | 110 | 110 | 110 | 110 | 110 | 110 | 110 |
| Particle size distribution $D_{50}$ | μm | 222 | 222 | 222 | 222 | 222 | 222 | 222 | 222 | 222 |
| Particle size distribution $D_{90}$ | μm | 390 | 390 | 390 | 390 | 390 | 390 | 390 | 390 | 390 |
| SPHT3 | dim.-less | 0.64-0.98 | 0.64-0.98 | 0.64-0.98 | 0.64-0.98 | 0.64-0.98 | 0.64-0.98 | 0.64-0.98 | 0.64-0.98 | 0.64-0.98 |
| Aspect ratio W/L (width to length) | dim.-less | 0.64-0.94 | 0.64-0.94 | 0.64-0.94 | 0.64-0.94 | 0.64-0.94 | 0.64-0.94 | 0.64-0.94 | 0.64-0.94 | 0.64-0.94 |
| C content | ppm | <4 | 39 | <4 | <4 | 32 | 100 | <4 | <4 | <4 |
| Cl content | ppm | <60 | <60 | 280 | <60 | <60 | <60 | <60 | <60 | <60 |
| Al content | ppb | 20 | 20 | 20 | 20 | 20 | 20 | 190 | 270 | 520 |
| Total of the concentrations of Ca, Co, Cr, Cu, Fe, Ge, Hf, K, Li, Mg, Mn, Mo, Na, Nb, Ni, Ti, V, W, Zn, Zr | ppb | <700 | <700 | <1300 | <1300 | <1300 | <700 | <700 | <700 | <700 |
| Residual moisture | wt.-% | <3 | <3 | <3 | <3 | <3 | <3 | <3 | <3 | <3 |
| Alkali earth metal content | ppb | 538 | 487 | 550 | 550 | 342 | 538 | 517 | 490 | 541 |
| Pore volume | ml/g | 0.33 | 0.33 | 0.45 | 0.45 | 0.45 | 0.33 | 0.33 | 0.33 | 0.33 |
| Angle of repose | ° | 26 | 26 | 26 | 26 | 26 | 26 | 26 | 26 | 26 |

The granulates are all open pored have a uniform and spherical shape (all by inspection with microscope). They do not tend to cement or stick together.

F. Cleaning of Silicon Dioxide Granulate

Silicon dioxide granulate is first optionally treated in a rotary kiln at a temperature T1 with oxygen. Then, the silicon dioxide granulate is treated in co-flow with chlorine containing components, wherein the temperature is raised to a temperature T2. The process parameters are given in Table 11, the properties of the obtained treated granulate in Table 12.

TABLE 11

| Example | | F1-1 | F1-2 | F2-1 | F2-21 | F2-22 | F2-23 |
|---|---|---|---|---|---|---|---|
| Educt = Product from Rotary kiln[1)] | | E1-1 | E1-2 | E2-1 | E2-21 | E2-22 | E2-23 |
| Length | cm | 200 | | | 200 | 200 | 200 |
| Inner diameter | cm | 10 | | | 10 | 10 | 10 |
| Throughput | kg/h | 2 | | | 2 | 2 | 2 |
| Rotation speed | rpm | 2 | | | 2 | 2 | 2 |
| T1 | ° C. | 1100 | absent | absent | 1100 | 1100 | 1100 |
| Atmosphere | | pure $O_2$ | absent | absent | $O_2$ pure | $O_2$ pure | $O_2$ pure |
| Reactant | | $O_2$ | absent | absent | $O_2$ | $O_2$ | $O_2$ |
| Feed | l/h | 300 | absent | absent | 300 l/h | 300 l/h | 300 l/h |
| Residual moisture | wt.-% | <1 | <3 | <3 | <1 | <1 | <1 |
| T2 | ° C. | 1100 | 1100 | 1100 | 1100 | 1100 | 1100 |
| Co-flow | | | | | | | |
| Component 1: HCl | l/h | 50 | 50 | 50 | 50 | 50 | 50 |
| Component 2: $Cl_2$ | l/h | 0 | 15 | 15 | 0 | 0 | 0 |
| Component 3: $N_2$ | l/h | 50 | 35 | 35 | 50 | 50 | 50 |
| Co-flow total | l/h | 100 | 100 | 100 | 100 | 100 | 100 |

[1)]For the rotary kilns, the throughput is selected as the control variable. That means that during operation the mass flow exiting from the rotary kiln is weighed and then the rotational speed and/or the inclination of the rotary kiln is adapted accordingly. For example, an increase in the throughput can be achieved by a) increasing the rotational speed, or b) increasing the inclination of the rotary kiln away from horizontal, or a combination of a) and b).

TABLE 12

| Example | | F1-1 | F1-2 | F2-1 | F2-21 | F2-22 | F2-23 |
|---|---|---|---|---|---|---|---|
| BET | $m^2/g$ | 25 | 27 | 23 | 26 | 26 | 23 |
| C content | ppm | <4 | <4 | <4 | <4 | <4 | <4 |
| Cl content | ppm | 100-200 | 100-200 | 100-200 | 100-200 | 100-200 | 100-200 |
| Al content | ppb | 20 | 20 | 20 | 190 | 270 | 520 |
| Pore volume | $mm^3/g$ | 650 | 650 | 650 | 650 | 650 | 650 |
| Total of the concentrations of Ca, Co, Cr, Cu, Fe, Ge, Hf, K, Li, Mg, Mn, Mo, Na, Nb, Ni, Ti, V, W, Zn, Zr | ppb | <200 | <200 | <200 | <200 | <200 | <200 |
| Alkali earth metal content | ppb | 115 | 55 | 35 | 124 | 110 | 116 |
| Tamped density | $g/cm^3$ | 0.95 ± 0.05 | 0.95 ± 0.05 | 0.95 ± 0.05 | 0.95 ± 0.05 | 0.95 ± 0.05 | 0.95 ± 0.05 |

The granulates following the cleaning step have in the case of F1-2 and F2-1 a significantly reduced carbon content (like low carbon granulates, e.g. F1-1) and a significantly lower content of alkali earth metals. SiC formation was not observed.

G. Formation of a Glass Body

Silicon dioxide granulate according to row 2 of Table 13 was used as raw material. A graphite mould with a ring shaped hollow space and an outer diameter of the mould body of $d_a$, an inner diameter of the mould body of $d_i$ and a length l was prepared. A high purity graphite foil having a thickness of 1 mm, was applied to the inner wall of the outer mould body and a graphite foil of the same high purity graphite with a thickness of 1 mm was applied to the outer wall of the inner mould body. A high purity graphite line made out of high purity graphite with a bulk density of 1.2 g/cm³ and a density of 0.4 mm was applied to the base of the ring shaped hollow space of the mould (for G-2: cylinder shaped hollow space). The high-purity graphite mould with the graphite foil was filled with the silicon dioxide granulate. The filled graphite mould is introduced into an oven and the oven is evacuated. The silicon dioxide granulate which was introduced was brought from the temperature T1 up to the temperature T2 at a heating rate R1 and held there for a duration t2. Then, it was warmed at a heating rate R2 up to T3, then, without further tempering, up to the temperature T4 at a heating rate R3, further up to the temperature T5 at a heating rate R4, and held at there for a duration t5. During the last 240 minutes, the oven is charged with nitrogen at a pressure of 1.6*10⁶ Pa. Subsequently, the mould was gradually cooled down. On reaching a temperature of 1050° C., the mould was held at this temperature for a duration of 240 min. Subsequently, it was gradually further cooled to T6.

The process parameters are collected in Table 13, the properties of the quartz glass body which is formed in Table 14. "Gradual cooling" means that the mould is left in a switched off oven without further cooling measures, in other words cooled down only by giving off of heat to the surroundings.

TABLE 13

| | | Example | | | | | |
|---|---|---|---|---|---|---|---|
| | | G1-1 | G1-2 | G2-1 | G2-21 | G2-22 | G2-23 |
| Educt = Product from | | F1-1 | F1-2 | F2-1 | F2-21 | F2-22 | F2-23 |
| T1 | ° C. | 25 | 25 | 25 | 25 | 25 | 25 |
| R1 | ° C./min | +2 | +2 | +2 | +2 | +2 | +2 |
| T2 | ° C. | 400 | 400 | 400 | 400 | 400 | 400 |
| t2 | min | 60 | 60 | 60 | 60 | 60 | 60 |
| R2 | ° C./min | +3 | +3 | +3 | +3 | +3 | +3 |
| T3 | ° C. | 1000 | 1000 | 1000 | 1000 | 1000 | 1000 |
| R3 | ° C./min | +0.2 | +0.2 | +0.2 | +0.2 | +0.2 | +0.2 |
| T4 | ° C. | 1350 | 1350 | 1350 | 1350 | 1350 | 1350 |
| R4 | ° C./min | +2 | +2 | +2 | +2 | +2 | +2 |
| T5 | ° C. | 1750 | 1750 | 1750 | 1750 | 1750 | 1750 |
| t5 | min | 720 | 720 | 720 | 720 | 720 | 720 |
| T6 | ° C. | 25° C. | 25° C. | 25° C. | 25° C. | 25° C. | 25° C. |

TABLE 14

| Example | | G1-1 | G1-2 | G2-1 | G2-21 | G2-22 | G2-23 |
|---|---|---|---|---|---|---|---|
| Length (quartz glass body) | mm | 2000 | 1000 | 2000 | 2000 | 2000 | 2000 |
| Outer diameter (quartz glass body) | mm | 260 | 560 | 260 | 260 | 260 | 260 |
| Inner diameter (quartz glass body) | mm | 45 | — (solid) | 45 | 45 | 45 | 45 |
| OH content* | ppm | 0.3 ± 0.2 | 0.4 ± 0.2 | 0.4 ± 0.2 | 0.3 ± 0.2 | 0.3 ± 0.2 | 0.3 ± 0.2 |
| C content | ppm | <4 | <4 | <4 | <4 | <4 | <4 |
| Cl content* | ppm | <60 | <60 | <60 | <60 | <60 | <60 |
| Al content* | ppb | 14 ± 5 | 13 ± 5 | 12 ± 5 | 185 ± 5 | 280 ± 5 | 510 ± 5 |
| ODC content | /cm$^3$ | $0.8*10^{15}$ | $1.7*10^{15}$ | $1.1*10^{15}$ | $0.8*10^{15}$ | $0.8*10^{15}$ | $0.8*10^{15}$ |
| Total of the concentrations of Ca, Co, Cr, Cu, Fe, Ge, Hf, K, Li, Mg, Mn, Mo, Na, Nb, Ni, Ti, V, W, Zn, Zr | ppb | 153 | 62 | 171 | 160 | 166 | 172 |
| Refractive index homogeneity | ppm | 30 | 30 | 30 | 30 | 30 | 30 |
| Fictive temperature | ° C. | 1109 | 1137 | 1148 | 1120 | 1113 | 1244 |
| Viscosity | Lg(/dPas) | | | | | | |
| @1250° C. | | 12.6 | 12.4 | 12.7 | 12.6 | 12.6 | 12.7 |
| @1300° C. | | 11.8 | 11.8 | 11.8 | 11.8 | 11.8 | 11.8 |
| @1350° C. | | 11.1 | 11.1 | 11.1 | 11.1 | 11.1 | 11.2 |

"±"-indicates the standard deviation.
All glass bodies have very good values for OH content, carbon content and aluminium content.

H. Preparation of a Glass Fibre

The quartz glass body prepared previously in example G is first mechanically worked analogously to Example 1 of EP 0598349 B1. The outer diameter of the worked quartz glass body was 250 mm, the inner diameter 50 mm. Subsequently, the worked quartz glass body is processed further analogously to example 6 of EP 0598349 B1, wherein this is used in place of the natural quartz glass body of example 6. A core rod with 45 mm outer diameter was used. The process parameters are given in Table 15, the properties of the glass fibre which is formed in Table 16.

TABLE 15

| Example | | H1-1 | H2-1 | H2-21 | H2-22 | H2-23 |
|---|---|---|---|---|---|---|
| Material = product from | | G1-1 | G2-1 | G2-21 | G2-22 | G2-23 |
| Oven temperature of fibre drawing oven | ° C. | 2100 | 2100 | 2100 | 2100 | 2100 |
| Drawing speed | m/min | 1200 | 1200 | 1200 | 1200 | 1200 |

TABLE 16

| Example | | H1-1 | H2-1 | H2-21 | H2-22 | H2-23 |
|---|---|---|---|---|---|---|
| Length (glass fibre) | km | 120 | 120 | 120 | 120 | 120 |
| Total diameter | μm | 125 | 125 | 125 | 125 | 125 |
| Jacket specifications | | | | | | |
| OH content* | ppm | <1 | <1 | <1 | <1 | <1 |
| C content | ppm | <4 | <4 | <4 | <4 | <4 |
| Cl content* | ppm | <60 | <60 | <60 | <60 | <60 |
| Al content* | ppb | 14 ± 5 | 12 ± 5 | 185 ± 5 | 280 ± 5 | 510 ± 5 |
| ODC content | /cm3 | $0.3*10^{15}$ | $0.5*10^{15}$ | $0.3*10^{15}$ | $0.3*10^{15}$ | $0.3*10^{15}$ |
| Total of the concentrations of Ca, Co, Cr, Cu, Fe, Ge, Hf, K, Li, Mg, Mn, Mo, Na, Nb, Ni, Ti, V, W, Zn, Zr | ppb | 153 | 171 | 153 | 153 | 153 |
| Curl | m | 17.3 | 22.1 | 9.1 | 5.5 | 4.3 |

*"±"-indicates the standard deviation.
Large curl values are better than small values.

The invention claimed is:

1. A light guide comprising:
  a jacket; and
  one or more cores;
  wherein the jacket surrounds the cores;
  wherein each core has a refractive index profile perpendicular to the maximum core extension, wherein at least one refractive index $n_K$ of each refractive index profile is greater than the refractive index $n_{M1}$ of the jacket;
  wherein the jacket is made of silicon dioxide and comprises:
    an OH content of less than 10 ppm;
    a chlorine content of less than 60 ppm; and
    an aluminium content of less than 200 ppb;
  wherein the ppb and ppm are each based on the total weight of the jacket M1.

2. The light guide according to claim 1, comprising two or more cores, wherein the jacket surrounds the cores as a matrix.

3. The light guide according to claim 1, wherein the jacket comprises at least one of:
  an ODC content of less than $5×10^{15}/cm^3$;
  a metal content of metals different to aluminium of less than 1 ppm;
  a viscosity (p=1013 hPa) in a range from $\log_{10}(\eta(1200°\,C.)/dPas)=13.4$ to $\log_{10}(\eta(1200°\,C.)/dPas)=13.9$ or $\log_{10}(\eta(1300°\,C.)/dPas)=11.5$ to $\log_{10}(1300°\,C./dPas)=12.1$ or $\log_{10}(\eta(1350°\,C.)/dPas)=1.2$ to $\log_{10}(\eta(1350°\,C.)/dPas)=10.8$;
  a curl parameter of more than 6 m;
  a standard deviation of the OH content of not more than 10%, based on the OH content of the jacket;
  a standard deviation of the Cl content of not more than 10%, based on the Cl content of the jacket;
  a standard deviation of the Al content of not more than 10%, based on the Al content of the jacket;
  a refractive index homogeneity of less than $1×10^{-4}$; and
  a transformation point $T_g$ in a range from 1150 to 1250° C.,
  wherein the ppb and ppm are each based on the total weight of the jacket.

4. The light guide according to claim 1, wherein the content by weight of the jacket is at least 60 wt.-%, based on the total weight of the cores and the jacket.

5. A process for the preparation of a light guide, comprising:
  providing:
    a quartz glass body,
      wherein the quartz glass body is made of silicon dioxide, wherein the silicon dioxide comprises:
      an OH content of less than 10 ppm;
      a chlorine content of less than 60 ppm; and
      an aluminium content of less than 200 ppb;
        wherein the ppb and ppm are each based on the total weight of the quartz glass body
    wherein the quartz glass body is first processed obtaining a hollow body with at least one opening;
  introducing one or multiple core rods into the quartz glass body through the at least one opening to obtain a precursor; and
  drawing the precursor in the warm to obtain the light guide with one or more cores and a jacket.

6. A light guide obtainable by the process of claim 5.

7. The light guide according to claim 6, wherein the light guide has a jacket and one or multiple cores,
  wherein the jacket surrounds the cores,
  wherein each core has a refractive index profile perpendicular to the maximum extension of the core, wherein at least one refractive index $n_K$ of each refractive index profile is greater than the refractive index $n_{M1}$ of the jacket;
  wherein the jacket is made of silicon dioxide and comprises
    an OH content of less than 10 ppm; and
    a chlorine content of less than 60 ppm; and
    an aluminium content of less than 200 ppb;
    wherein the ppb and ppm are each based on the total weight of the jacket.

8. A light guide cable comprising at least two light guides according to claim 1.

9. A process for the preparation of a light guide cable comprising:
  providing at least two light guides according to claim 1; and
  processing the at least two light guides from to obtain a light guide cable.

10. The quartz glass body according to claim 5, further comprising at least one of the following:
  an ODC content of less than $5×10^{15}/cm^3$;
  a metal content of metals which are different to aluminium of less than 300 ppb;

a viscosity (p=1013 hPa) in a range from $\log_{10}(\eta(1200°\text{C.})/\text{dPas})=13.4$ to $\log_{10}(\eta(1200°\text{C.})/\text{dPas})=13.9$ or $\log_{10}(\eta(1300°\text{C.})/\text{dPas})=11.5$ to $\log_{10}(\eta(1300°\text{C.})/\text{dPas})=12.1$ or $\log_{10}(\eta(1350°\text{C.})/\text{dPas})=1.2$ to $\log_{10}(\eta(1350°\text{C.})/\text{dPas})=10.8$;

a standard deviation of the OH content of not more than 10%, based on the OH content of the quartz glass body;

a standard deviation of the Cl content of not more than 10%, based on the Cl content of the quartz glass body;

a standard deviation of the Al content of not more than 10%, based on the Al content of the quartz glass body;

a refractive index homogeneity of less than $1\times10^{-4}$;

a cylindrical form;

a transformation temperature $T_g$ in a range from 1150 to 1250° C.; and a fictive temperature in a range from 1055 to 1200° C.;

wherein the ppb and ppm are each based on the total weight of the quartz glass body.

\* \* \* \* \*